(12) United States Patent
Dudar et al.

(10) Patent No.: US 10,508,618 B2
(45) Date of Patent: Dec. 17, 2019

(54) SYSTEMS AND METHODS FOR VEHICLE FUEL SYSTEM AND EVAPORATIVE EMISSIONS SYSTEM DIAGNOSTICS

(71) Applicant: Ford Global Technologies, LLC, Dearborn, MI (US)

(72) Inventors: Aed Dudar, Canton, MI (US); Mark Peters, Wolverine Lake, MI (US); Dennis Yang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 191 days.

(21) Appl. No.: 15/844,949

(22) Filed: Dec. 18, 2017

(65) Prior Publication Data

US 2019/0186422 A1    Jun. 20, 2019

(51) Int. Cl.
  *G01M 15/09* (2006.01)
  *F02M 25/08* (2006.01)
  *F02D 41/22* (2006.01)

(52) U.S. Cl.
  CPC .... *F02M 25/0809* (2013.01); *F02M 25/0836* (2013.01); *F02D 2041/225* (2013.01); *F02M 25/0854* (2013.01); *F02M 25/0872* (2013.01)

(58) Field of Classification Search
  CPC .............. F02M 25/0809; F02D 41/22; F02D 2041/225
  USPC ........................................ 73/114.38, 114.39
  See application file for complete search history.

(56) References Cited

U.S. PATENT DOCUMENTS

| | | | |
|---|---|---|---|
| 4,379,681 A | 4/1983 | Goudy, Jr. | |
| 5,333,590 A | 8/1994 | Thomson | |
| 6,016,690 A | 1/2000 | Cook et al. | |
| 6,164,123 A | 12/2000 | Corkill | |
| 6,557,401 B2 | 5/2003 | Ito | |
| 6,764,286 B2 | 7/2004 | Hunnicutt et al. | |
| 9,669,705 B2 | 6/2017 | Pearce et al. | |
| 2014/0069394 A1 | 3/2014 | Jentz et al. | |
| 2015/0354480 A1* | 12/2015 | Dudar | F02D 41/0032 701/22 |
| 2016/0177882 A1* | 6/2016 | Dudar | F02D 41/0032 701/22 |
| 2016/0186695 A1* | 6/2016 | Dudar | F02M 25/0809 73/40.5 R |

(Continued)

OTHER PUBLICATIONS

Dudar, A. et al., "Systems and Methods for Vehicle Fuel System and Evaporative Emissions System Diagnostics," U.S. Appl. No. 15/844,910, filed Dec. 18, 2017, 129 pages.

*Primary Examiner* — Eric S. McCall
(74) *Attorney, Agent, or Firm* — Geoffrey Brumbaugh McCoy Russell LLP

(57) ABSTRACT

Methods and systems are provided for diagnosing a vehicle fuel system for a presence or absence of undesired evaporative emissions. In one example, a method comprises conducting a test for undesired evaporative emissions stemming from a fuel system of a vehicle via in a first operating mode, evacuating the fuel system to a variable vacuum level through an entirety of a fuel vapor canister configured to capture and store fuel vapors, and in a second operating mode, evacuating the fuel system to the variable vacuum level through a portion of the fuel vapor canister. In this way, the diagnostic may be conducted in an environmentally friendly fashion, where analysis of a bleed-up portion of the test is not impacted by fuel volatility at the time of the diagnostic.

20 Claims, 14 Drawing Sheets

(56) References Cited

U.S. PATENT DOCUMENTS

| | | | | |
|---|---|---|---|---|
| 2017/0067414 A1* | 3/2017 | Dudar | ................ | F02M 25/0809 |
| 2017/0198662 A1* | 7/2017 | Dudar | ................ | F02D 41/0042 |
| 2017/0363055 A1* | 12/2017 | Dudar | .................... | F02D 41/22 |
| 2019/0078976 A1* | 3/2019 | Nelson | ................ | G01M 15/042 |
| 2019/0107081 A1* | 4/2019 | Dudar | .................... | F02B 33/34 |
| 2019/0186392 A1* | 6/2019 | Dudar | ................ | F02D 41/0037 |

\* cited by examiner

FIG. 6

| Canister loading state | ≤ 40F | 41F-49F | 50F-59F | 60F-69F | 70F-79F | 80F-89F | ≥90F |
|---|---|---|---|---|---|---|---|
| >90% | -8InH2O | - | - | - | - | - | - |
| 76%-90% | -8InH2O | -8InH2O | - | - | - | - | - |
| 61%-75% | -8InH2O | -8InH2O | -12InH2O | - | - | - | - |
| 46%-60% | -8InH2O | -8InH2O | -12InH2O | -16InH2O | - | - | - |
| 31%-45% | -8InH2O | -12InH2O | -16InH2O | -20InH2O | -20InH2O | -24InH2O | -28InH2O |
| 16%-30% | -8InH2O | -12InH2O | -16InH2O | -20InH2O | -24InH2O | -28InH2O | -28InH2O |
| <15% | -8InH2O | -12InH2O | -16InH2O | -20InH2O | -24InH2O | -28InH2O | -28InH2O |

Ambient Temperature

600

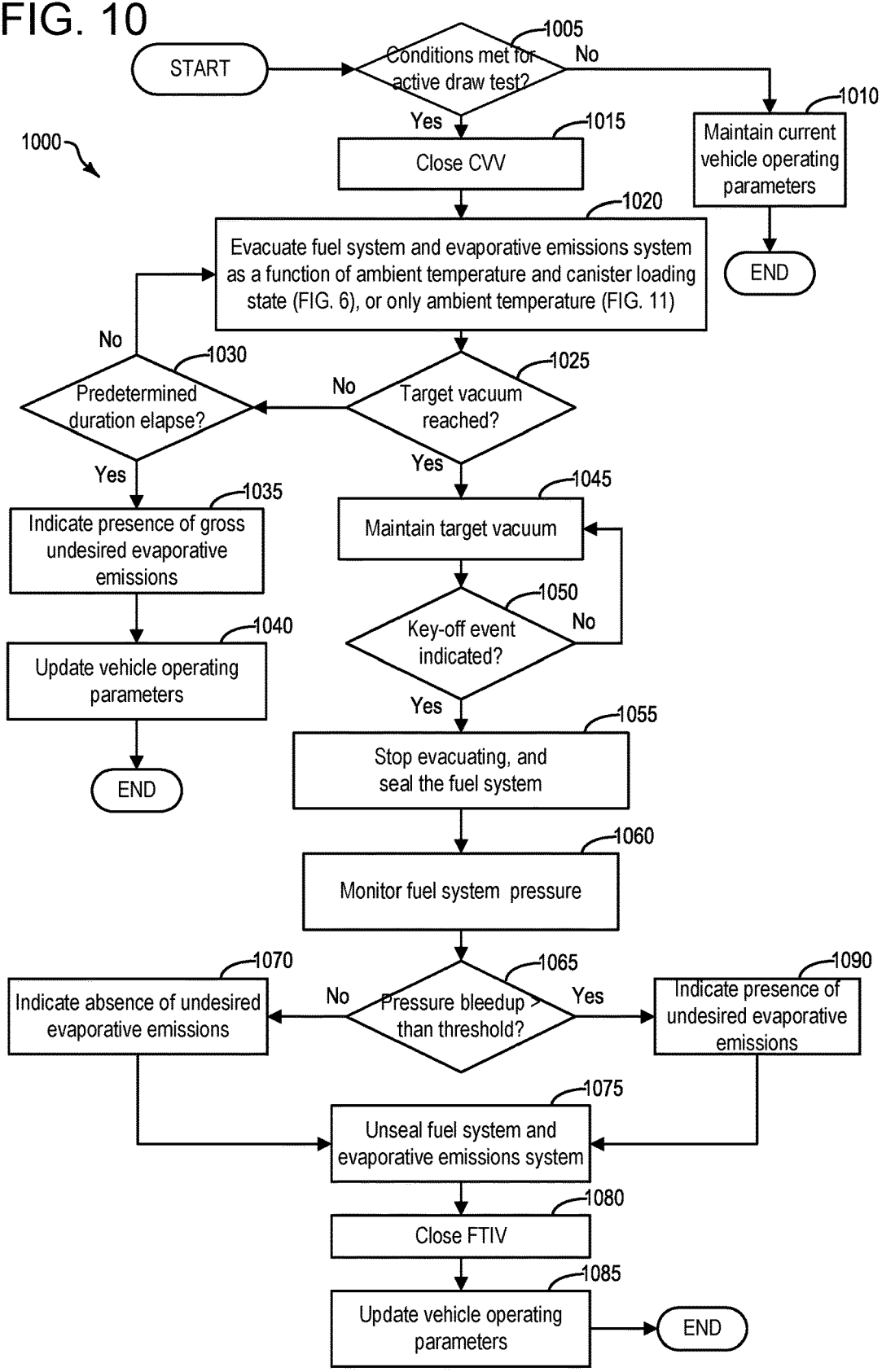

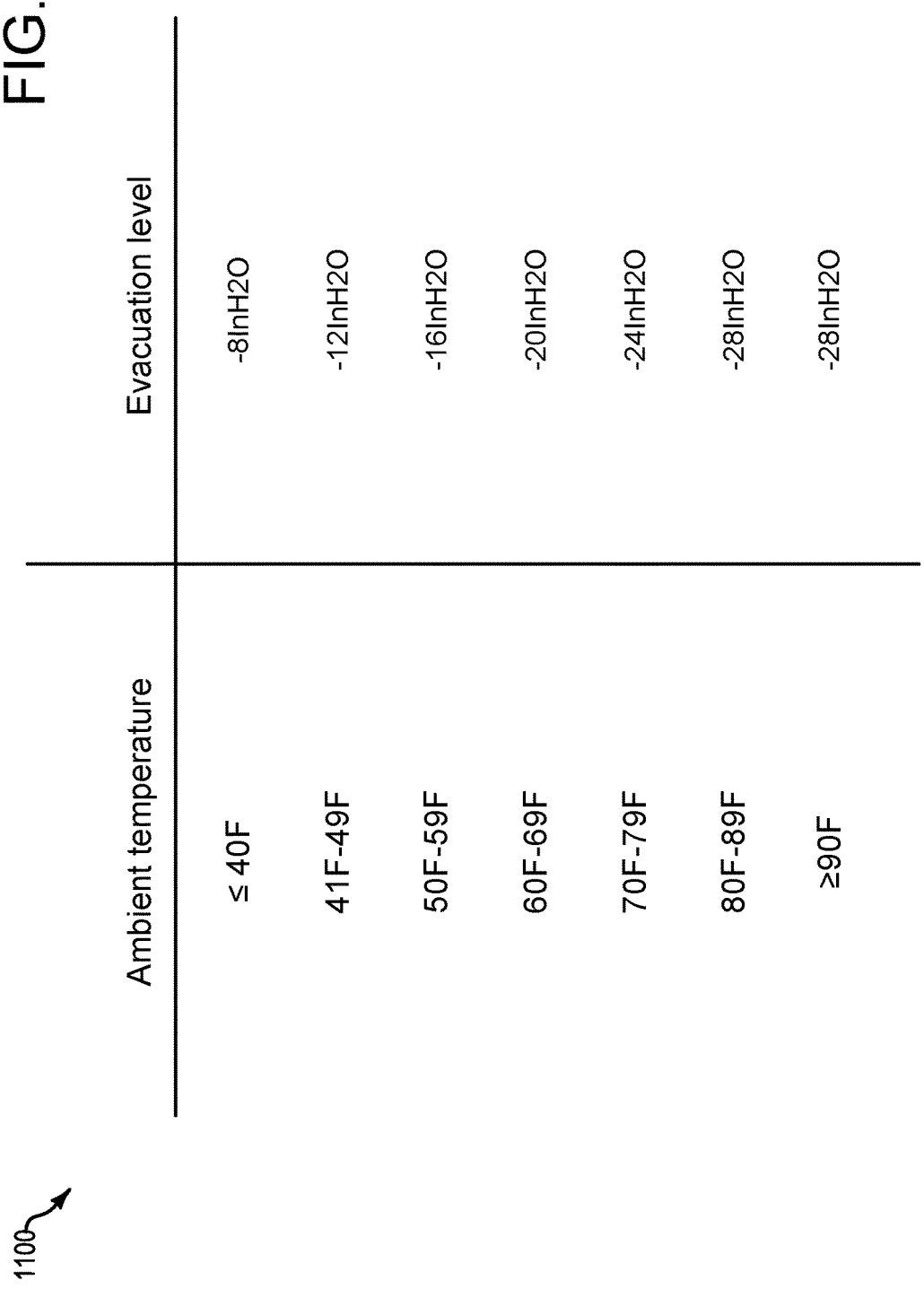

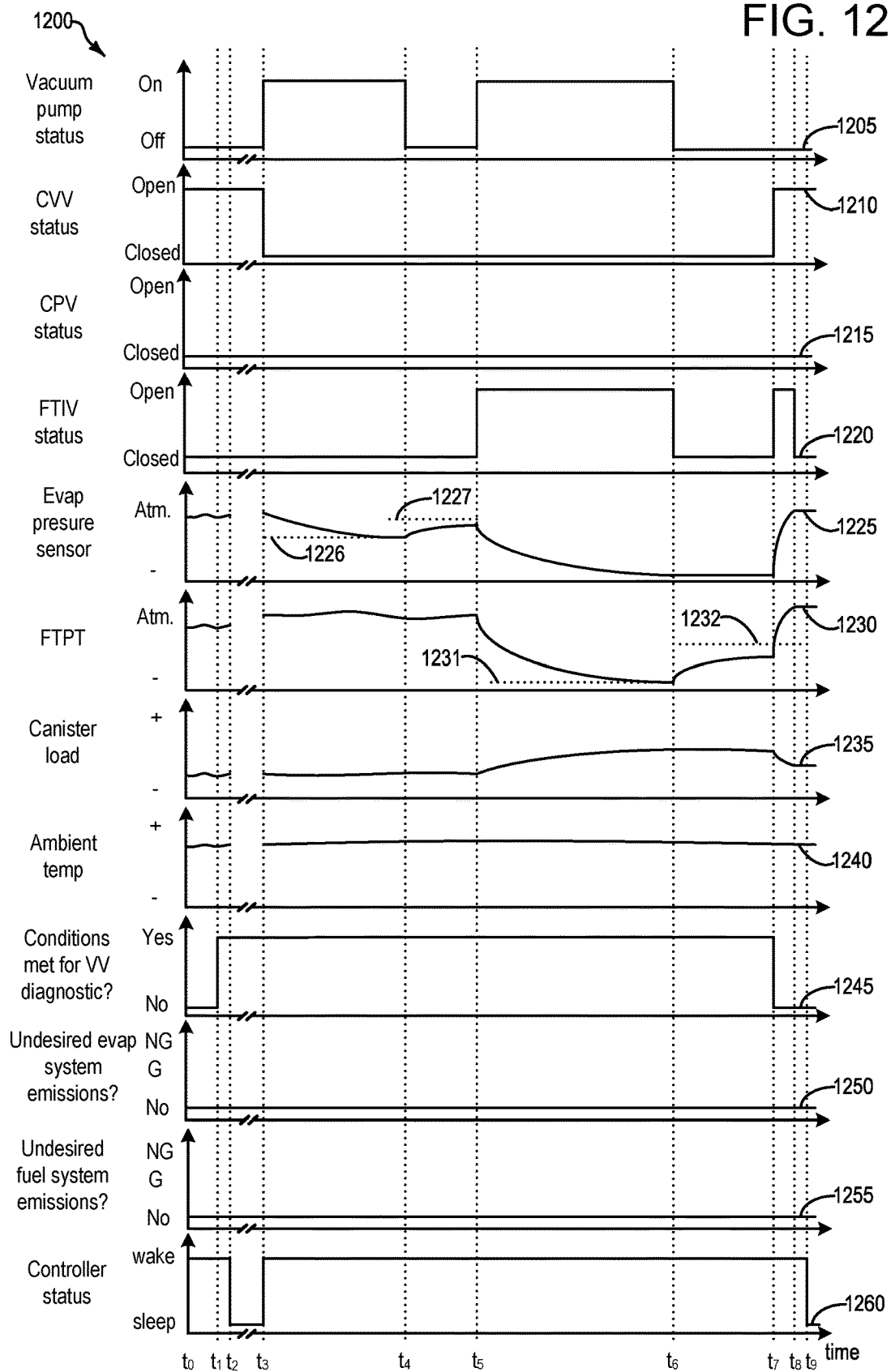

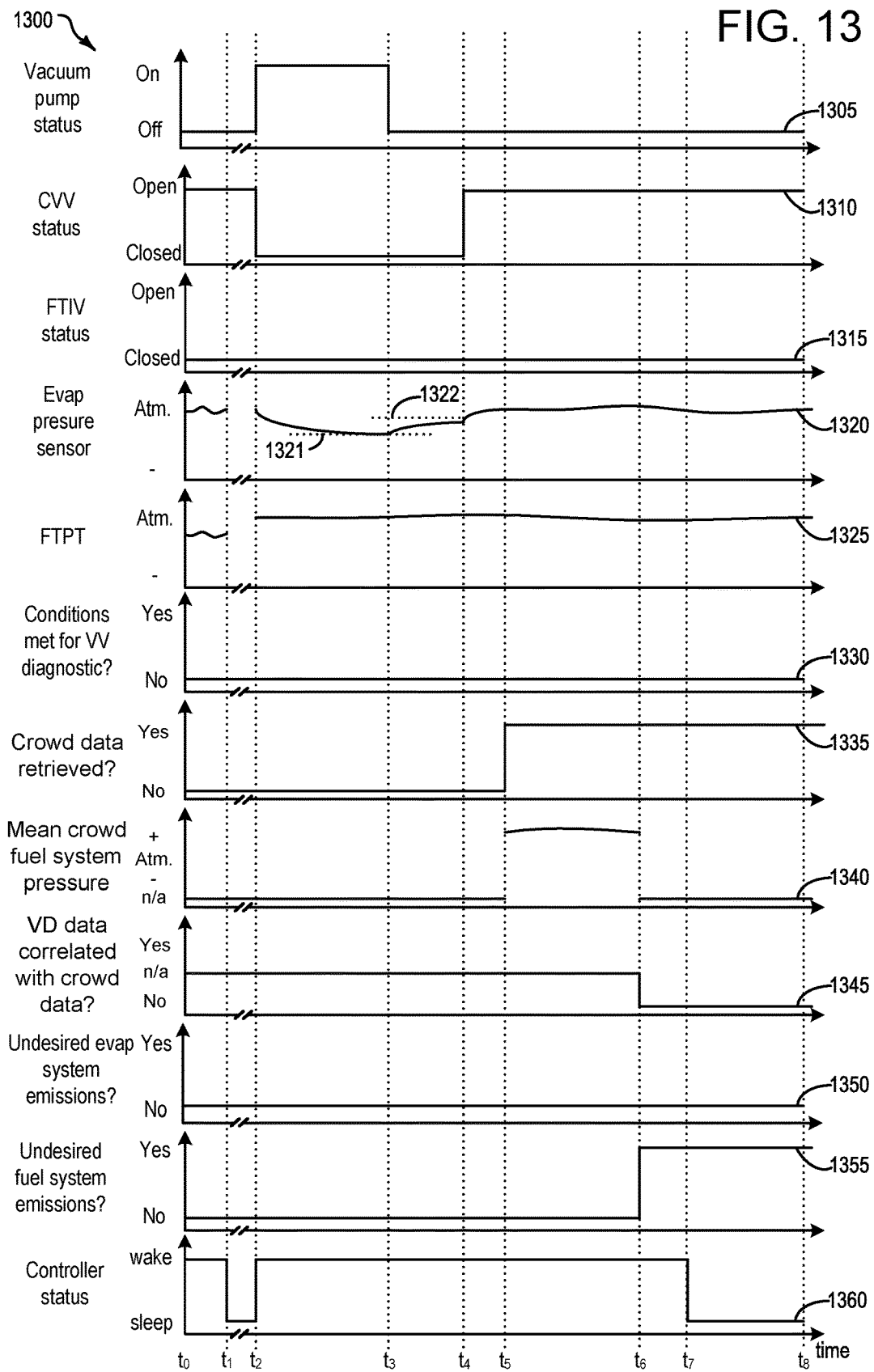

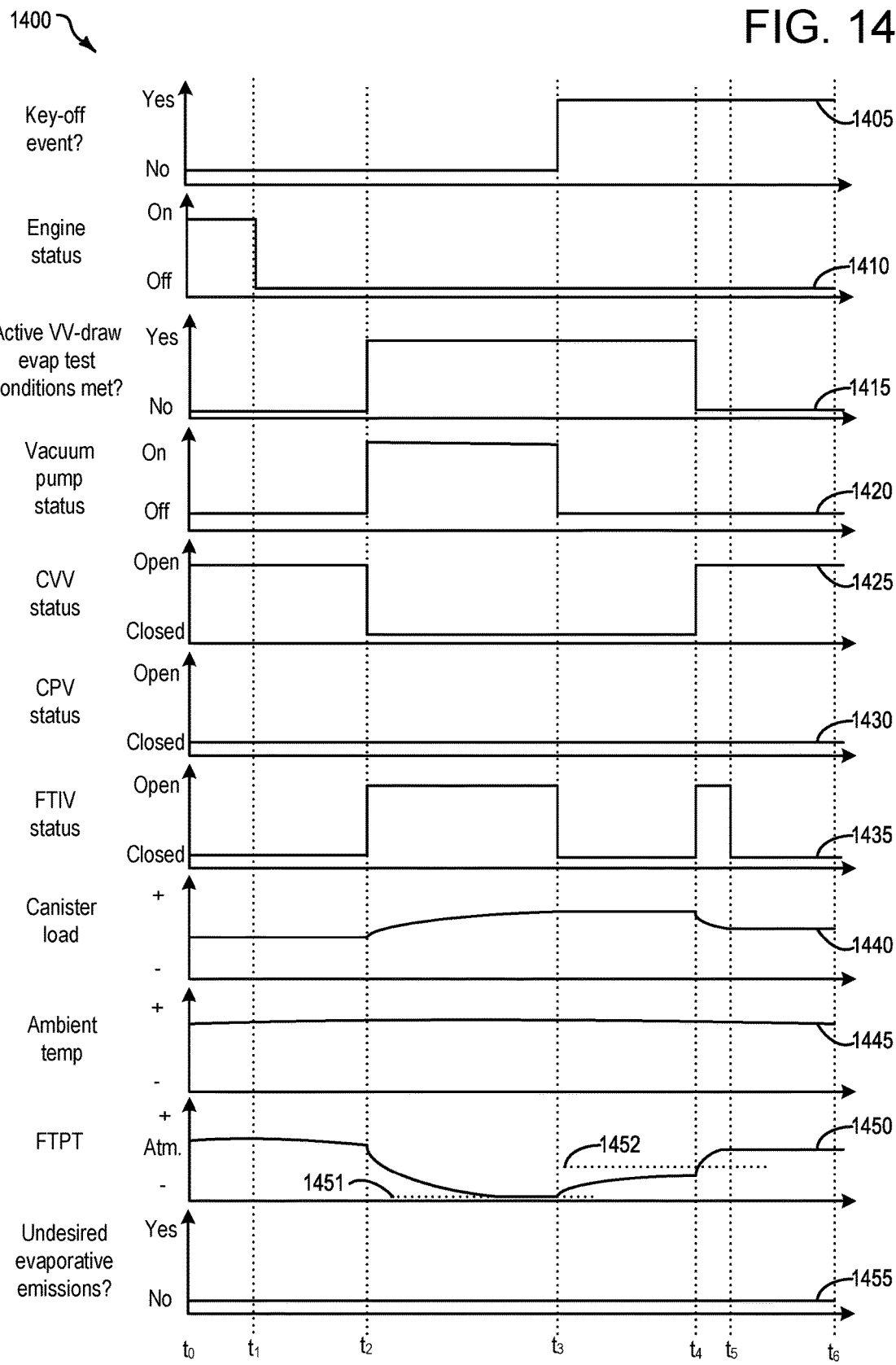

SYSTEMS AND METHODS FOR VEHICLE FUEL SYSTEM AND EVAPORATIVE EMISSIONS SYSTEM DIAGNOSTICS

FIELD

The present description relates generally to methods and systems for diagnosing a presence or absence of undesired evaporative emissions stemming from a fuel system and/or evaporative emissions system of a vehicle.

BACKGROUND/SUMMARY

Vehicle evaporative emissions control systems may be configured to store fuel vapors from fuel tank refueling and diurnal engine operations, and then purge the stored vapors during a subsequent engine operation. The fuel vapors may be stored in a fuel vapor canister, for example. In an effort to meet stringent federal emissions regulations, emission control systems may need to be intermittently diagnosed for the presence of leaks that could release fuel vapors to the atmosphere.

One method of testing for the presence of undesired evaporative emissions in an emission control system may include applying a vacuum to a fuel system and/or evaporative emissions that is otherwise sealed. An absence of gross undesired evaporative emissions may be indicated if a threshold vacuum is met. In some examples, the fuel system may be sealed subsequent to the threshold vacuum being reached, and an absence of non-gross undesired evaporative emissions may be indicated if a pressure bleed-up is less than a bleed-up threshold, or if a rate of pressure bleed-up is less than a bleed-up rate threshold. Failure to meet these criteria may indicate the presence of non-gross undesired evaporative emissions in the fuel system and/or evaporative emissions system. In some examples, an intake manifold vacuum may be used as the vacuum source applied to the emissions control system. However, hybrid-electric vehicles (HEVs) have limited engine run time, and may thus have limited opportunities to perform such a test. Further, in order to improve fuel efficiency, vehicles may be configured to operate with a low manifold vacuum, and may thus have limited opportunities with sufficient vacuum to perform such tests for undesired evaporative emissions.

Thus, to meet emissions regulations, such vehicles may include an on-board vacuum pump, which may be included in an evaporative leak check module (ELCM). The ELCM may be coupled to the evaporative emissions system, within a canister vent line, for example. The ELCM may thus supply the vacuum for appropriate leak tests. However, installing an ELCM in a vehicle is a relatively expensive manufacturing cost, which increases with a correlation to evaporative emissions system and fuel tank volume. Thus, it may be desirable to improve upon the methodology for evacuating the fuel system and/or evaporative emissions system, such that costs may be reduced. The inventors have herein recognized these issues.

Furthermore, there may be circumstances where the pressure bleed-up test for the presence or absence of non-gross undesired evaporative emissions may be adversely impacted due to environmental or vehicle operating conditions. Specifically, bleed-up may be influenced by ambient temperature, fuel temperature, etc., thus making interpretation of the results of such a test challenging. For example, if a fuel system is evacuated to a target of −8 InH2O, but due to fuel vaporization as a result of high ambient temperature, 2-3 InH2O of vacuum are lost, then the results of such a test may be inconclusive as it may be challenging to interpret whether the bleed-up is due to the presence of a source of undesired evaporative emissions, or due to fuel vaporization. The inventors have herein recognized these issues.

Still further, in applying vacuum to the fuel system and/or evaporative emissions system under conditions where the engine is not in operation, fuel vapor may be drawn into a fuel vapor canister. By adding fuel vapor to the fuel vapor canister, the potential for undesired bleed-through emissions may be increased. For example, if the canister is nearly saturated with fuel vapor, any additional fuel vapor may saturate the canister and may result in fuel vapor escaping from the canister to atmosphere. Thus, it may be desirable to conduct any test for the presence or absence of undesired evaporative emissions in such a fashion that the potential for bleed-emissions are not increased. The inventors have herein recognized such issues.

Thus, the inventors have herein developed systems and methods address the above-mentioned issues. In one example, a method comprises conducting a test for undesired evaporative emissions stemming from a fuel system of a vehicle via in a first operating mode, evacuating the fuel system to a variable vacuum level through an entirety of a fuel vapor canister configured to capture and store fuel vapors, and in a second operating mode, evacuating the fuel system to the variable vacuum level through a portion of the fuel vapor canister.

In this way, the test for undesired evaporative emissions may be conducted in an environmentally friendly fashion, where under certain conditions the fuel vapors are routed through the canister while in other conditions the fuel vapors are only routed through a portion of the canister.

In an example of the method, the method further comprises learning common routes traveled by the vehicle, where learned routes include one or more learned key-off events, and further includes an expected duration of the one or more learned key-off events, and wherein evacuating the fuel system in both the first operating mode and in the second operating mode is in response to a learned key-off event duration below a threshold key-off duration.

In one example of the method, the variable vacuum level in the first operating mode is a function of a loading state of the fuel vapor canister and fuel volatility, and the variable vacuum level in the second operating mode is a function of fuel volatility but independent of the loading state of the fuel vapor canister. Evacuating the fuel system in the first operating mode is via a vacuum pump positioned between the fuel vapor canister and atmosphere, and evacuating the fuel system in the second operating mode is via an engine.

In this way, the fuel system may be evacuated in an environmentally friendly fashion, and may further be conducted in such a way that the results of a pressure bleed-up portion of the test is not adversely impacted by fuel volatility.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 6 depicts an example lookup table, for determining a vacuum magnitude for conducting the variable vacuum-based test for the presence or absence of undesired evaporative emissions.

FIG. 10 shows a high level flowchart for conducting the active variable vacuum draw evaporative emissions test of FIG. 9.

FIG. 11 depicts an example lookup table for evacuating a fuel system to a variable vacuum level under conditions of engine operation.

FIG. 12 depicts an example timeline for conducting a variable vacuum-based test for undesired evaporative emissions according to the method of FIG. 5.

FIG. 13 depicts an example timeline for conducting a test for undesired evaporative emissions stemming from the fuel system based on crowd data, according to the method of FIG. 7.

FIG. 14 depicts an example timeline for conducting an active variable vacuum draw evaporative emissions test, according to the method of FIG. 10.

DETAILED DESCRIPTION

The following description relates to systems and methods for conducting tests for the presence or absence of undesired evaporative emissions stemming from a vehicle fuel system and/or evaporative emissions system. Such methods may be particularly relevant to hybrid vehicles, such as the vehicle system depicted at FIG. 1, with limited engine run-time and thus limited opportunities to purge a fuel vapor storage canister, such as the fuel vapor canister depicted at FIG. 2. Such methods may include pulling a variable vacuum level on the vehicle fuel system and evaporative emissions system using a vacuum pump, depicted at FIG. 2, to conduct such a diagnostic, where the fuel system includes a steel fuel tank. In some examples, the variable vacuum level may be a function of a fuel vapor canister loading state, and ambient temperature. In a situation where conditions are not met for conducting a diagnostic utilizing the variable vacuum level, a crowd-based test for the presence or absence of undesired evaporative emissions may be utilized, as depicted at FIG. 3.

Figure 4:
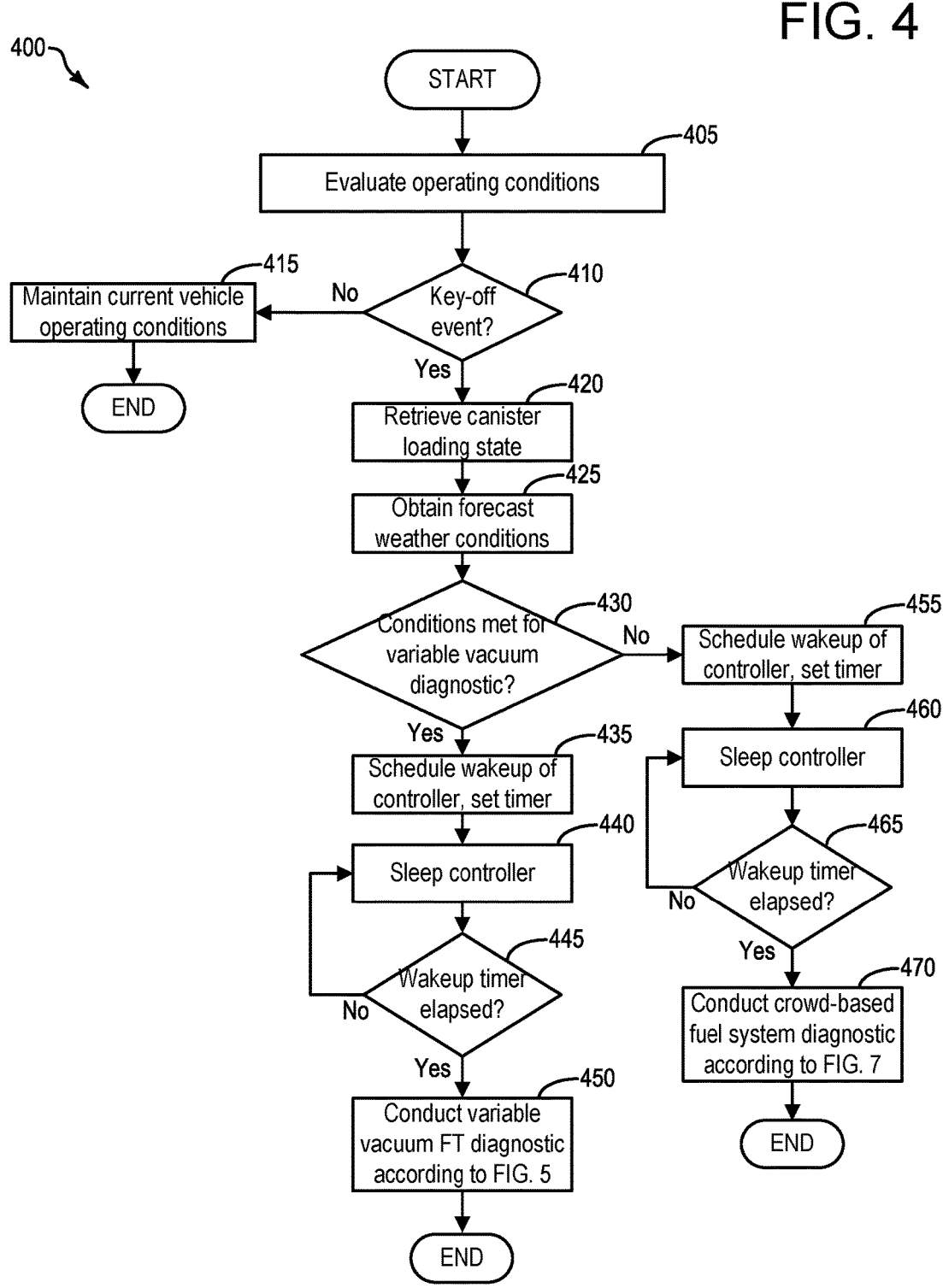
FIG. 4 depicts a high-level flow chart for determining whether to conduct a variable vacuum-based test for undesired evaporative emissions, or a fuel system diagnostic based on crowd data.

A general method for choosing whether to conduct the variable vacuum test diagnostic, or to conduct the crowd-based diagnostic, is depicted at FIG. 4. If conditions are met for conducting the variable vacuum test diagnostic, such a diagnostic may be conducted according to the method of FIG. 5. Such a method may include evacuating the fuel system to a variable vacuum level via the vacuum pump, in order to conduct a pressure bleed-up test for the presence or absence of non-gross undesired evaporative emissions. The variable vacuum level or variable vacuum target may be a function of ambient temperature and canister loading state, and may be stored as a 3D lookup table as illustrated at FIG. 6. Alternatively, if conditions are not met for conducting the variable vacuum test, then a crowd-based test may be conducted, according to FIG. 7.

Figure 5:
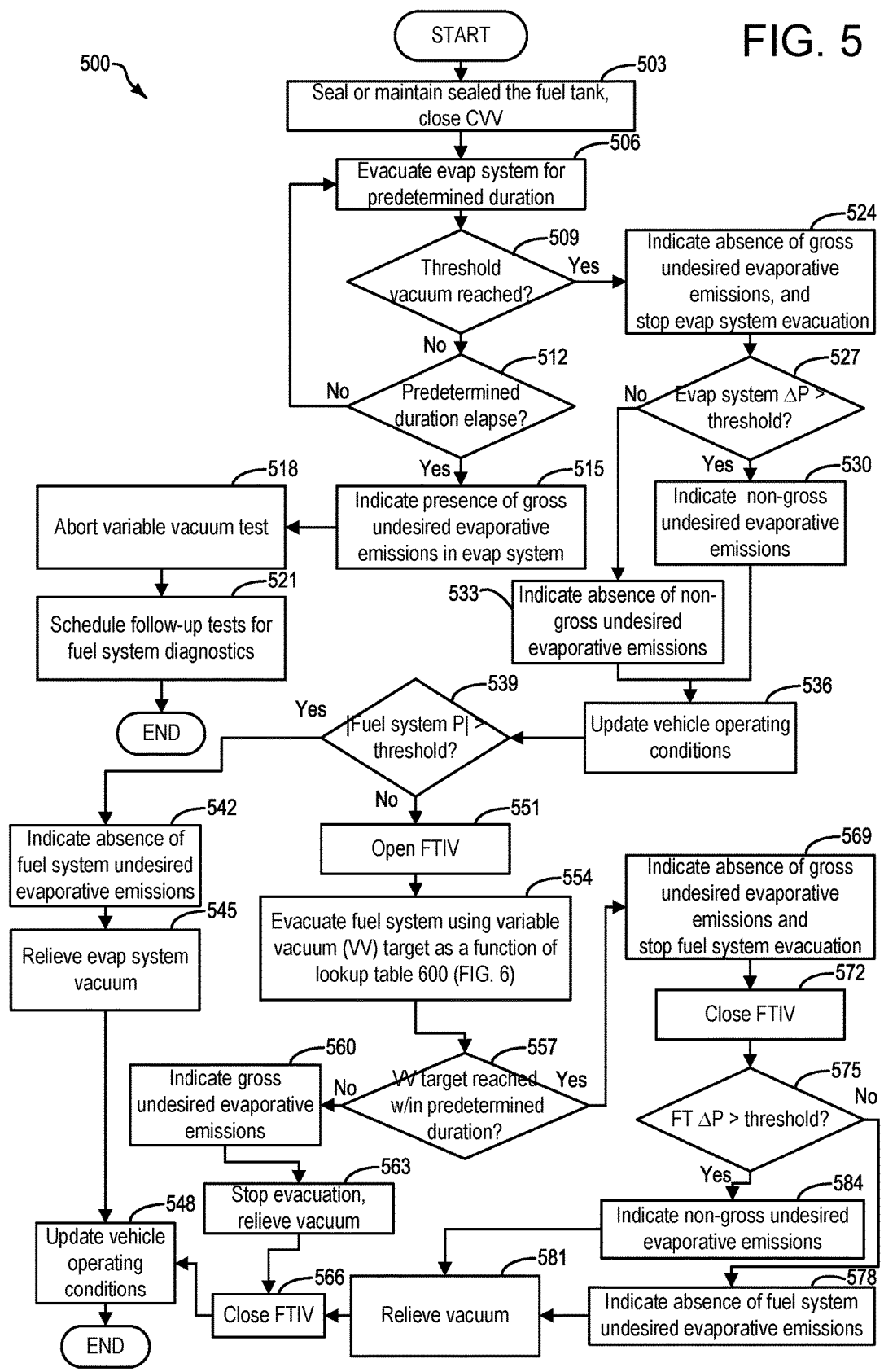
FIG. 5 depicts a high-level flow chart for conducting the variable vacuum-based test of FIG. 4 for the presence or absence of undesired evaporative emissions.
Figure 7:
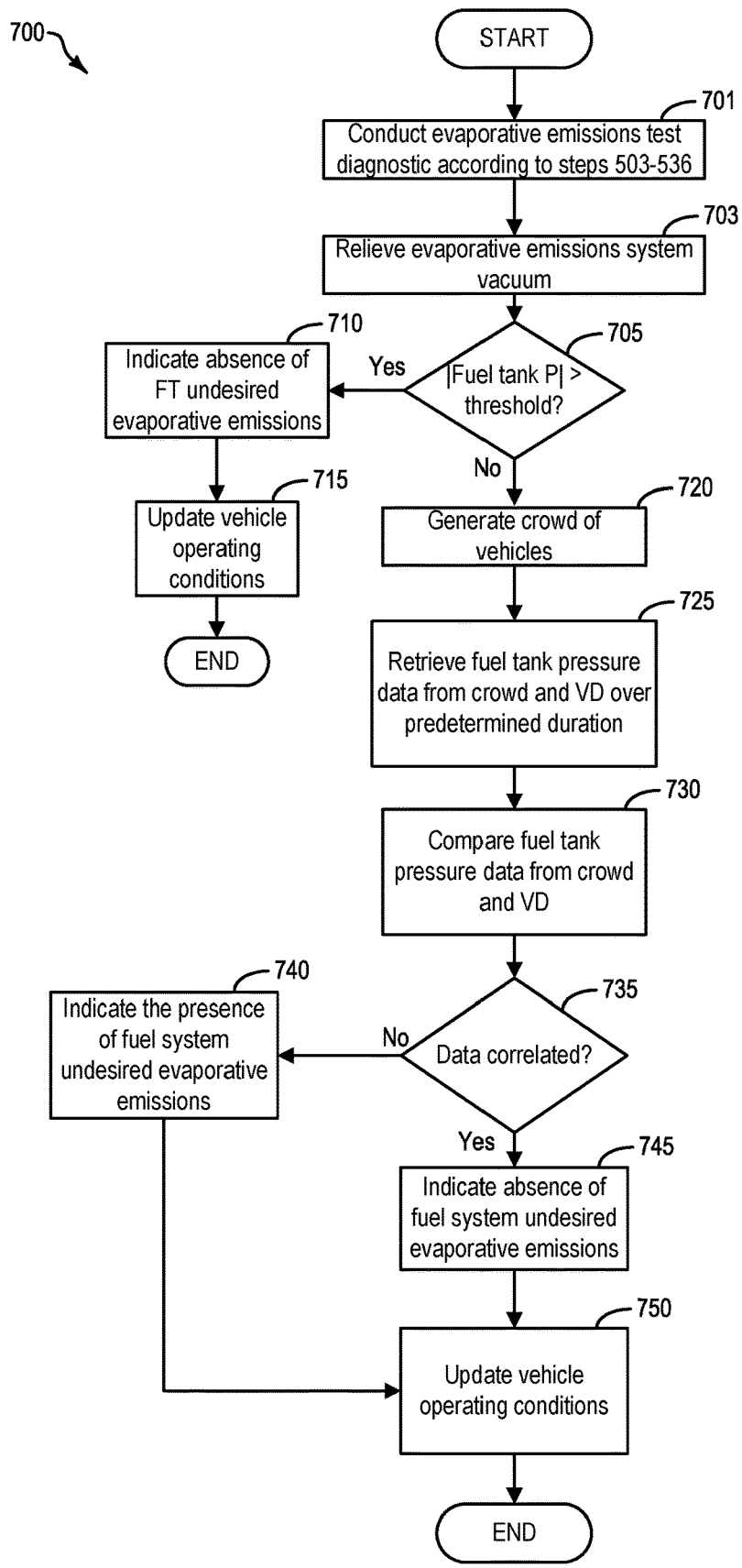
FIG. 7 depicts a high-level flow chart for conducting a test for undesired evaporative emissions stemming from the fuel system based on crowd data.
Figure 8:
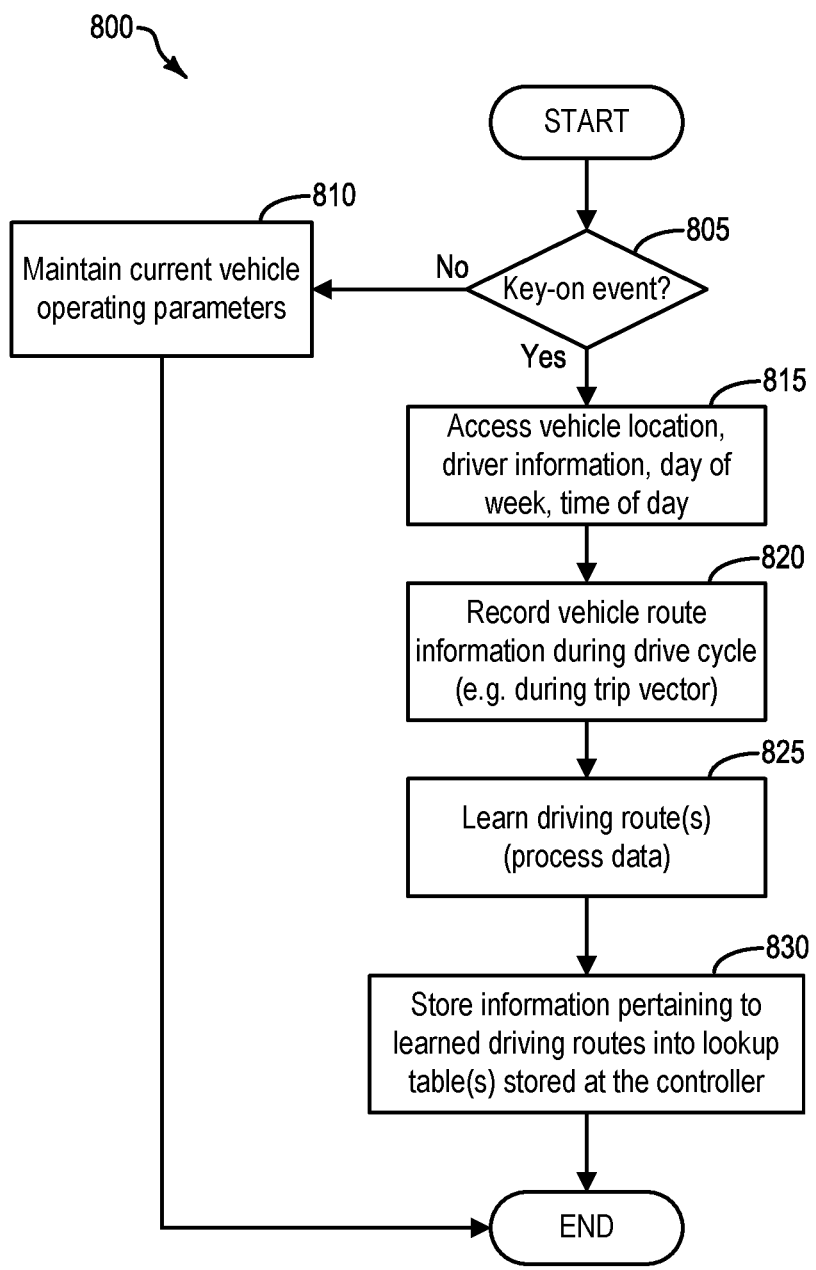
FIG. 8 shows a high level flowchart for an example method for machine learning of common driving routes.

In some examples, the vehicle may be equipped with route-learning technology, which may enable the vehicle controller to learn routes commonly traveled via a vehicle, including learned/predicted stops, and learned/predicted stop durations. Such a route learning methodology is depicted at FIG. 8. If a test for undesired evaporative emissions on the fuel system and evaporative emissions system is desired for a particular stop, but where the stop is of a duration where the variable vacuum diagnostic of FIG. 5 or the crowd-based diagnostic of FIG. 7 cannot be conducted and completed prior to the vehicle being turned on again, then an active variable vacuum test diagnostic may be conducted, according to FIG. 9. Such an active variable vacuum test is depicted at FIG. 10 and may include drawing a variable vacuum level on the fuel system and evaporative emissions system just prior to a learned/predicted key-off event, such that the fuel system and evaporative emissions system may be sealed at the key-off event, to monitor pressure bleed-up to infer the presence or absence of undesired evaporative emissions. By drawing a variable vacuum on the fuel system and evaporative emissions system prior to the key-off event, such a pressure bleed-up test may be rapidly conducted, within the duration of the predicted/learned stop. While one example of such a test includes the use of the vacuum pump discussed above, where the variable vacuum is a function of canister loading state and ambient temperature, another example may include the use of engine intake manifold vacuum to draw the variable vacuum on the fuel system and evaporative emissions system. In such an example where engine intake manifold vacuum is utilized to conduct the active variable vacuum test diagnostic, the variable vacuum may be a function of ambient temperature (and not canister loading state), depicted by the lookup table illustrated at FIG. 11. FIG. 12 depicts an example timeline for conducting the variable vacuum diagnostic of FIGS. 4-5, FIG. 13 depicts an example timeline for conducting the crowd-based diagnostic of FIG. 4 and FIG. 7, and FIG. 14 depicts an example timeline for conducting an active variable vacuum draw test for undesired evaporative emissions, according to the methods depicted at FIGS. 8-10.

Figure 1:
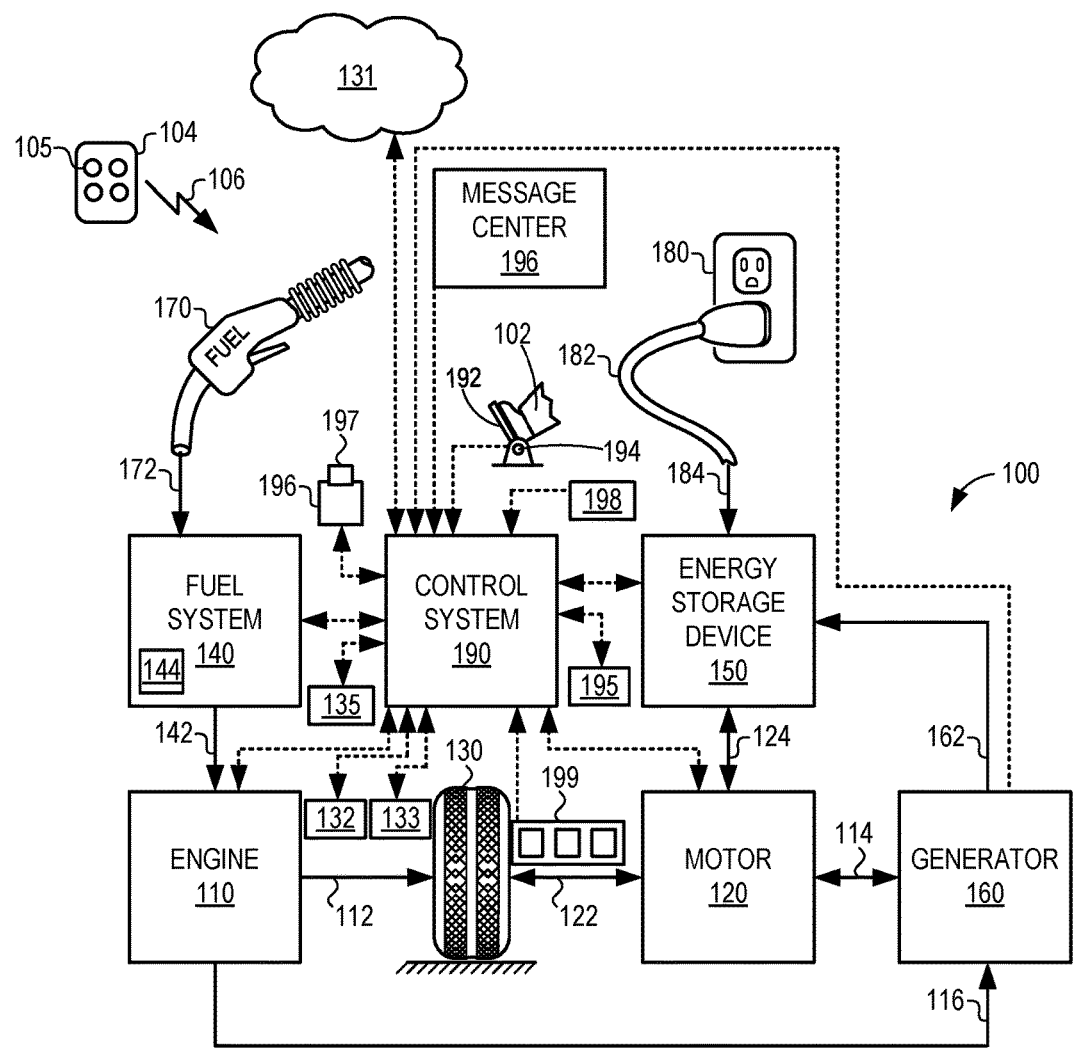
FIG. 1 shows a high-level block diagram illustrating an example vehicle system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. Furthermore, in some examples control system 190 may be in communication with a remote engine start receiver 195 (or transceiver) that receives wireless signals 106 from a key fob 104 having a remote start button 105. In other examples (not shown), a remote engine start may be initiated via a cellular telephone, or smartphone based system where a user's cellular telephone sends data to a server and the server communicates with the vehicle to start the engine.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, in response to the vehicle operator actuating refueling button 197, a fuel tank in the vehicle may be depressurized so that refueling may be performed.

In some examples, vehicle propulsion system 100 may include one or more onboard cameras 135. Onboard cameras 135 may communicate photos and/or video images to control system 190, for example. Onboard cameras may in some examples be utilized to record images within a predetermined radius of the vehicle, for example.

Control system 190 may be communicatively coupled to other vehicles or infrastructures using appropriate communications technology, as is known in the art. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 190 may be communicatively coupled to other vehicles or infrastructures via a wireless network 131 and the internet (e.g. cloud), as is commonly known in the art.

Vehicle system 100 may also include an on-board navigation system 132 (for example, a Global Positioning System) that an operator of the vehicle may interact with. The navigation system 132 may include one or more location sensors for assisting in estimating vehicle speed, vehicle altitude, vehicle position/location, etc. This information may be used to infer engine operating parameters, such as local barometric pressure. As discussed above, control system 190 may further be configured to receive information via the internet or other communication networks. Information received from the GPS may be cross-referenced to information available via the internet to determine local weather conditions, local vehicle regulations, etc. In some examples, vehicle system 100 may include lasers, radar, sonar, acoustic sensors 133, which may enable vehicle location, traffic information, etc., to be collected via the vehicle.

Figure 2:
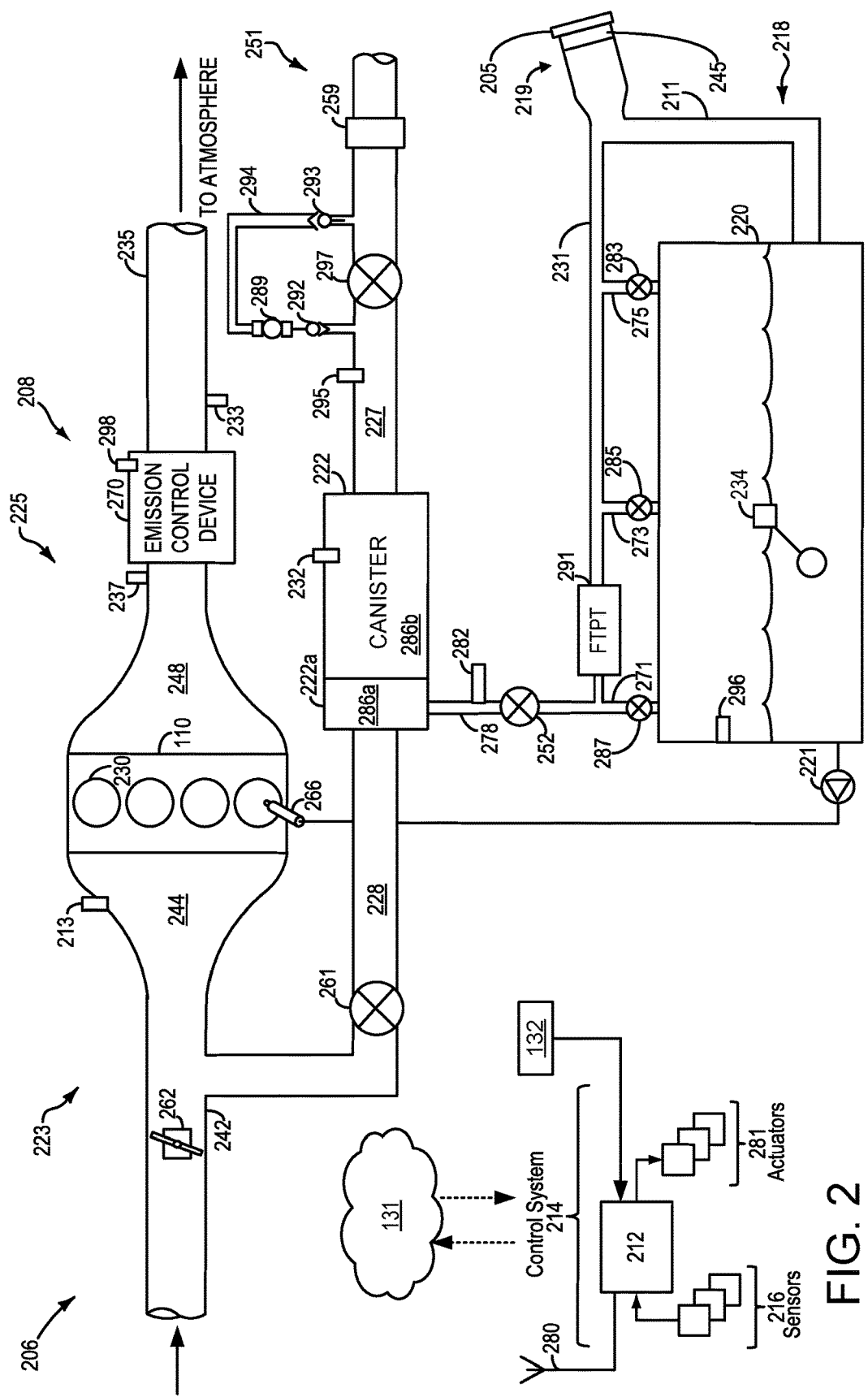
FIG. 2 schematically shows an example vehicle system with a fuel system and an evaporative emissions system.
Figure 3:
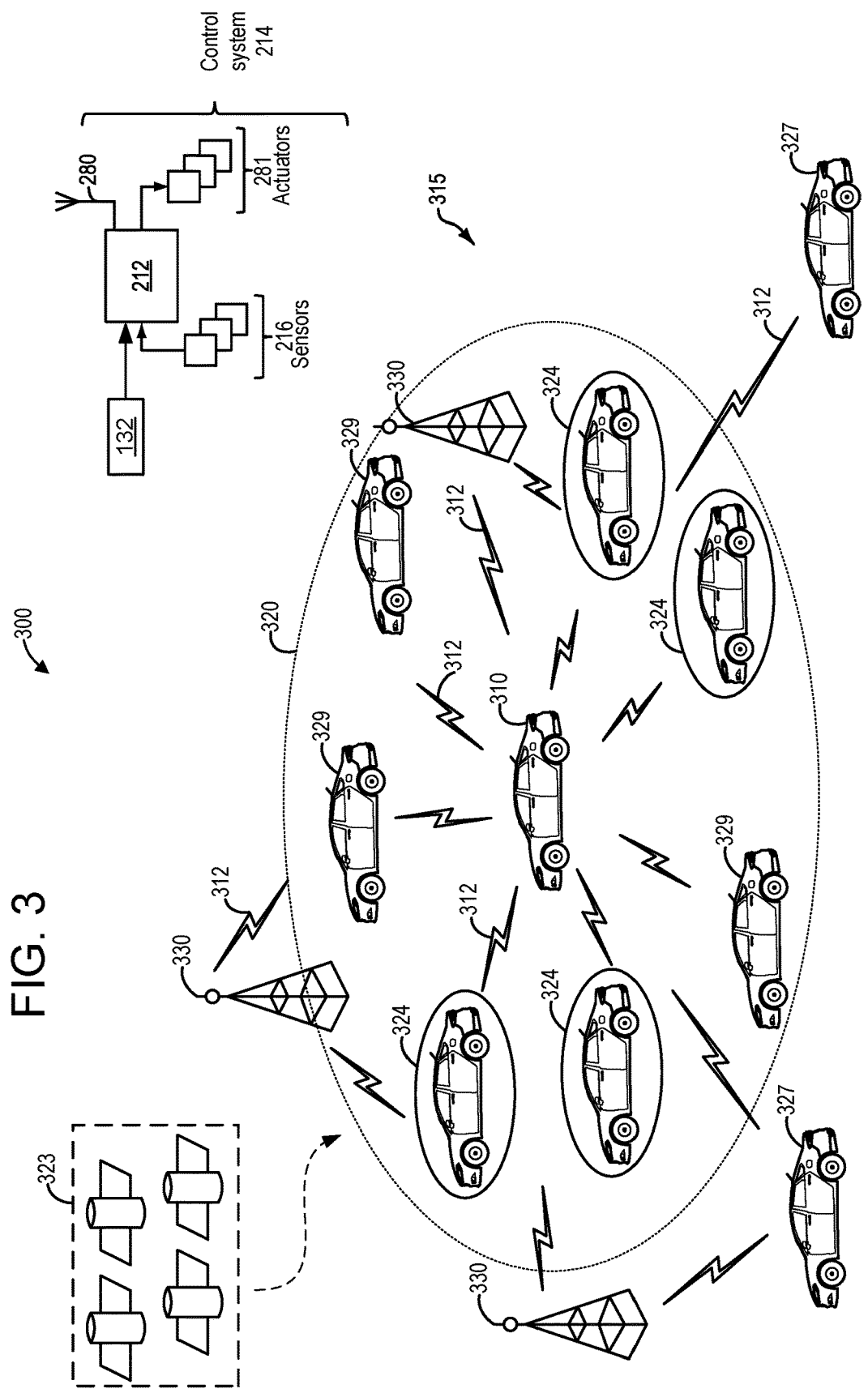
FIG. 3 schematically illustrates a system and methods for determining a presence or absence of undesired evaporative emissions stemming from a vehicle fuel system based on crowd data.

FIG. 2 shows a schematic depiction of a vehicle system 206. It may be understood that vehicle system 206 may comprise the same vehicle system as vehicle system 100 depicted at FIG. 1. The vehicle system 206 includes an engine system 208 coupled to an emissions control system (evaporative emissions system) 251 and a fuel system 218. It may be understood that fuel system 218 may comprise the same fuel system as fuel system 140 depicted at FIG. 1. Emission control system 251 includes a fuel vapor container or canister 222 which may be used to capture and store fuel vapors. In some examples, vehicle system 206 may be a hybrid electric vehicle system. However, it may be understood that the description herein may refer to a non-hybrid vehicle, for example a vehicle equipped with an engine and not an motor that can operate to at least partially propel the vehicle, without departing from the scope of the present disclosure.

The engine system 208 may include an engine 110 having a plurality of cylinders 230. The engine 110 includes an engine air intake 223 and an engine exhaust 225. The engine air intake 223 includes a throttle 262 in fluidic communication with engine intake manifold 244 via an intake passage 242. Further, engine air intake 223 may include an air box and filter (not shown) positioned upstream of throttle 262. The engine exhaust system 225 includes an exhaust manifold 248 leading to an exhaust passage 235 that routes exhaust gas to the atmosphere. The engine exhaust system 225 may include one or more exhaust catalyst 270, which may be mounted in a close-coupled position in the exhaust. In some examples, an electric heater 298 may be coupled to the exhaust catalyst, and utilized to heat the exhaust catalyst to or beyond a predetermined temperature (e.g. light-off temperature). One or more emission control devices may include a three-way catalyst, lean NOx trap, diesel particulate filter, oxidation catalyst, etc. It will be appreciated that other components may be included in the engine such as a variety of valves and sensors. For example, a barometric pressure sensor 213 may be included in the engine intake. In one example, barometric pressure sensor 213 may be a manifold air pressure (MAP) sensor and may be coupled to the engine intake downstream of throttle 262. Barometric pressure sensor 213 may rely on part throttle or full or wide open throttle conditions, e.g., when an opening amount of throttle 262 is greater than a threshold, in order accurately determine BP.

Fuel system 218 may include a fuel tank 220 coupled to a fuel pump system 221. It may be understood that fuel tank 220 may comprise the same fuel tank as fuel tank 144 depicted above at FIG. 1. In an example, fuel tank 220 comprises a steel fuel tank. In some examples, the fuel system may include a fuel tank temperature sensor 296 for measuring or inferring a fuel temperature. The fuel pump system 221 may include one or more pumps for pressurizing fuel delivered to the injectors of engine 110, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system (referred to herein as evaporative emissions system) 251 which includes a fuel vapor canister 222 via vapor recovery line 231, before being purged to the engine air intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves may be positioned in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some examples, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some examples, refueling lock 245 may be a filler pipe valve located at a mouth of fuel filler pipe 211. In such examples, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some examples, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In examples where refueling lock 245 is locked using an electrical mechanism, refueling lock 245 may be unlocked by commands from controller 212, for example, when a fuel tank pressure decreases below a pressure threshold. In examples where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222, as discussed. The fuel vapor canisters may be filled with an appropriate adsorbent 286b, such that the canisters are configured to temporarily trap fuel vapors (including vaporized hydrocarbons) during fuel tank refilling operations and during diagnostic routines, as will be discussed in detail below. In one example, the adsorbent 286b used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent 286a in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and canister load may be estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve 297 coupled within vent line 227. When included, the canister vent valve 297 may be a normally open valve, so that fuel tank isolation valve 252 (FTIV) may control venting of fuel tank 220 with the atmosphere. FTIV 252 may be positioned between the fuel tank and the fuel vapor canister 222 within conduit 278. FTIV 252 may be a normally closed valve, that when opened, allows for the venting of fuel vapors from fuel tank 220 to fuel vapor canister 222. Fuel vapors may then be vented to atmosphere, or purged to engine intake system 223 via canister purge valve 261.

In some examples, vent line 227 may include a hydrocarbon sensor 295. Such a hydrocarbon sensor may be configured to monitor for a presence of hydrocarbons in the vent line, and if detected, mitigating actions may be undertaken to prevent undesired bleed-emissions from reaching atmosphere.

Fuel system 218 may be operated by controller 212 in a plurality of modes by selective adjustment of the various valves and solenoids. It may be understood that control system 214 may comprise the same control system as control system 190 depicted above at FIG. 1. For example, the fuel system may be operated in a fuel vapor storage mode (e.g., during a fuel tank refueling operation and with the engine not combusting air and fuel), wherein the controller 212 may open isolation valve 252 (when included) while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252 (when included), while maintaining canister purge valve 261 closed, to depressurize the fuel tank before allowing enabling fuel to be added therein. As such, isolation valve 252 (when included) may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine combusting air and fuel), wherein the controller 212 may open canister purge valve 261 while closing isolation valve 252 (when included). Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold. In some examples, purging may include additionally commanding open the FTIV, such that fuel vapors from the fuel tank may additionally be drawn into the engine for combustion.

Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device 270, temperature sensor 233, pressure sensor 291, pressure sensor 282, and canister temperature sensor 232. Other sensors such as pressure, temperature, air/fuel ratio, and composition sensors may be coupled to various locations in the vehicle system 206. As another example, the actuators may include throttle 262, fuel tank isolation valve 252, canister purge valve 261, and canister vent valve 297. The control system 214 may include a controller 212. The controller may receive input data from the various sensors, process the input data, and trigger the actuators in response to the processed input data based on instruction or code programmed therein corresponding to one or more routines. Example control routines are described herein with regard to FIGS. 4-5 and FIGS. 7-10.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors, or via expiration of a timer set such that when the timer expires the controller is returned to the awake mode. In some examples, the opening of a vehicle door may trigger a return to an awake mode. In other examples, the controller may need to be awake in order to conduct such methods. In such an example, the controller may stay awake for a duration referred to as a time period where the controller is maintained awake to perform extended shutdown functions, such that the controller may be awake to conduct evaporative emissions test diagnostic routines.

Undesired evaporative emissions detection routines may be intermittently performed by controller 212 on fuel system 218 and/or evaporative emissions system 251 to confirm that undesired evaporative emissions are not present in the fuel system and/or evaporative emissions system. As such, evaporative emissions detection routines may be performed while the engine is off (engine-off test) using engine-off natural vacuum (EONV) generated due to a change in temperature and pressure at the fuel tank following engine shutdown after a drive cycle. However, for a hybrid vehicle application, there may be limited engine run time, which may result in situations where EONV tests may not be robust due to a lack of heat rejection from the engine to the fuel tank. Similarly, evaporative emissions detection routines may be performed while the engine is running by using engine intake manifold vacuum to evacuate the evaporative emissions system and/or fuel system, but such opportunities may be sparse in a hybrid vehicle application.

Thus, undesired evaporative emissions detection routines may in some examples include a vacuum pump. For example, evaporative emissions test diagnostics may in some examples include an evaporative level check module (ELCM) (not shown), communicatively coupled to controller 212. Such an ELCM may be coupled to vent 227, between canister 222 and atmosphere. Such an ELCM may include a vacuum pump for applying negative pressure to the fuel system and/or evaporative emissions system when administering a test for the presence or absence of undesired evaporative emissions. Such an ELCM may additionally include a reference orifice, and a pressure sensor. Thus, a reference check may be performed whereby a vacuum may be drawn on the reference orifice. Following the reference check, the fuel system and/or evaporative emissions system may be evacuated by the ELCM vacuum pump, such that in the absence of undesired evaporative emissions, the vacuum may pull down to the reference check vacuum level.

However, the inventors herein have recognized that the use of an ELCM such as that described above may increase costs during manufacturing, which may be desirable to avoid. Thus, to conduct undesired evaporative emissions detection routines, a vacuum pump 289 may be configured in a vacuum pump conduit 294. The vacuum pump may comprise a rotary vane pump, a diaphragm pump, a liquid ring pump, a piston pump, a scroll pump, a screw pump, a wankel pump, etc., and may be understood to be in parallel with the CVV 297. The vacuum pump conduit may be configured to route fluid flow (e.g. air and fuel vapors) from vent line 227, around canister vent valve 297. Vacuum pump conduit 294 may include a first check valve (CV1) 292, and second check valve (CV2) 293. When the vacuum pump 289 is activated, air may be drawn from vent line 227 between canister 222 and CVV 297, through vacuum pump conduit 294, back to vent line 227 at a position between canister vent valve 297 and atmosphere. In other words, the vacuum pump may be activated to evacuate the evaporative emissions system 251, and may further evacuate fuel system 218, provided that FTIV 252 is commanded open via the controller. CV1 292 may comprise a pressure/vacuum-actuated valve that may open responsive to activating the vacuum pump to evacuate the fuel system and/or evaporative emissions system, and which may close responsive to the vacuum pump 289 being deactivated, or turned off. Similarly, CV2 may comprise a pressure/vacuum-actuated valve. When the vacuum pump 289 is activated to evacuate the fuel system and/or evaporative emissions system, CV2 293 may open to allow fluid flow to be routed from vacuum pump conduit 294 to atmosphere, and which may close responsive to the vacuum pump 289 being turned off. It may be understood that CVV 297 may be commanded closed in order to evacuate the fuel system and/or evaporative emissions system via the vacuum pump 289.

As discussed above, an ELCM may include a reference orifice that enables a determination of a vacuum level that, if achieved when evacuating the fuel system and/or evaporative emissions system, is indicative of an absence of undesired evaporative emissions. However, in the vehicle system 206, where the ELCM is not included but where the vacuum pump 289 is included, there may not be a reference orifice. Thus, additional calibrations may be utilized in order to determine vacuum thresholds for indicating a presence or absence of undesired evaporative emissions. For example, there may be a 3D lookup table stored at the controller, which may enable determination of thresholds as a function of ambient temperature and fuel level. In this way, the reference orifice may not be included, which may reduce costs associated with including an ELCM.

Furthermore, as discussed, an ELCM may include a pressure sensor. In the example vehicle system 206, a pressure sensor 282 is included, positioned in conduit 278. Thus, it may be understood that FTIV 252 is bounded by a fuel tank pressure sensor 291 (fuel tank pressure transducer) and pressure sensor 282 positioned in conduit 278 between FTIV 252 and canister 222. In this way, under conditions where the FTIV is closed, pressure sensor 282 may monitor pressure in the evaporative emissions system, and pressure sensor 291 may monitor pressure in the fuel system.

Thus, by employing the vacuum pump 289 in vacuum pump conduit 294, including CV1 292 and CV2 293, along with pressure sensor 282, manufacturing costs associated with including a means for evacuating the fuel system and evaporative emissions system during engine-off conditions, may be reduced.

As discussed, CVV 297 may function to adjust a flow of air and vapors between canister 222 and the atmosphere, and may be controlled during or prior to diagnostic routines. For example, the CVV may be opened during fuel vapor storing operations (for example, during fuel tank refueling) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In the example vehicle system 206, the configuration of the vacuum pump 289 positioned in vacuum pump conduit 294 may allow for purging operations and refueling operations to be conducted without an undesirable additional restriction (the pump 289, and check valves CV1, CV2). In other words, during purging and refueling operations, the CVV may be commanded open, where flow of fluid through vacuum pump conduit 294 may be prevented via the check valves (CV1, CV2) and with the vacuum pump 289 deactivated.

In some examples, CVV 297 may be a solenoid valve wherein opening or closing of the valve is performed via actuation of a canister vent solenoid. In particular, the canister vent valve may be a normally open valve that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed may be reduced.

Thus, an example of a test diagnostic for determining a presence or absence of undesired evaporative emissions using vacuum pump 289 may comprise closing the CVV and CPV, and activating the vacuum pump to evacuate the evaporative emissions system with the FTIV closed. If a threshold vacuum is reached (monitored via pressure sensor 282), an absence of gross undesired evaporative emissions may be indicated. Responsive to the indication of the absence of gross undesired evaporative emissions, the vacuum pump 289 may be stopped, or deactivated. With the vacuum pump 289 deactivated, CV1 292 (and CV2 293) may close, thus sealing the evaporative emissions system from atmosphere. Responsive to sealing the evaporative emissions system from atmosphere, pressure bleed-up may be monitored, and if pressure bleed-up is below a pressure bleed-up threshold, or if a pressure bleed-up rate is less than a pressure bleed-up rate threshold, an absence of non-gross undesired evaporative emissions in the evaporative emissions system may be indicated.

In similar fashion, the vacuum pump 289 may be utilized to evacuate the fuel system, with the FTIV open (e.g. actuated open via a command from the controller). If a threshold vacuum is reached (monitored via either pressure sensor 282 or fuel tank pressure transducer 291), then an absence of gross undesired evaporative emissions may be indicated. Responsive to the indication of the absence of gross undesired evaporative emissions stemming from the fuel system, the fuel system may be sealed via commanding closed the FTIV (e.g. actuating closed the FTIV via a command from the controller), and pressure bleed-up in the fuel system may be monitored. Responsive to an indication that pressure bleed-up is less than a pressure bleed-up threshold, or if a pressure bleed-up rate is less than a pressure bleed-up rate threshold, an absence of non-gross undesired evaporative emissions in the fuel system may be indicated (provided that the evaporative emissions system is known to be free from undesired evaporative emissions).

However, as discussed above, there may be circumstances where pressure bleed-up may be adversely impacted via fuel vaporization. For example, at high ambient temperatures or high fuel temperatures, fuel vaporization may significantly contribute to bleed-up, which may confound the interpretation of the diagnostic, and which may in some examples result in false failures, or indications of the presence of undesired evaporative emissions where in fact, the fuel system and/or evaporative emissions system are free from the presence of undesired evaporative emissions. The inventors have herein recognized these issues, and have developed methodology to avoid such issues, as will be discussed in detail below with regard to FIGS. 4-5 and FIGS. 7-10. Briefly, such methodology may include evacuating the fuel system and/or evaporative emissions system to variable levels of target vacuum (e.g. negative pressure with respect to atmospheric pressure), where the variable levels of target vacuum are a function of ambient temperature and canister load. For example, consider a situation where ambient temperature is high (e.g. 90° F.), but canister load is low (e.g.

10% or less full of fuel vapor). In such a condition, a greater vacuum (e.g. more negative with respect to atmosphere) may be drawn on the fuel system and/or evaporative emissions system, than under conditions where temperature is low (e.g. 50° F.), such that there may be more "signal-to-noise" for the bleed-up portion of a test. In other words, by drawing a larger vacuum under conditions of high ambient temperature, even if the high ambient temperature results in fuel vaporization that counters the vacuum subsequent to sealing the fuel system and/or evaporative emissions system from atmosphere, such fuel vaporization may not adversely impact the results of the diagnostic.

In some examples for a vehicle with a sealed fuel tank except for during refueling events and certain diagnostic routines, an undesired evaporative emissions detection routine on the sealed fuel system may comprise an indication of standing pressure or vacuum in the fuel system greater than a threshold pressure or vacuum, in the absence of introduced pressure or vacuum from a pump or engine intake manifold vacuum, etc. However, there may be circumstances where there is not standing pressure or vacuum, where it may not be clear whether the absence of standing pressure or vacuum is the result of the presence of undesired evaporative emissions, or the result of ambient temperatures and vehicle operating conditions such that the fuel system is not holding pressure or vacuum above the threshold. For example, during the course of a diurnal cycle, temperature fluctuations may result in circumstances where the fuel system is not holding pressure or vacuum. In such a case, there may be opportunity to conduct a vacuum pump-based test for undesired evaporative emissions, as described above. However, such an action may not always be desirable, as such action of evacuating the fuel system via the vacuum pump may draw fuel vapors into the canister 222, which may result in further loading of the fuel vapor canister. The inventors have recognized this issue, and have developed methodology to address such an issue, discussed in detail below with regard to FIGS. 3-4, and FIG. 7. Briefly, a method may include, under conditions where the fuel system is not holding pressure or vacuum greater than the threshold pressure or vacuum, maintaining the fuel system sealed, retrieving data related to fuel tank pressure from a crowd of vehicles within a predetermined distance of the vehicle being diagnosed, and indicating the absence of fuel tank degradation responsive to fuel tank pressure from the crowd of vehicles correlating (e.g. within 5%) with fuel tank pressure from the vehicle being diagnosed. In this way, the vehicle fuel system may be diagnosed without further loading of the fuel vapor canister. Such a method may be particularly useful under conditions where ambient temperature is high and canister load is high, discussed in further detail below.

In yet another example, there may be opportunities to conduct a test for undesired evaporative emissions stemming from the fuel system and/or evaporative emissions system that involve drawing a vacuum on the fuel system and/or evaporative emissions system while the vehicle is in operation, just prior to a key-off event. In such an example, the vehicle controller may be configured to learn common routes traveled by the vehicle, and thus may indicate expected duration of key-off events, along a particular route the vehicle is traveling. In one example, it may be desirable to conduct a test for undesired evaporative emissions, but if an EONV test or other vacuum pump-based test diagnostic were conducted, the vehicle may be restarted prior to the test completing, which may adversely impact completion rates for such test diagnostics. Thus, there may be opportunities to draw a vacuum on the fuel system and/or evaporative emissions system just prior to a key-off event, where the key-off event is predicted or inferred to be of a particular duration where an EONV test or other vacuum pump-based (e.g. where the controller wakes the vehicle at a predetermined duration after key-off to conduct the test) is not desirable. In this way, at key-off, the fuel system and/or evaporative emissions system may be sealed, and pressure bleed-up monitored to infer the presence or absence of non-gross undesired evaporative emissions stemming from the fuel system and/or evaporative emissions system. It may be understood that, in such a method, the vacuum pump may be utilized to evacuate the fuel system and/or evaporative emissions system just prior to key-off where the vehicle is being propelled in an electric-only mode of operation. Furthermore, similar to that discussed above, the vacuum drawn on the fuel system and/or evaporative emissions system may comprise a variable target vacuum, as a function of ambient temperature and canister loading state.

Thus, turning now to FIG. 3, an example illustration 300 is depicted detailing how a vehicle (referred to herein as the vehicle being diagnosed, or VD) undergoing a fuel system diagnostic, may obtain crowd information comprising one or more data sets related to fuel tank pressure in vehicles similar to the VD, to determine a presence or absence of undesired evaporative emissions stemming from the fuel system of the VD. For example, the inventors herein have recognized that it may be desirable to utilize crowd information from a number of vehicles in order to establish whether there is a presence of undesired evaporative emissions stemming from the vehicle's fuel system. As such, fuel system integrity may be diagnosed without venting the fuel tank, and without the use of onboard pumps, which may serve to reduce opportunities for loading the canister, may reduce battery usage, etc. Such crowd information may comprise one or more of a vehicle-to-vehicle (V2V) network, or a vehicle-to-infrastructure-to-vehicle (V2I2V) network, for example. Accordingly, FIG. 3 shows a vehicle 310 (VD 310) that is to be diagnosed for a presence or absence of undesired evaporative emissions stemming from the fuel system, in wireless communication 312 with a number of other vehicles 315 (e.g., V2V). It may be understood that vehicle 310 may comprise the same vehicle as vehicle propulsion system 100 depicted at FIG. 1 and/or vehicle system 206 depicted at FIG. 2. Vehicle 310 may include control system 214, including controller 212, as discussed above with regard to FIG. 2. Wireless communication device 280 may be coupled to controller 212, as discussed, for enabling wireless communication between vehicle 310 and vehicles 315. Furthermore, vehicle 310 may include a navigation device 132 (e.g., GPS), where the navigation device may be configured for receiving information via GPS satellites 323.

While not explicitly shown, it may be understood that the other vehicles 315 may also include components as described for vehicle 310. For example, vehicles 315 may similarly include control systems with controllers receiving information from a plurality of sensors, and where commands may be sent from the controllers to a plurality of actuators. Furthermore, vehicles 315 may include wireless communication devices for sending and receiving wireless communication between vehicles or infrastructures.

Vehicle 310 may send and retrieve information wirelessly via V2V or V2I2V technology from vehicles 315 within a predetermined distance 320 from vehicle 310. For example, vehicles 327 (where vehicles 327 are a subset of vehicles 315) may be excluded from having information retrieved from those vehicles, as they are outside of the predetermined distance 320 from vehicle 310. The predetermined distance may in some examples be set such that the vehicles from which information/data is to be retrieved are likely to be experiencing a very similar ambient temperature/humidity, and very similar weather as the vehicle being diagnosed (e.g., 310).

Of the vehicles within the predetermined distance 320 from the vehicle to be diagnosed 310, it may be further determined which vehicles to utilize information/data from. In other words, of the vehicles within the predetermined distance 320 from the vehicle to be diagnosed 310, only a subset of those vehicles may make up a select crowd or crowd 324 that the one or more data sets related to fuel tank pressure may be retrieved from, to determine a presence or absence of undesired evaporative emissions stemming from the fuel system of the VD. The details of what may constitute such a select crowd 324 will be elaborated in detail below with regard to the method illustrated in FIG. 7. Briefly, selection criteria for the crowd 324 may be based on vehicle make/model (e.g. similar make/model to the vehicle being diagnosed), whether a vehicle's fuel tank comprises a sealed fuel tank, a fuel level within a predetermined fuel level range, whether or not the vehicle is within a proximity to structures that may affect temperature/ambient conditions experienced by the vehicle, whether the vehicle is in a key-off condition, time since key-off, fuel tank temperature, engine run-time prior to a key-off event, etc. As such, vehicles within the predetermined distance 320 that are not identified as making up the select crowd 324 may be termed excluded vehicles 329.

Subsequent to identification of the select crowd 324, one or more data sets comprising information related to fuel tank pressure may be retrieved from vehicles 315 by vehicle 310, via V2V or V2I2V technology. In one example, fuel tank pressure data comprising a predetermined time frame may be obtained from each of the vehicles (e.g., 310 and 315). More specifically, it may be understood that, for vehicles with sealed fuel tanks, temperature fluctuations throughout a 24-hour period (e.g., diurnal cycle) may result in pressure changes within such sealed fuel tanks. As such, by retrieving data related to fuel tank pressure from each of the vehicles' (e.g., 310, 315) over a predetermined time frame, a pattern of fuel tank pressure (e.g., direction and magnitude) may be obtained. In some examples, the controller of vehicle 310 may average the fuel tank pressure data to arrive at a mean fuel tank pressure for select crowd 324. Such information on the direction (e.g. positive pressure with respect to atmosphere or negative pressure with respect to atmosphere) and magnitude (e.g. how positive, or how negative) of fuel tank pressure corresponding to the select crowd 324 may next be compared (via the controller of vehicle 310) to data obtained on fuel tank pressure for the vehicle being diagnosed 310. If fuel tank pressure data obtained from the vehicle being diagnosed 310 correlates with the fuel tank pressure data obtained from the select crowd 324, it may be determined that there is an absence of undesired evaporative emissions stemming from the fuel tank of the vehicle being diagnosed 310. In such an example fuel tank pressure data from the select crowd 324 and fuel tank pressure data from the vehicle being diagnosed 310 being "correlated" may include the fuel tank pressure data from the vehicle being diagnosed 310 being within a predetermined threshold (e.g. within 5% or less) of the fuel tank pressure data from vehicles comprising the select crowd. However, if fuel tank pressure in the vehicle being diagnosed 310 does not correlate (e.g. differing by greater than 5%) with the fuel tank pressure data obtained from the select crowd 324, it may be determined that there is a presence of undesired evaporative emissions stemming from the fuel system of the vehicle being diagnosed 310.

It may be understood that the methodology depicted above with regard to FIG. 3 may be applicable to vehicles that are in a key-off state, and not being propelled via either an on-board energy storage device such as a battery, or by a vehicle engine. For example, if the vehicle is in operation, even if the engine is not being operated, driving conditions may result in significant fuel slosh events in the fuel tank which may contribute to pressure changes as indicated by the FTPT. Such pressure changes based on driving conditions may contribute significantly to adding noise factors to any analysis of crowd-based fuel tank diagnostics, thus rendering such an approach susceptible to error. As such, it may be understood that the methodology described herein relates to vehicles in a keyed-off state, and not to vehicles in operation.

Thus, the general methodology depicted in FIG. 3 constitutes a high-level example illustration for how a fuel system diagnostic may be conducted, based on crowd information obtained via V2V or V2I2V technology. Such methodology will be further discussed in conjunction with the methods depicted herein and with regard to FIG. 4 and FIG. 7.

Turning now to FIG. 4, a high-level flow chart for determining whether to conduct a variable vacuum-based diagnostic for undesired evaporative emissions, or a fuel system diagnostic based on crowd data, is shown. More specifically, method 400 may be utilized responsive to a key-off event, to indicate a canister loading state and to retrieve forecast weather conditions. Based on the indicated canister loading state and the retrieved forecast weather conditions, it may be determined as to whether to conduct the variable vacuum-based test, or to proceed with the fuel system diagnostic based on crowd data. Method 400 will be described in reference to the systems described in FIGS. 1-3, though it should be understood that method 400 may be applied to other systems without departing from the scope of this disclosure. Method 400 may be carried out by a controller, such as controller 212, and may be stored as executable instructions in non-transitory memory. Instructions for carrying out method 400 and the rest of the methods included herein may be executed by the controller based on instructions stored on a memory of the controller and in conjunction with signals received from sensors of the vehicle system, such as the sensors described above with reference to FIGS. 1-3. The controller may employ fuel system and evaporative emissions system actuators such as FTIV (e.g., 252), vacuum pump (e.g. 289), CVV (e.g. 297), etc., according to the methods depicted below.

Method 400 begins at 405 by evaluating current vehicle operating conditions. Operating conditions may be estimated, measured, and/or inferred, and may include ambient conditions, such as temperature, humidity, barometric pressure, etc., engine conditions, such as engine operating status, engine speed, engine load, etc., as well as fuel system conditions, such as fuel level, fuel tank pressure, etc. Continuing at 410, method 400 may include indicating whether a key-off event is indicated. A key-off event may be understood to comprise an event where the vehicle system is deactivated, or turned off. If, at 410, a key-off event is not indicated, method 400 may proceed to 415. At 415, method 400 may include maintaining current vehicle operating conditions. For example, if the vehicle is in operation with the engine running, the engine may be maintained in its current operational status. If the vehicle is being propelled, at least in part, via a motor, then such conditions may be maintained, etc. Method 400 may then end.

Returning to 410, responsive to a key-off event being indicated, method 400 may proceed to 420. At 420, method 400 may include retrieving or indicating a loading state of the fuel vapor canister. As discussed, loading state may be inferred via temperature sensor(s) (e.g. 232) positioned in the canister, as an example. Responsive to retrieving canister loading state, method 400 may proceed to 425. At 425, method 400 may include obtaining forecast weather conditions. For example, control system 214 (e.g. 190) may be configured to receive information via the internet or other communication networks in order to obtain weather information in the vicinity of the VD, where the vicinity of the VD may include weather information within a predetermined distance (in all directions) of the VD. Such weather information may be retrieved from one or more data servers, including government and/or private data collection services that provide forecast weather data in a retrievable format. The weather information may be based on the location of the vehicle as determined by the onboard GPS in some examples. The retrieved weather data may include forecasted temperature, humidity, barometric pressure, precipitation, wind, etc. It may be understood that such retrieved forecast weather information may be communicated to the vehicle controller, where the data may be processed via the controller. In one example, the retrieved weather information or data may include forecasted weather information for the next 24 hours. In other examples, a shorter or longer amount of forecasted weather information may be retrieved.

With canister loading state and forecast weather conditions retrieved via the controller, method 400 may proceed to 430. At 430, method 400 may include indicating whether conditions are indicated to be met for conducting a variable vacuum diagnostic. Conditions being met for conducting the variable vacuum diagnostic may include an indication that a predetermined amount of time has elapsed since a prior diagnostic for the presence or absence of undesired evaporative emissions stemming from the fuel system and/or evaporative emissions system. Conditions being met for conducting the variable vacuum diagnostic may include an indication that the key-off event is likely to comprise a time duration greater than a predetermined time duration threshold. For example, the predetermined time duration threshold may include an amount of time sufficient to conduct the variable vacuum diagnostic, which may include sleeping the controller for a duration, then waking the controller to conduct the diagnostic. In some examples, route-learning methodology (discussed below at FIG. 8) may be utilized to infer whether a particular key-off event is likely or predicted to be greater than the predetermined time duration threshold.

Conditions being met for conducting the variable vacuum diagnostic may further include the vehicle controller querying lookup table 600 depicted at FIG. 6. FIG. 6 depicts a 3D lookup table that may be stored at the controller, which may indicate a target vacuum to pull the fuel system and/or evaporative emissions system down to for the variable vacuum diagnostic, as a function of canister loading state and ambient temperature. Specifically, there may be conditions where it is not desirable to conduct the variable vacuum diagnostic, as doing so may undesirably load the canister to a point where bleed-through emissions may be likely. In other words, conducting the variable vacuum diagnostic may include commanding open the FTIV and evacuating the fuel system to a variable vacuum level, based on canister loading state and ambient temperature (or in some examples fuel temperature), and thus there may be circumstances where such actions are not desirable due to the fact that fuel vapors from the fuel tank may load the canister to a point where bleed-through emissions are likely. Turning to FIG. 6, an example may include a situation where the canister loading state is 80% saturated, and where ambient temperature is anywhere from 50-59° F. Another example may include a situation where the canister is 70% saturated, and where ambient temperature is anywhere from 70-79° F. It may be understood that such examples illustrated at FIG. 6 are meant to be illustrative, and thus it may be further understood that such values may be different for various canister sizes, that values may differ depending on the nature of the adsorbent in the canister, etc. In example illustration 600, conditions being met for conducting the variable vacuum diagnostic may, for example, include a situation where ambient temperature is 65° F., and canister loading state is 20% saturated. Discussed herein, conditions where canister loading state and ambient temperature are such that undesirable loading of the canister may occur may be understood to comprise conditions where canister loading state and ambient temperature are above a "combination threshold". Furthermore, referring to FIG. 6, it may be understood that the variable vacuum target may be less negative (decreased) with respect to atmospheric pressure in line with lower canister loading states and lower fuel volatility, and the variable vacuum target may be more negative (increased) with respect to atmospheric pressure in line with higher canister loading states and higher fuel volatility.

Thus, returning to 430, if it is indicated that conditions are met for conducting the variable vacuum diagnostic, method 400 may proceed to 435. At 435, method 400 may include scheduling a controller wakeup time. In an example, the controller may be scheduled to be woken up one or more hours after the key-off event. For example, the controller may be scheduled to be woken up after 1 hour, 2 hours, 3 hours, 4 hours, 5 hours, or greater than 5 hours. By scheduling the wakeup time for one or more hours after the key off event, it may be understood that conditions in the fuel system and/or evaporative emissions system may be stabilized. Scheduling the wakeup time at 440 may include setting a timer, for example, where when the timer expires, the controller is triggered to an awake state.

With the wakeup time scheduled at 435, method 400 may proceed to 440. At 440, method 400 may include sleeping the controller. At 445, method 400 may include indicating if the wakeup timer has elapsed, and if not, the controller may remain asleep to conserve battery power. However, responsive to the wakeup timer elapsing, method 400 may proceed to 450. At 450, method 400 may include conducting the variable vacuum diagnostic according to FIG. 5. Method 400 may then end.

Returning to 430, responsive to conditions being indicated to not be met for conducting the variable vacuum diagnostic, method 400 may proceed to 455. At 455, method 400 may include scheduling a wakeup of the controller, similar to that discussed above at 435. In one example, the wakeup time may be the same as that described at 435, however in other examples the wakeup time may be different. The wakeup time may comprise one or more hours from the key-off event, for example, and may include setting a timer as discussed at 435. By scheduling a wakeup of the controller one or more hours after the key-off event, it may be understood that conditions in the fuel system and/or evaporative emissions system may have stabilized. For example, as discussed above, for a sealed fuel tank, if the fuel tank is holding pressure or vacuum greater than a threshold, then it may be indicate that the fuel tank is free from undesired evaporative emissions. However, while the vehicle is in operation, where fuel may continuously be sloshing around, there may consistently be pressure builds in the fuel system, such that even if there is a small source of undesired evaporative emissions, it may still be possible to build pressure to a level greater than the threshold, which may thus result in a false passing result. Similarly, if such a test were conducted just after key-off, there may be heat rejection from the engine, fuel slosh due to a hard stop, etc., which may result in pressure builds in the fuel system which may complicate any analysis of whether the fuel system is truly free from undesired evaporative emissions. Thus, by allowing the vehicle system to stabilize such issues may be avoided.

Thus, with the timer set at 455, method 400 may proceed to 460. At 460, method 400 may include sleeping the controller. Proceeding to 465, method 400 may include indicating whether the wakeup timer has elapsed. If not, then the controller may continue to remain asleep. However, responsive to the wakeup timer elapsing at 465, method 400 may proceed to 470 and may include conducting a crowd-based fuel system diagnostic according to FIG. 7. Method 400 may then end.

Turning now to FIG. 5, a high-level flow chart for conducting a variable vacuum-based diagnostic for undesired evaporative emissions stemming from a vehicle fuel system and/or evaporative emissions system, is shown. Specifically, method 500 may comprise a sub-method of method 400 depicted above at FIG. 4. However, method 500 may in some examples be used on its own, without necessarily being a sub-method of method 500. Method 500 may include first determining a presence or absence of gross and non-gross evaporative emissions in the evaporative emissions system, and then determining a presence or absence of gross and non-gross evaporative emissions in the fuel system. Such methodology may include applying a first negative pressure or first vacuum on the evaporative emissions system to conduct the diagnostic on the evaporative emissions system, and may include applying a second negative pressure or second vacuum on the fuel system to conduct the diagnostic on the fuel system. In some examples, the first vacuum and the second vacuum may be the same, however in other examples the first vacuum and the second vacuum may be different. For example, the first vacuum may be less than the second vacuum. In another example, the first vacuum may comprise a vacuum that is independent of a loading state of the fuel vapor canister and independent of ambient temperature, whereas the second vacuum may be a function of the loading state of the canister, and may further be a function of ambient temperature or fuel temperature.

Method 500 will be described in reference to the systems described in FIGS. 1-2, though it should be understood that method 500 may be applied to other systems without departing from the scope of this disclosure. Method 500 may be carried out by a controller, such as controller 212, and may be stored as executable instructions in non-transitory memory. Instructions for carrying out method 500 and the rest of the methods included herein may be executed by the controller based on instructions stored on a memory of the controller and in conjunction with signals received from sensors of the vehicle system, such as the sensors described above with reference to FIGS. 1-2. The controller may employ fuel system and evaporative emissions system actuators such as FTIV (e.g., 252), vacuum pump (e.g. 289), CVV (e.g. 297), CPV (e.g. 261), etc., according to the methods depicted below.

Method 500 begins at 503 and may include sealing or maintaining sealed the fuel system, and may include closing the CVV. For example, the controller may send a signal to the CVV, actuating it closed. Proceeding to 506, method 500 may include evacuating the evaporative emissions system (e.g. 251) for a predetermined duration. More specifically, vacuum pump 289 may be actuated on, to drawn a vacuum on the evaporative emissions system, but where the fuel system is not evacuated due to the closed FTIV. In one example, evacuating the evaporative emissions system may include drawing pressure down to a predetermined negative pressure, for example −8 InH2O. Such an example is meant to be illustrative, and other predetermined negative pressure may be utilized. The predetermined negative pressure may be independent of canister loading state, and ambient temperature, as with the fuel tank closed, the vacuum drawn on the evaporative emissions system may not further load the canister. Furthermore, when the applied vacuum is relieved, fresh air may be drawn into the canister, thus drawing any hydrocarbons that were drawn from the canister toward atmosphere during the evacuating of the evaporative emissions system, back to the canister. In this way, evacuation of the evaporative emissions system may be independent of canister loading state and ambient temperature.

With the vacuum pump activated to evacuate the evaporative emissions system, method 500 may proceed to 509. At 509, method 500 may include indicating whether the threshold vacuum, or predetermined negative pressure, has been reached. For example, pressure in the evaporative emissions system may be monitored via pressure sensor 282. If, at 509, the threshold vacuum has not been reached, method 500 may proceed to 512, where it may be indicated as to whether the predetermined duration of time has elapsed. Specifically, the predetermined time duration may comprise an amount of time where, in the absence of gross undesired evaporative emissions, it is expected that the threshold negative pressure would be reached in the evaporative emissions system. If, at 512, the predetermined duration has not elapsed, then the vacuum pump may continue to evacuate the evaporative emissions system. However, if at 512, the predetermined duration is indicated to have elapsed, then method 500 may proceed to 515. At 515, method 500 may include indicating a presence of gross undesired evaporative emissions stemming from the evaporative emissions system. In some examples, gross undesired evaporative emissions may comprise undesired evaporative emissions stemming from a source greater than 0.04". In other words, the inability of the vacuum pump to pull down pressure in the evaporative emissions system to the predetermined or threshold negative pressure, may indicate the presence of gross undesired evaporative emissions.

Accordingly, method 500 may proceed to 518. At 518, method 500 may include aborting the variable vacuum-based test diagnostic. In other words, because of the indication of the presence of gross undesired evaporative emissions stemming from the evaporative emissions system, it may not be desirable to conduct the variable vacuum-based diagnostic on the fuel system, as any vacuum applied on the fuel system may not pull down to a desired negative pressure, due to the presence of gross undesired evaporative emissions in the evaporative emissions system.

Proceeding to 521, method 500 may include updating the vehicle operating conditions to reflect the indication of gross undesired evaporative emissions, and may further include scheduling follow-up tests for fuel system diagnostics. For example, a malfunction indicator light (MIL) may be illuminated on the vehicle dash, alerting the vehicle operator of a request to service the vehicle. Furthermore, a canister purge schedule may be updated to purge the canister frequently, to avoid undesired evaporative emissions being released to atmosphere. In some examples, the vehicle may be operated in an electric mode as frequently as possible, such that fuel use is minimized, which may prevent refueling events which may otherwise potentially direct fuel tank vapors to atmosphere. Furthermore, since the fuel system was not able to be diagnosed, follow-up tests for fuel system diagnostics may be scheduled. For example, a crowd-based fuel system diagnostic (see FIG. 7) may be scheduled, or the fuel system may be diagnosed under conditions of standing pressure or vacuum in the fuel system. Method 500 may then end.

Returning to 509, responsive to the threshold vacuum being reached during evacuating the evaporative emissions system, method 500 may proceed to 524. At 524, method 500 may include indicating an absence of gross undesired evaporative emissions, and may further include stopping evacuating the evaporative emissions system. In other words, the vacuum pump may be deactivated, or turned off. With the vacuum pump turned off, it may be understood the CV1 (e.g. 292), and CV2 (e.g. 293) may close, and thus with the CVV closed (and CPV closed), the evaporative emissions system may be sealed from atmosphere and from engine intake.

With the evaporative emissions system sealed from atmosphere, method 500 may proceed to 527. At 527, method 500 may include indicating whether pressure bleed-up in the evaporative emissions system is greater than a threshold bleed-up, or if a rate of pressure bleed-up is greater than a pressure bleed-up rate threshold. If yes, method 500 may proceed to 530, and may include indicating the presence of non-gross undesired evaporative emissions stemming from the evaporative emissions system. Alternatively, if the answer at 527 is no, then method 500 may proceed to 533, and may include indicating the absence of non-gross undesired evaporative emissions. Non-gross undesired evaporative emissions may comprise undesired evaporative emissions stemming from a source 0.02" or less, for example. In either case, method 500 may proceed to 536, and may include updating vehicle operating conditions based on the results of the pressure bleed-up test. For example, if non-gross undesired evaporative emissions are indicated, then a MIL may be illuminated at the vehicle dash, alerting the vehicle operator of a request to service the vehicle. The vehicle may be operated in electric-only mode as frequently as possible, to avoid situations (e.g. refueling events) where fuel vapors may be undesirably released to atmosphere. A canister purge schedule may be updated, to reflect the presence of non-gross undesired evaporative emissions. For example, purging operations may be conducted more frequently, or quickly after a refueling event, to reduce the opportunity for the potential release of undesired evaporative emissions to atmosphere. Alternatively, in the case that the evaporative emissions system is indicated to be free from gross, and non-gross undesired evaporative emissions, such an indication may be stored at the controller, and the vehicle operating conditions may be maintained in their current status.

Even if the presence of non-gross undesired evaporative emissions have been indicated, method 500 may still include conducting the variable vacuum-based diagnostic, as will be discussed in detail below. More specifically, because only non-gross undesired evaporative emissions are indicated, it may be expected that the vacuum pump may be capable of drawing the fuel system down to a predetermined negative pressure (where the predetermined negative pressure may be variable as a function of canister loading state and ambient temperature and/or fuel temperature).

Accordingly, proceeding to 539, method 500 may include indicating whether an absolute value of pressure in the fuel system is already greater than a predetermined threshold. Pressure in the fuel system may be monitored, for example, via a fuel tank pressure transducer (e.g. 291). For example, it may be indicated whether a negative pressure in the fuel system is greater (e.g. more negative) than a fuel system negative pressure threshold, or whether a positive pressure in the fuel system is greater (e.g. more positive) than a fuel system positive pressure threshold. For example, the positive pressure threshold and the negative pressure threshold may comprise thresholds where, if reached, may indicate the absence of fuel system undesired evaporative emissions. Accordingly, if pressure in the fuel system is greater than the positive pressure threshold, or greater than the negative pressure threshold, method 500 may proceed to 542, and may include indicating the absence of fuel system undesired evaporative emissions. Such a result may be stored at the controller. Responsive to such an indication, the negative pressure may be relieved in the evaporative emissions system at 545. More specifically, the CVV may be commanded open via the controller sending a signal to the CVV, actuating it open. In this way, pressure in the evaporative emissions system may return to atmospheric pressure.

Proceeding to 548, method 500 may include updating vehicle operating conditions, to reflect the passing result. For example, current vehicle operating conditions may be maintained responsive to the passing result. Furthermore, the controller may be put to sleep. Method 500 may then end.

Returning to 539, responsive to pressure in the fuel system not being greater than either the positive pressure threshold or the negative pressure threshold, method 500 may proceed to 551. At 551, method 500 may include commanding open the FTIV, via the controller sending a signal to the FTIV, actuating it open. With the FTIV commanded open, the fuel system may be fluidically coupled to the evaporative emissions system.

Proceeding to 554, method 500 may include evacuating the fuel system using a variable vacuum target. The variable vacuum target may be a function of lookup table 600. More specifically, the variable vacuum target may be a function of ambient temperature and fuel vapor canister loading state. As discussed at higher ambient temperatures, fuel volatility may increase, which may complicate interpretation of a pressure bleed-up portion of the fuel system diagnostic subsequent to evacuating the fuel system to a threshold negative pressure and sealing the fuel system. To avoid such issues, a greater (e.g. more negative) pressure may be applied to the fuel system at higher ambient temperatures. However, in applying greater vacuum on the fuel system, an issue becomes loading of the fuel vapor canister. In other words, the greater the negative pressure, the more potential for loading the fuel vapor canister. Thus, the amount of negative pressure applied to conduct the fuel system test diagnostic may be a function of a current canister loading state, such that the potential for release of undesired evaporative emissions to atmosphere may be reduced. It may be understood that the enabler for applying variable vacuum to the fuel system may comprise the fuel tank being comprised of steel, such that larger negative pressures may be applied to the fuel tank without compromising the fuel tank.

Thus, at 554, the vehicle controller may activate the vacuum pump (e.g. 289) to evacuate the fuel system to a target vacuum, where the target vacuum is a function of lookup table 600. It may be understood that evacuating the fuel system in such fashion evacuates the fuel system through an entirety of the fuel vapor storage canister. Accordingly, proceeding to 557, method 500 may include indicating whether the variable vacuum target has been reached within a predetermined duration. Similar to that discussed above, the predetermined duration may comprise a duration where it may be expected that the variable vacuum target may be reached, provided that the fuel system is free from gross undesired evaporative emissions. If, at 557, the variable vacuum target is not reached within the predetermined duration, then method 500 may proceed to 560. At 560, method 500 may include indicating the presence of gross undesired evaporative emissions stemming from the fuel system. Such a result may be stored at the controller, for example. In such a case, method 500 may proceed to 563, and may include stopping the evacuating of the fuel system by deactivating the vacuum pump. Furthermore, the CVV may be commanded open. In this way, the applied vacuum on the fuel system may be relieved. Proceeding to 566, method 500 may include the controller sending a signal to the FTIV, actuating it closed. Proceeding to 548, method 500 may include updating vehicle operating conditions to reflect the indication of gross undesired evaporative emissions stemming from the fuel system. For example, a MIL may be illuminated at the vehicle dash, alerting the vehicle operator of a request to service the vehicle. In some examples, due to the absence of gross undesired evaporative emissions stemming from the evaporative emissions system, but due to the presence of gross undesired evaporative emissions stemming from the fuel system, the FTIV may be commanded closed to preferentially route fuel tank vapors to the canister, rather than potentially allowing the fuel vapors to escape to atmosphere via the source of gross undesired evaporative emissions in the fuel system. In other words, by opening the FTIV, there may be less resistance to fluid flow between the fuel tank and the canister, as opposed to through the source of gross undesired evaporative emissions, such that fuel vapors may be preferentially routed to the canister rather than to atmosphere via the source of gross undesired evaporative emissions. Furthermore, at 548, the controller may be put to sleep. Method 500 may then end.

Returning to 557, if the variable vacuum target is reached within the predetermined duration, method 500 may proceed to 569. At 569, method 500 may include indicating the absence of gross undesired evaporative emissions. Furthermore, the evacuating of the fuel system may be stopped, by commanding the vacuum pump to an off configuration. Proceeding to 572, method 500 may include sealing the fuel system from atmosphere, via commanding closed the FTIV. It may be understood that the closing of the FTIV may be conducted essentially at the same time as when the vacuum pump is deactivated.

With the fuel system sealed from atmosphere, method 500 may proceed to 575, and may include indicating whether pressure bleed-up in the fuel system is greater than a pressure bleed-up threshold, or whether a pressure bleed-up rate is greater than a pressure bleed-up rate threshold. In some examples, the pressure bleed-up threshold and/or the pressure bleed-up rate threshold may be a function of ambient temperature, fuel temperature, and may further be a function of the target variable vacuum level reached during the evacuating. In other words, the thresholds may be adjusted as a function of the variable vacuum target, which is a function of ambient temperature and canister loading state. More specifically, the thresholds may be adjusted to provide for more signal-to-noise as ambient temperature, fuel temperature, fuel volatility, etc., increases. Referring to FIG. 6, consider a situation where ambient temperature is greater than 90° F. The fuel system may thus be evacuated to −28 InH2O, as at such high temperatures a significant amount of pressure bleed-up due to fuel volatility may be expected. Thus, the threshold for indicating whether the fuel system is free from undesired evaporative emissions may be adjusted according to the expected or predicted bleedup due to fuel volatility, which is further a function of ambient temperature, fuel temperature, fuel level, etc. In this way, the signal-to-noise for the test for undesired evaporative emissions may be increased, thus reducing false failures due to fuel volatility issues. Said another way, in setting the thresholds as functions of the variable vacuum target, a difference between the threshold and the variable vacuum target may increase as the variable vacuum target becomes more negative with respect to atmospheric pressure, and may decrease as the variable vacuum target becomes less negative with respect to atmospheric pressure. As one specific example, if the fuel system were evacuated to −8InH2O, then the threshold for indicating undesired evaporative emissions may be set at −6InH2O, for example, whereas if the fuel system were evacuated to −28 InH2O, the threshold for indicating undesired evaporative emissions may be set at −18 InH2O, to account for the expected bleed-up due to fuel volatility at the higher temperatures.

If, at 575, it is indicated that the answer is no, method 500 may proceed to 578, and may include indicating the absence of undesired evaporative emissions stemming from the fuel system. Responsive to such an indication, method 500 may proceed to 581. At 581, method 500 may include relieving the negative pressure applied to the fuel system. Specifically, at 581, the CVV and the FTIV may be commanded open, thus enabling the fuel system to return to atmospheric pressure. Furthermore, by commanding open the CVV and the FTIV, a partial purge of the fuel vapor canister may be conducted, as opening the CVV and the FTIV may draw fresh air in through the vent line, and through the canister, which may desorb at least a portion of fuel vapors from the canister to the fuel tank.

Responsive to pressure in the fuel system (and evaporative emissions system) reaching atmospheric pressure, method 500 may proceed to 566. At 566, method 500 may include commanding closed the FTIV via the controller sending a signal to the FTIV, actuating it closed. Proceeding to 548, method 500 may include updating vehicle operating conditions. Updating vehicle operating conditions at 548 may include indicating that the absence of undesired evaporative emissions in the fuel system, and may thus include maintaining current vehicle operating conditions to reflect the passing result. Furthermore, at 548, method 500 may include putting the controller to sleep. Method 500 may then end.

Returning to 575, responsive to pressure in the fuel system being greater than the pressure bleed-up threshold, or responsive to the pressure bleed-up rate being greater than the pressure bleed-up rate threshold, method 500 may proceed to 584. At 584, method 500 may include indicating the presence of non-gross undesired evaporative emissions stemming from the fuel system. Responsive to such an indication, method 500 may proceed to 581, and may include relieving the vacuum in the fuel system (and evaporative emissions system), by commanding open the CVV and the FTIV. As discussed, such an action may result in a partial purge of fuel vapors stored in the canister back to the fuel tank.

Subsequent to relieving the vacuum (e.g. pressure in the fuel system and evaporative emissions system returned to atmospheric pressure), method 500 may proceed to 566, and may include closing the FTIV to seal the fuel system from atmosphere. Proceeding to 548, method 500 may include updating vehicle operating conditions. For example, a MIL may be illuminated at the vehicle dash, indicating a request to service the vehicle. Further, in some examples, the FTIV may be commanded open, such that fuel vapors may be preferentially routed to the fuel vapor canister, rather than potentially escaping through the source of non-gross undesired evaporative emissions in the fuel system. In such an example, a canister purge schedule may be updated, such that the canister is purged more frequently, due to the FTIV being commanded open. At 548, method 500 may include putting the controller to sleep. Method 500 may then end.

Returning to FIG. 4, as discussed, responsive to conditions not being met for conducting the variable vacuum diagnostic, method 400 may proceed to conducting the crowd-based fuel system diagnostic, according to FIG. 7.

Thus, turning to FIG. 7, a high-level example method 700 is shown for conducting the crowd-based fuel system diagnostic. More specifically, method 700 may include first conducting a test for the presence of undesired evaporative emissions stemming from the evaporative emissions system, where the FTIV is closed, thus isolating the fuel system from the evaporative emissions system. Next, a crowd-based diagnostic may be conducted to determine the presence or absence of undesired evaporative emissions stemming from the fuel system. Importantly, such a diagnostic may be conducted without fluidically coupling the fuel system to the evaporative emissions system, which may prevent further loading of the fuel vapor canister.

Method 700 will be described in reference to the systems described in FIGS. 1-3, though it should be understood that method 700 may be applied to other systems without departing from the scope of this disclosure. Method 700 may be carried out by a controller, such as controller 212, and may be stored as executable instructions in non-transitory memory. Instructions for carrying out method 700 and the rest of the methods included herein may be executed by the controller based on instructions stored on a memory of the controller and in conjunction with signals received from sensors of the vehicle system, such as the sensors described above with reference to FIGS. 1-3. The controller may employ fuel system and evaporative emissions system actuators such as FTIV (e.g., 252), vacuum pump (e.g. 289), CVV (e.g. 297), CPV (e.g. 261), etc., according to the methods depicted below.

Method 700 begins at 701, and may include conducting a test for the presence or absence of undesired evaporative emissions stemming from the evaporative emissions system, according to the steps 503-536 of method 500. Briefly, a vacuum may be applied on the evaporative emissions system with the FTIV closed, and the presence or absence of gross undesired evaporative emissions may be indicated as a function of whether a threshold vacuum is reached during the evacuating. Responsive to an absence of gross undesired evaporative emissions, the evaporative emissions may be sealed from atmosphere, and a presence or absence of non-gross undesired evaporative emissions may be indicated based on pressure bleed-up in the sealed evaporative emissions system.

Regardless of whether there is gross undesired evaporative emissions, non-gross undesired evaporative emissions, or an absence of gross/non-gross undesired evaporative emissions, method 700 may proceed to 703. At 703, method 700 may include relieving the negative pressure in the evaporative emissions system. For example the CVV may be commanded open such that pressure in the evaporative emissions system may return to atmospheric pressure.

Proceeding to 705, method 700 may include indicating whether an absolute value of pressure in the sealed (e.g. FTIV closed) fuel system is greater than a predetermined negative pressure (with respect to atmospheric pressure), or greater than a predetermined positive pressure (with respect to atmospheric pressure). If so, then method 700 may proceed to 710, and it may be indicated that the fuel system is free from the presence of undesired evaporative emissions. Method 700 may then proceed to 715, where vehicle operating conditions may be updated. For example, responsive to the indication of the absence of fuel system undesired evaporative emissions, current vehicle operating conditions may be maintained, and the results of the test may be stored at the controller. Method 700 may then end.

Returning to 705, responsive to pressure in the fuel system being below the positive pressure threshold or negative pressure threshold, method 700 may proceed to 720. At 720, method 700 may include generating the crowd of vehicles, or the select crowd of vehicles, discussed above at FIG. 3. In some examples, the crowd of vehicles may be referred to as a plurality of vehicles, a group of vehicles, a set of vehicles, etc. To generate, or select the crowd of vehicles from which the vehicle being diagnosed (VD) may retrieve fuel tank pressure data from, the following procedure, carried out by the controller of the VD, may be utilized. For example, the VD may send a wireless request to one or more vehicles within wireless communication or within a predetermined threshold distance or radius (e.g. 320) of the VD. The wireless request may comprise a request for information from the vehicles, the information comprising data related to time since last key-off, engine run time for the most recent previous drive cycle prior to the key-off event, fuel level, vehicle make/model information, whether the vehicles have sealed fuel tanks, fuel tank pressure data, etc. Of the vehicles that receive the wireless request, it may be further determined which of the vehicles to retrieve one or more data sets related to fuel tank pressure from. It may be understood that the determined vehicles from which to retrieve the one or more data sets from may comprise the crowd, select crowd, plurality of vehicles, group of vehicles, set of vehicles, etc. The crowd may be selected as a function of vehicle make/model, for example only vehicles with a similar make/model to the vehicle being diagnosed may be considered for selection. For example, if the VD comprises a small sedan, then a large truck may be excluded from the crowd. The crowd may additionally or alternatively be selected as a function of whether the vehicle(s) have a fuel tank that is normally sealed except for events such as refueling, conducting diagnostic tests, etc. For example, vehicles that do not comprise sealed fuel tanks may be excluded from the crowd. The crowd may be additionally or alternatively selected as a function of whether the vehicle(s) have a fuel level within a predetermined fuel level range. As one example, the crowd may be selected as a function of whether the vehicle(s) fuel level is within a threshold fuel level (e.g. within 5%, or within 10%) of the fuel level indicated for the VD. Vehicles that do not have a fuel level within the threshold fuel level of the fuel level indicated for the VD may be excluded from the crowd. The crowd may additionally or alternatively be selected as a function of a time since key-off, for example a time since key-off greater than a threshold key-off duration. The threshold key-off duration may comprise a duration where any heat rejection from the engine from a previous drive cycle is no longer contributing to fuel vapor generation in the fuel tank, or is no longer affecting fuel tank temperature. For example, vehicles that have not been off for the threshold key-off duration may be excluded from the crowd.

With the vehicles comprising the crowd having been selected via the VD controller processing the wireless request, method 700 may proceed to 725. At 725, method 700 may include retrieving one or more data sets comprising fuel tank pressure from the vehicles comprising the crowd. The retrieving the one or more data sets comprising fuel tank pressure and/or one or more data sets comprising fuel level may be conducted via wireless communication between the VD controller and one or more controllers of the vehicles comprising the crowd. As discussed above with regard to FIG. 3, in some examples the data comprising fuel tank pressure data may be retrieved over a predetermined time period.

Responsive to retrieving the fuel tank pressure data from the vehicles comprising the crowd, method 700 may proceed to 730. At 730, method 700 may include processing the data retrieved from the crowd. As discussed above, in some examples the data comprising fuel tank pressure may be processed to determine a mean fuel tank pressure data for each vehicle, and may further be processed to determine mean total fuel tank pressure from all of the vehicles comprising the crowd over the predetermined time period that the data was retrieved. Similarly, a mean fuel tank pressure may be determined for the VD.

With the data retrieved from the crowd having been processed, and with the data from the VD having been processed at 730, method 700 may further include the VD controller comparing the processed fuel tank pressure data from the VD with the processed fuel tank pressure data from the crowd.

Proceeding to 735, method 700 may include indicating whether the retrieved data is correlated with the data obtained from the VD. As discussed above, fuel tank pressure data from the VD being correlated with the fuel tank pressure data from the crowd may include the fuel tank pressure data from the VD being within a threshold (e.g. within 5% or less) of the fuel tank pressure data from the crowd.

If, at 735, it is indicated that the data is correlated, method 700 may proceed to 745 and may include indicating an absence of the presence of undesired evaporative emissions stemming from the fuel system. In other words, by conducting the fuel system diagnostic based on crowd data as discussed, under conditions where fuel tank pressure in the sealed fuel tank is not experiencing pressure greater than the positive pressure threshold, or the negative pressure threshold (see step 705 of method 700), the fuel system may still be diagnosed as to whether it is likely that the fuel system has a source of undesired evaporative emissions, or not. In the case where the data is correlated, at 735, then it may be understood that fuel systems comprising the crowd are not experiencing pressure builds (positive pressure or negative pressure) greater than the positive pressure threshold, or negative pressure threshold, on average. In other words, because the data is correlated, it is likely that the vehicles (both the VD and the crowd) are experiencing a portion of the diurnal cycle where pressure in the fuel systems of such vehicles is near atmospheric pressure.

Responsive to the indication of the absence of fuel tank degradation, method 700 may proceed to 750, and may include updating vehicle operating conditions. Updating vehicle operating conditions at 750 may include recording the result comprising the indication of the absence of undesired evaporative emissions stemming from the fuel system of the VD at the VD controller (e.g. 212). Furthermore, updating vehicle operating conditions at 750 may include maintaining current evaporative emissions testing schedules, maintaining current fuel vapor canister purging schedules, maintaining current engine operating conditions (at the next key-on event), etc. In other words, the fuel system is likely to experience another test for the presence or absence of undesired evaporative emissions shortly after such an indication. Thus, in the chance that pressure in the fuel system of the VD was not greater than the positive pressure threshold, or greater than the negative pressure threshold, due to the presence of undesired evaporative emissions, another diagnostic test on the fuel system may be conducted within a short time. Furthermore, in some examples, at 750, method 700 may include putting the controller to sleep. Method 700 may then end.

Returning to 735, responsive to an indication that the fuel tank pressure data from the VD is not correlated with the data retrieved from the crowd, method 700 may proceed to 740, and may include indicating the presence of undesired evaporative emissions stemming from the fuel system of the VD. Such an indication may include setting a flag at the controller of the VD, and may further include illuminating a malfunction indicator light (MIL) at a dash of the VD, alerting the vehicle operator of the need to service the vehicle.

Proceeding to 750, method 700 may include updating vehicle operating conditions responsive to the indication of the presence of undesired evaporative emissions stemming from the fuel system. In one example, updating vehicle operating conditions may include taking mitigating actions responsive to the indication that there is the presence of undesired evaporative emissions stemming from the fuel system of the VD. Taking mitigating actions may in some examples include commanding open the FTIV (e.g. 252). By commanding open the FTIV, fuel tank vapors may be preferentially routed to the fuel vapor canister, rather than to atmosphere, as discussed above. Taking mitigating actions may further include updating a canister purge schedule to purge the canister more frequently, in the event that the FTIV is commanded open. It may be understood that, in commanding open the FTIV, the CVV (e.g. 297) may additionally be commanded open, if not already open. Furthermore, at 750, in some examples method 700 may include putting the controller to sleep. Method 700 may then end.

Accordingly, the methods described with regard to FIGS. 5-7 may enable a method comprising evacuating a fuel system of a vehicle to a variable vacuum target as a function of a volatility of fuel in a fuel tank positioned in the fuel system and a loading state of a fuel vapor storage canister configured for capturing and storing fuel vapors from the fuel tank, to conduct a test for a presence or an absence of undesired evaporative emissions stemming from the fuel system. In one example of such a method, the fuel tank may comprise a steel fuel tank. Furthermore, the volatility of fuel may be a function of one or more of current and/or forecast ambient temperature, and/or fuel temperature. In some examples, evacuating the fuel system may route fuel vapors from the fuel tank through an entirety of the fuel vapor storage canister, and where the evacuating the fuel system is conducted via a vacuum pump positioned in a vacuum pump conduit between the fuel vapor storage canister and atmosphere. The vacuum pump may be positioned in parallel with a canister vent valve positioned in a vent line between the fuel vapor storage canister and atmosphere. In such an example, the canister vent valve may be commanded to a closed configuration during the evacuating the fuel system of the vehicle to the variable vacuum target.

As one example of such a method, the variable vacuum target may decrease in line with lower canister loading states and lower volatility of fuel, and may increase in line with higher canister loading states and higher volatility of fuel. Furthermore, such a method may include not evacuating the fuel system of the vehicle to the variable vacuum target in response to an indication that doing so would load the fuel vapor canister to or beyond an undesirable level. In other words, the method may include only evacuating the fuel system to the variable vacuum target under conditions where the fuel vapor canister is loaded to below the undesirable level, such that a risk of bleed-emissions to atmosphere is reduced. Under conditions where it is indicated that evacuating the fuel system to the variable vacuum target will load the fuel vapor storage canister to or beyond the undesirable level, an alternative test for the presence or absence of undesired evaporative emissions stemming from the fuel system may be conducted. For example, the alternative test may include a crowd-based fuel system diagnostic that is a function of fuel tank pressure data from a determined crowd of vehicles.

In such a method where the fuel system is evacuated to the variable vacuum target, responsive to the variable vacuum target being reached, the fuel system may be sealed, and the presence of non-gross undesired evaporative emissions stemming from the fuel system may be indicated responsive to pressure in the fuel system reaching or exceeding a pressure bleed-up threshold, and/or in response to pressure in the fuel system rising at a bleed-up rate greater than a pressure bleed-up rate threshold, within a predetermined duration after sealing the fuel system.

The methods described above with regard to FIGS. 5-7 may additionally enable a method comprising, in a first operating condition where a loading state of a fuel vapor storage canister configured to capture and store fuel vapors from a fuel system in combination with an ambient temperature is below a combination threshold, operating the vehicle in a first mode to evacuate the fuel system to a variable vacuum level in order to conduct a first test for undesired evaporative emissions stemming from the fuel system; and in a second operating condition where the loading state of the fuel vapor storage canister in combination with the ambient temperature is above the combination threshold, operating the vehicle in a second mode to conduct a second test for undesired evaporative emissions that does not include evacuating the fuel system to the variable vacuum level.

As an example, operating the vehicle in both the first mode and the second mode may occur during a key-off condition of the vehicle.

In such an example, operating the vehicle in the first mode may include evacuating the fuel system through an entirety of the fuel vapor storage canister via a vacuum pump positioned in a vacuum pump conduit between the fuel vapor storage canister and atmosphere, where the vacuum pump is in parallel with a canister vent valve positioned in a vent line between the fuel vapor storage canister and atmosphere. In such an example, the canister vent valve may be commanded closed prior to operating the vehicle in the first mode to evacuate the fuel system to the variable vacuum level.

In another example of the method, operating the vehicle in the first mode may further comprise indicating an absence of gross undesired evaporative emissions stemming from the fuel system in response to pressure in the fuel system reaching or exceeding the variable vacuum level, then deactivating the vacuum pump and sealing the fuel system. With the fuel system sealed, a presence or of non-gross undesired evaporative emissions may be indicated in response to a pressure bleed-up in the fuel system being greater than a pressure bleed-up threshold, and/or responsive to a pressure bleed-up rate being greater than a pressure bleed-up rate threshold, within a predetermined duration subsequent to sealing the fuel system.

In another example of such a method, operating the vehicle in the second mode may include scheduling a wakeup of the controller of the vehicle to conduct the second test for undesired evaporative emissions, where the second test comprises indicating whether an absolute value of pressure in the fuel system of the vehicle is greater than a threshold, and if not, a crowd-based fuel system diagnostic may be conducted. Such a crowd-based diagnostic may involve retrieving fuel tank pressure data from a crowd of vehicles within a predetermined distance of the vehicle, comparing the fuel tank pressure data from the crowd of vehicles with fuel tank pressure data from the vehicle, and indicating undesired evaporative emissions stemming from the fuel system of the vehicle in response to the fuel tank pressure data from the crowd of vehicles not correlating with the fuel tank pressure data from the vehicle.

Still further, it may be understood that operating the vehicle in the second mode may not further load the fuel vapor storage canister.

As discussed above, there may in some examples be opportunities to conduct an evaporative emissions test on the fuel system and/or evaporative emissions system by monitoring pressure changes in the fuel system and/or evaporative emissions system after a key-off event. Such a test may comprise an EONV test, however there are many factors that can influence outcomes of such a test. Specifically, robustness of an EONV test may be a function of heat rejection from the engine during the drive cycle just prior to key-off, drive cycle aggressiveness, ambient temperature, ambient weather conditions (e.g. wind, rain, humidity, etc.). Furthermore, such a test may comprise a predetermined time duration (e.g. 45 minutes). Thus, while there may be opportunities to conduct such tests, there may be circumstances where it may not be desirable to do so. One example may include a situation where it is desired to conduct a test for the presence or absence of undesired evaporative emissions on the fuel system and/or evaporative emissions system, but where it is likely that the vehicle may be restarted prior to the test completing (e.g. restarted in less than 45 minutes). The likelihood of such a situation may be indicated, for example, if the vehicle controller is capable of learning common routes traveled via the vehicle, where it may be indicated how long a particular stop duration is predicted to last. If a predicted stop is of a short duration, it may be desirable to rapidly conduct a test for the presence or absence of undesired evaporative emissions. Such a test may include drawing a vacuum on the fuel system and/or evaporative emissions system just prior to a learned key-off event, such that a pressure-rise portion of such a test may be immediately conducted after the key-off event. Such a test will be described in detail below at FIGS. 9-10.

Accordingly, in order to conduct such a test, the vehicle controller may include methodology to learn routes commonly traveled by the vehicle. Thus, turning to FIG. 8, a high-level example method 800 for learning common driving routes driven in a vehicle, is shown. More specifically, method 800 may be utilized to learn common driving routes, and may further be utilized to learn/predict stops and stop durations associated with particular driving routes. It may be understood that "stops" herein may refer to vehicle-off events (e.g. key-off events). Time durations for learned/predicted stops corresponding to a particular driving route may be stored in lookup table(s) stored at the vehicle controller. Still further, a final destination corresponding to particular learned/predicted driving route(s) may be determined and stored in lookup table(s) stored at the vehicle controller. Such information may be utilized in order to schedule appropriate evaporative emissions test diagnostic procedures.

Method 800 will be described with reference to the systems described herein and shown in FIGS. 1-3, though it should be understood that similar methods may be applied to other systems without departing from the scope of this disclosure. Method 800 may be carried out by a controller, such as controller 212 in FIG. 2, and may be stored at the controller as executable instructions in non-transitory memory. Instructions for carrying out method 800 and the rest of the methods included herein may be executed by the controller based on instructions stored on a memory of the controller and in conjunction with signals received from sensors of the engine system, such as the sensors described above with reference to FIGS. 1-2. The controller may employ fuel system and evaporative emissions system actuators, canister vent valve (CVV) (e.g. 297), canister purge valve (CPV) (e.g. 261), etc., according to the methods depicted below.

Method 800 begins at 805 and may include indicating whether a key-on event is indicated. A key-on event may comprise an ignition key being utilized to start a vehicle either in an engine-on mode, or an electric only mode of operation. In other examples, a key-on event may comprise an ignition button on the dash, for example, being depressed. Other examples may include a key-fob (or other remote device including smartphone, tablet, etc.) starting the vehicle in either an engine-on mode, or an electric-only mode of operation. If, at 805, a key-on event is not indicated, method 800 may proceed to 810, and may include maintaining current vehicle operating parameters. For example, at 810, method 800 may include maintaining a CPV, CVV, FTIV, engine, etc., in their current conformations and or current modes of operation. Method 800 may then end.

Returning to 805, responsive to a key-on event being indicated, method 800 may proceed to 815, and may include accessing vehicle location, driver information, day of the week (DOW), time of day (TOD), etc. A driver's identity may be input by the driver, or inferred based on driving habits, seat position, cabin climate control preferences, voice activated commands, etc. Vehicle location may be accessed via an onboard navigation system, for example via GPS, or other means such as via wireless communication with the internet.

Proceeding to 820, method 800 may include recording vehicle route information during the drive cycle commencing from the key-on event. In some examples, vehicle route information may be divided into one or more segments, with the one or more segments being bordered by a key-on event indicating a start location, and a key-off event indicating a final destination. However, it may be understood that there may be one or more stops between a key-on event signaling the start of a route, and a key-off event indicating arrival at a final destination. Such stop events may be opportunities to conduct evaporative emissions test diagnostics depending on the duration of the stops, as will be discussed in further detail below.

At 820, the vehicle controller may continuously collect data from various sensor systems and outside sources regarding the vehicle's operations/conditions, location, traffic information, local weather information, etc. The data may be collected by, for example, GPS (e.g. 132), inertial sensors (e.g. 199), lasers, radar, sonar, acoustic sensors, etc. (e.g. 133). Other feedback signals, such as input from sensors typical of vehicles may also be read from the vehicle. Example sensors may include tire pressure sensors, engine temperature sensors, brake heat sensors, brake pad status sensors, tire tread sensors, fuel sensors, oil level and quality sensors, and air quality sensors for detecting temperature, humidity, etc. Still further, at 820, the vehicle controller may also retrieve various types of non-real time data, for example information from a detailed map, which may be stored in at the controller or which may be retrieved wirelessly.

Accordingly, data regarding a particular vehicle driving route, or trip vector, may be obtained and stored at the vehicle controller during the course of the vehicle being driven along the particular route. Proceeding to 825, method 800 may include processing the data to establish predicted/learned driving routes. For example, numerous trip vectors and corresponding information may be obtained and stored at the vehicle controller, such that predicted/learned driving routes may be achieved with high accuracy. In some examples, a vehicle may travel route(s) that are not frequently traveled (e.g. not "common"). Thus, it may be understood that route information that is not correlated significantly with commonly driven routes may be periodically forgotten, or removed, from the vehicle controller, in order to prevent the accumulation of exorbitant amounts of data pertaining to vehicle travel routines.

In some examples data collected from the vehicle travel routines including GPS data may be applied to an algorithm that feeds into one or more machine learning algorithms to determine common vehicle travel routes. Such an example is meant to be illustrative, and is not meant to be limiting. For example, any commonly used methodology for vehicle route learning may be utilized via the vehicle controller in order to establish learned travel routes without departing from the scope of this disclosure.

Learning driving routes at 825 may include determining stops between and including a starting destination and a final destination. For example, learning driving routes at 825 may include learning/predicting stops (e.g. vehicle-off events) that are typically less than a predetermined time duration (e.g. less than 45 minutes), and may further include learning/predicting stops that are typically greater than the predetermined time duration (e.g. greater than 45 minutes). As discussed above and which will be discussed in further detail below, such information may be utilized to schedule evaporative emissions test diagnostics.

Proceeding to 830, method 800 may include storing information pertaining to learned driving routes into one or more lookup table(s) at the vehicle controller. Such information may include segments of particular vehicle routes in which a stop is indicated, and may further include an indication of a learned/predicted time duration of each indicated stop. As an example, consider a situation where a vehicle operator drives to work every morning, but stops for less than 45 minutes (e.g. 20 minutes) at a coffee shop for breakfast. Such a route may comprise an opportunity to conduct a rapid (e.g. a test that is expected to complete faster than an EONV test that relies on pressure/vacuum builds in the fuel system/evaporative emissions system after key-off) test for the presence or absence of undesired evaporative emissions stemming from the fuel system and/or evaporative emissions system. Methodology for conducting such a test will be discussed in detail below with regard to FIGS. 9-10.

Thus, such lookup tables that may be generated via the methodology of FIG. 8 may be utilized during particular vehicle driving routines in order to schedule evaporative emissions test diagnostic procedures such that robust results may be obtained. More specifically, a rapid test (also referred to herein as an active-draw evaporative emissions test or active variable vacuum draw evaporative emissions test) for the presence or absence of undesired evaporative emissions stemming from the fuel system/evaporative emissions system may be scheduled for learned stops of less than the predetermined time duration (e.g. 45 minutes), which may result in a reduction or elimination of premature aborting of initiated evaporative emissions tests (e.g. failure to complete EONV test diagnostic).

Figure 9:
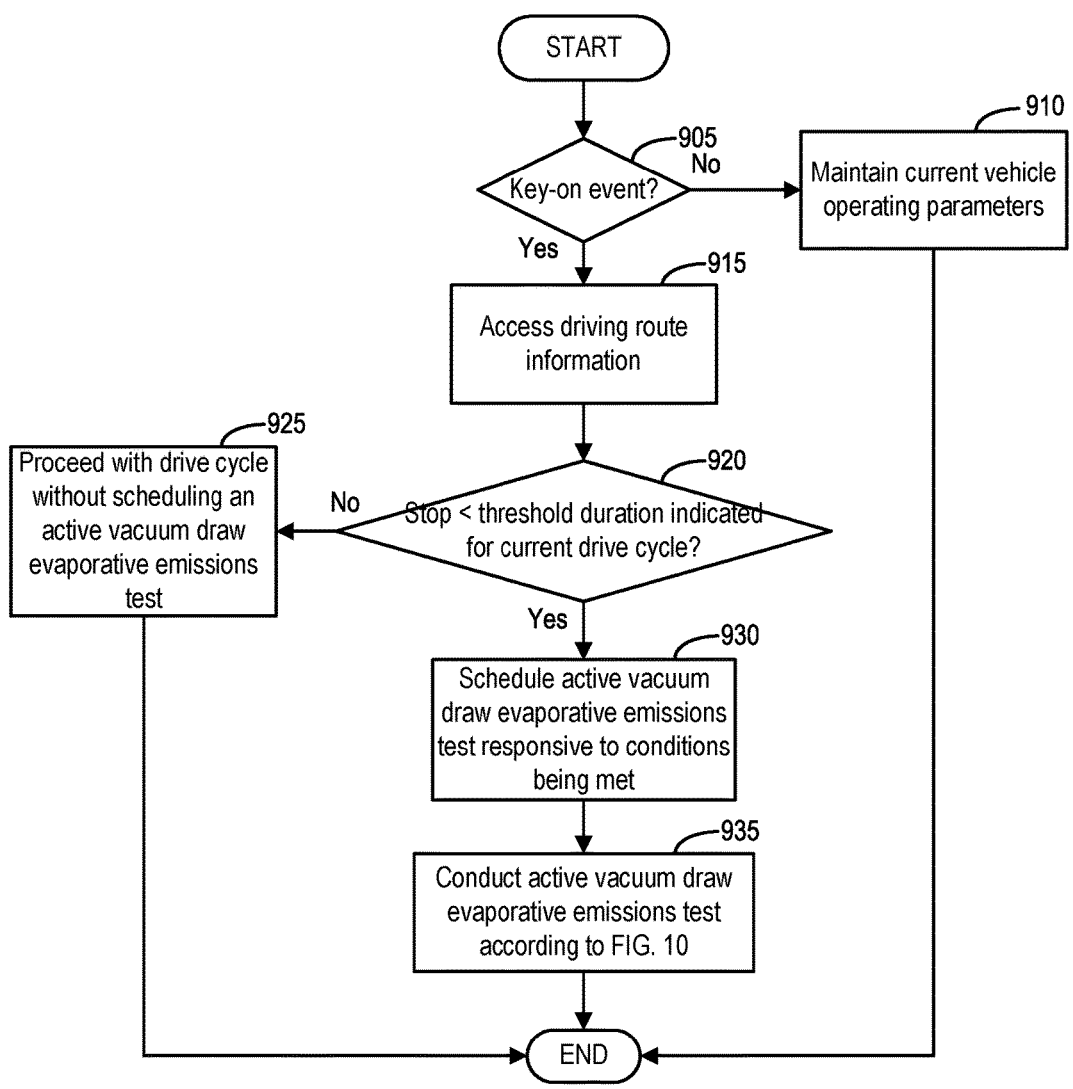
FIG. 9 shows a high level flowchart for an example method for scheduling an active variable vacuum draw evaporative emissions test responsive to predicted/learned stop(s) less than a predetermined time duration being indicated for a current driving route.

Turning now to FIG. 9, a high-level flowchart for an example method 900 for scheduling an active variable vacuum draw evaporative emissions test, is shown. More specifically, an active variable vacuum draw evaporative emissions test may be scheduled for learned/predicted stops during a learned/predicted drive cycle, where the learned/predicted stops are expected to be less than a predetermined duration (e.g. less than 45 minutes).

Method 900 will be described with reference to the systems described herein and shown in FIGS. 1-2, though it should be understood that similar methods may be applied to other systems without departing from the scope of this disclosure. Method 900 may be carried out by a controller, such as controller 212 in FIG. 2, and may be stored at the controller as executable instructions in non-transitory memory. Instructions for carrying out method 900 and the rest of the methods included herein may be executed by the controller based on instructions stored on a memory of the controller and in conjunction with signals received from sensors of the engine system, such as the sensors described above with reference to FIGS. 1-2. The controller may employ fuel system and evaporative emissions system actuators, canister vent valve (CVV) (e.g. 297), canister purge valve (CPV) (e.g. 261), FTIV (e.g. 252), vacuum pump (e.g. 289), etc., according to the methods depicted below.

Method 900 begins at 905 and may include indicating whether a key-on event is indicated. As discussed above, a key-on event may comprise an ignition key being utilized to start a vehicle either in an engine-on mode, or an electric only mode of operation. In other examples, a key on event may comprise an ignition button on the dash, for example, being depressed. Other examples may include a key-fob starting the vehicle in either an engine-on mode, or an electric-only mode of operation. If, at 905, a key-on event is not indicated, method 900 may proceed to 910, and may include maintaining current vehicle operating parameters. For example, at 910, method 900 may include maintaining a CPV, CVV, engine, motor, vacuum pump, etc., in their current conformations and or current modes of operation. Method 900 may then end.

Returning to 905, if a key-on event is indicated, method 900 may proceed to 915. At 915, method 900 may include accessing driving route information. For example, accessing driving route information at 915 may include retrieving learned driving route information from the vehicle controller. More specifically, a particular learned driving route may be indicated to be the same as the current driving route. In other words, the current driving route may be matched with a learned driving route with a high probability. A learned driving route may be matched to the current driving route based on a number of variables, including vehicle location, time of day, date, day of week, trajectory, and/or driver identity. A driver's identity may be input by the driver, or may be inferred based on driving habits, seat position, cabin climate control preferences, voice activated commands, etc. In another example, a vehicle operator may input one or more destinations into an onboard navigation system (e.g. GPS), such that accessing driving route information at 915 may include accessing the vehicle operator inputted driving route information. In some examples, accessing driving route information may include accessing a lookup table generated via the method of FIG. 8.

Proceeding to 920, method 900 may include indicating whether any predicted/learned stops are indicated for the particular driving route comprising the current drive cycle. More specifically, at 920, method 900 may include indicating whether any predicted/learned stops are expected to be less than a predetermined threshold duration, where the predetermined threshold duration may comprise a time duration of less than 45 minutes, for example. If, at 920, it is indicated that no predicted/learned stops expected to be less than the predetermined threshold duration are indicated, method 900 may proceed to 925, and may include proceeding with the drive cycle without scheduling an active variable vacuum draw evaporative emissions test. Method 900 may then end.

Returning to 920, responsive to one or more predicted/learned stops comprising stops expected to be less than the predetermined time duration, method 900 may proceed to 930, and may include scheduling an active variable vacuum draw evaporative emissions test for one or more of the predicted/learned stops. In some examples where more than one predicted/learned stop is indicated to be less than the predetermined time duration for the current drive cycle, more than one active draw evaporative emissions test may be scheduled for the more than one predicted/learned stop. Alternatively, in other examples, only one active draw evaporative emissions test may be scheduled for one of the one or more predicted/learned stops during the current drive cycle.

Responsive to scheduling the one or more active draw variable vacuum evaporative emissions tests, method 900 may proceed to 935, and may include conducting the active draw variable vacuum evaporative emissions test according to the method depicted at FIG. 10. Briefly, the active draw variable vacuum evaporative emissions test may include actively reducing pressure in the fuel system (and evaporative emissions system) to a level that is a function of at least ambient temperature (and/or fuel temperature), and in some examples canister loading state as well, just prior to a learned stop that is less than the predetermined duration, such that the fuel system may be sealed at the key-off event and pressure bleed-up monitored to indicate the presence or absence of undesired evaporative emissions stemming from the fuel system. By actively reducing pressure in the fuel system (and evaporative emissions system) just prior to key-off, the pressure bleed-up test may be quickly conducted and may be expected to complete within the duration of the learned/predicted stop. In this way, completion rates for tests for undesired evaporative emissions may be improved. Method 900 may then end.

Turning now to FIG. 10 a high-level flowchart for an example method 1000 for conducting an active variable vacuum draw evaporative emissions test, is shown. More specifically, an active variable vacuum draw evaporative emissions test may be scheduled for one or more stops during a driving route, where the one or more stops are predicted to be less than a predetermined threshold duration (e.g. less than 45 minutes).

Method 1000 will be described with reference to the systems described herein and shown in FIGS. 1-2, though it should be understood that similar methods may be applied to other systems without departing from the scope of this disclosure. Method 1000 may be carried out by a controller, such as controller 212 in FIG. 2, and may be stored at the controller as executable instructions in non-transitory memory. Instructions for carrying out method 1000 and the rest of the methods included herein may be executed by the controller based on instructions stored on a memory of the controller and in conjunction with signals received from sensors of the engine system, such as the sensors described above with reference to FIGS. 1-2. The controller may employ fuel system and evaporative emissions system actuators, canister vent valve (CVV) (e.g. 297), canister purge valve (CPV) (e.g. 261), FTIV (e.g. 252), vacuum pump (e.g. 289), etc., according to the methods depicted below.

Method 1000 begins at 1005, and may include indicating whether conditions are met for an active variable vacuum draw evaporative emissions test. For example, conditions being met for an active variable vacuum draw evaporative emissions test at 1005 may include an indication that the vehicle is within a predetermined threshold timeframe (e.g. less than 5 minutes) from arriving at a learned/predicted stop, where the learned/predicted stop may comprise a stop expected to be of a duration less than a predetermined duration (e.g. less than 45 minutes). Such an indication may be provided to a vehicle controller (e.g. 212) via an onboard navigation system (GPS), via learned driving routes stored at the controller in the form of lookup tables, etc. Conditions being met for conducting the active draw evaporative emissions test may further include an indication that the engine is not in operation. In the event that the engine is not in operation, then it may be understood that the active draw variable vacuum test may comprise reducing pressure (evacuating) the fuel system and evaporative emissions system via the vacuum pump (e.g. 289). Thus, in the case that the engine is not in operation, the active draw variable vacuum test may be a function of ambient temperature and canister loading state, as discussed above, because the vacuum pump may draw fuel vapors from the fuel tank into the canister for conducting the test. However, in some examples conditions being met for conducting the active draw variable vacuum test may include a situation where the engine is in operation. If the engine is in operation, it may be understood that the active draw evaporative emissions test may be a function of ambient temperature, and may not additionally be a function of canister load. More specifically, because the engine is in operation, engine intake manifold vacuum may be utilized to evacuate the fuel system and evaporative emissions system, rather than the vacuum pump. Accordingly, for conditions to be met under a situation where the engine is in operation, an intake manifold vacuum may be greater than a threshold vacuum. Thus, with the engine in operation, fuel vapors from the fuel tank may be routed to engine intake for combustion, rather than for storage at the canister. As such, the active draw variable vacuum test may be a function of ambient temperature and not canister loading state (as the canister is not loaded in such an approach) if the engine is in operation.

In some examples, the active draw test may be conducted via the vacuum pump under conditions where a test for undesired emissions is requested, and where it is indicated that a combination of fuel volatility and canister loading state is below the combination threshold. Alternatively, if it is indicated that fuel volatility and canister loading state is above the combination threshold, then it may be desirable to use engine vacuum to evacuate the fuel system, to avoid undesirably loading the canister to a point where bleed-emissions is likely. Accordingly, in a situation where engine vacuum is desired, in one example the engine may be activated to combust air and fuel under conditions where the engine is not already combusting air and fuel. However, there may additionally be examples where fuel economy may be improved via evacuating the fuel system by rotating the engine unfueled via an electric motor or electric machine. However, such an example may rely on an indication that a temperature of an exhaust catalyst (e.g. 270) is greater than a threshold temperature (e.g. light-off temperature). In a case where rotating the engine unfueled is desired, then an electric heater coupled to the exhaust catalyst, if present, may be activated to bring temperature of the exhaust catalyst to the threshold temperature.

Conditions being met for conducting the active draw variable vacuum test may further include an indication that the evaporative emissions system is free from gross and/or non-gross undesired evaporative emissions. Specifically, while not explicitly illustrated, it may be understood that steps 503-536 may be conducted at any time the vehicle is in operation and being propelled solely via electric power. Such a test may be conducted while the vehicle is in operation because vapors from the fuel tank are not routed to the fuel vapor canister under conditions where the evaporative emissions system is evacuated with the fuel tank sealed from the evaporative emissions system (e.g. FTIV closed). Accordingly, complications related to pressure bleed-up due to the presence of fuel vapors/fuel volatility are not an issue in such a case where the fuel system is sealed from the evaporative emissions system. Thus, it may be understood that there may be ample opportunities to conduct the tests for the presence or absence of undesired evaporative emissions (both gross and non-gross) stemming from the evaporative emissions system. If such a test is conducted, and where the evaporative emissions system is indicated to be free from the presence of undesired evaporative emissions, such a test may not be needed to be conducted again for a predetermined duration, during which time it may be inferred that the evaporative emissions system is free from undesired evaporative emissions. Thus, in a case where it is known that the evaporative emissions system is free from the presence of undesired evaporative emissions, then the active draw variable vacuum test may include indicating the presence or absence of undesired evaporative emissions stemming from the fuel system (since the evaporative emissions system is known to be free from the presence of undesired evaporative emissions), as will be discussed in detail below.

In a situation where the engine is off, indicating whether conditions are met for conducting the active draw variable vacuum evaporative emissions test may involve the controller querying lookup table 600 depicted above at FIG. 6, to determine if the active draw variable vacuum test may be conducted, based on ambient temperature and canister loading state. If it is indicated, based on canister loading state and ambient temperature, that conditions are not met for the active draw variable vacuum test relying on the vacuum pump during engine off conditions (e.g. canister load and fuel volatility above the combination threshold), then in some examples the engine may be pulled up, or activated (e.g. turned on to combust air and fuel), such that the active draw variable vacuum test may be conducted.

In some examples, conditions being met may include an indication that it is desirable to evacuate the fuel system to a variable vacuum, the variable vacuum dependent on either fuel volatility, or fuel volatility and canister loading state. Such an example may be indicated while the vehicle is in operation, via V2X communications between similarly situated vehicles. In other words, the vehicle may send a signal to other vehicles within a predetermined distance of the vehicle, to obtain information related to fuel tank pressure data and test diagnostics conducted within a predetermined time frame (e.g. within 4 hours or less, 2 hours or less, 1 hour or less, etc.) of the request for such information. If the fuel tank pressure data and/or data related to test diagnostics indicate that, in order to obtain robust results, a deeper vacuum is desired, then conditions may be indicated to be met for conducting the active draw variable vacuum test.

If, at 1005, conditions are not indicated to be met for conducting the active draw variable vacuum evaporative emissions test, method 1000 may proceed to 1010, and may include maintaining current vehicle operating parameters. For example, maintaining current vehicle operating parameters may include maintaining the CPV, CVV, and FTIV, vacuum pump (e.g. 289), etc., in their current operational states. Furthermore, maintaining current vehicle operating parameters may include maintaining an engine status in its current operational status, for example. Method 1000 may then end.

Alternatively, responsive to conditions being met for conducting the active draw variable vacuum evaporative emissions test at 1005, method 1000 may proceed to 1015. At 1015, method 1000 may include commanding closed the CVV to seal the fuel system and evaporative emissions system from atmosphere. Responsive to sealing the fuel system and evaporative emissions system from atmosphere at 1015 by commanding closed the CVV, method 1000 may proceed to 1020. At 1020, one of two approaches may be undertaken to evacuate the fuel system and evaporative emissions system to a variable vacuum level. In the first approach, where the engine is off, evacuating the fuel system may include commanding open the FTIV (and commanding or maintaining close the CPV), and operating the vacuum pump (e.g. 289) to draw vacuum on the fuel system (and evaporative emissions system) as a function of ambient temperature and canister loading state (in some examples fuel temperature may be additionally or alternatively utilized), via the controller querying lookup table 600 depicted at FIG. 6. In other words, in the first approach, evacuating the fuel system (and evaporative emissions system) may include evacuating the fuel system (and evaporative emissions system) to a variable vacuum, as a function of canister load and ambient temperature. Alternatively, in the second approach where the engine is in operation, method 1000 may include commanding open the FTIV, and may further include duty cycling the CPV, to enable vacuum from the intake manifold to be communicated to the fuel system (and evaporative emissions system). The CPV may be duty cycled as a function of the level of vacuum desired to be applied on the fuel system. Specifically, as discussed, with the engine in operation, the level of vacuum desired, or target vacuum, may be a function of ambient temperature. Accordingly, with the engine in operation, lookup table 1100 depicted at FIG. 11 may be queried by the controller, to determine the target vacuum as a function of indicated ambient temperature.

Whether evacuation of the fuel system (and evaporative emissions system) is conducted via the vacuum pump, or via engine intake manifold vacuum at 1020, method 1000 may proceed to 1025. At 1025, method 1000 may include indicating whether the target vacuum (e.g. target negative pressure with respect to atmospheric pressure) is reached. Such an indication may be provided via the fuel tank pressure transducer (e.g. 291), or other pressure sensor (e.g. 282). If the target vacuum is not indicated to have been reached, method 1000 may proceed to 1030. At 1030, method 1000 may include indicating whether a predetermined duration of time has elapsed. For example, the predetermined duration may comprise a duration where it would be expected that the target vacuum would be reached in the absence of gross undesired evaporative emissions. If, at 1030, it is indicated that the predetermined duration has not elapsed, method 1000 may continue to evacuate the fuel system (and evaporative emissions system). Alternatively, if it is indicated at 1030 that the predetermined duration has elapsed, method 1000 may proceed to 1035. At 1035, method 1000 may include indicating the presence of gross undesired evaporative emissions stemming from the fuel system and/or evaporative emissions system. For example, a flag may be set at the controller, and a MIL may be illuminated on the vehicle dash to alert the vehicle operator of a request to service the vehicle. Proceeding to 1040, method 1000 may include updating vehicle operating parameters responsive to the indication of gross undesired evaporative emissions. For example, as discussed above, the vehicle may be operated in an electric-only mode as frequent as possible, canister purging schedules may be updates so as to purge vapors more frequently, etc. Method 1000 may then end.

Returning to 1025, responsive to the target vacuum being reached, method 1000 may proceed to 1045, and may include maintaining the target vacuum until a key-off event is indicated. Furthermore, while not explicitly shown, at 1025, responsive to the target vacuum being reached, it may be indicated that there is an absence of gross undesired evaporative emissions stemming from the fuel system (and evaporative emissions system). At 1045, in a case where the engine is in operation, then the CPV may be controlled to a duty cycle to maintain the target vacuum. In a case where the engine is not in operation and the fuel system and evaporative emissions system are evacuated via the vacuum pump, then the vacuum pump may be controlled via the controller to maintain the target vacuum. Accordingly, proceeding to 1050, method 1000 may include indicating whether a key-off event has occurred. If a key-off event is not indicated, method 1000 may continue to maintain the target vacuum. Alternatively, responsive to an indication of a key-off event, method 1000 may proceed to 1055. At 1055, method 1000 may include stopping evacuating the fuel system (and evaporative emissions system) and sealing the fuel system from atmosphere. In the event that the fuel system (and evaporative emissions system) were being evacuated via the engine, step 1055 may include the controller commanding closed the CPV at the key-of event, and performing an engine shutdown. Alternatively, in the event that the fuel system and evaporative emissions system were being evacuated via the vacuum pump, step 1055 may include the controller commanding off the vacuum pump and maintaining closed the CVV and CPV. In either case, the FTIV may be commanded closed via the controller, to seal the fuel system from atmosphere and from the evaporative emissions system.

It may be understood that by sealing the fuel system from the evaporative emissions system, where the CVV is closed, the evaporative emissions system is thus sealed with the target vacuum present in the evaporative emissions system. As discussed, method 1000 may be enabled responsive to conditions being met for conducting the active draw variable vacuum test, which may include an indication that the evaporative emissions system is free from undesired evaporative emissions (gross and/or non-gross). Accordingly, a pressure bleed-up test may not be conducted responsive to sealing the evaporative emissions system from the fuel system at 1055. However, the evaporative emissions system may be maintained sealed from the fuel system, from atmosphere, and from engine intake via the closed CVV, closed FTIV, and closed CPV. By maintaining sealed the evaporative emissions system, after the diagnostic on the fuel system is conducted, the FTIV and CVV may be opened simultaneously, or the FTIV may be opened just prior to the CVV, such that the negative pressure in the fuel system and evaporative emissions system may draw fresh air across the fuel vapor canister, which may desorb fuel vapors back to the fuel tank. By conducting the method in such an order, bleed-through emissions may be reduced.

Accordingly, proceeding to 1060, responsive to the fuel system being sealed from the evaporative emissions system, method 1000 may include monitoring fuel system pressure for a predetermined duration. Proceeding to 1065, method 1000 may include indicating whether pressure bleed-up is greater than a pressure bleed-up threshold, and/or whether a pressure bleed-up rate is greater than a pressure bleed-up rate threshold. It may be understood that the pressure bleed-up threshold and the pressure bleed-up rate threshold may be a function of ambient temperature, fuel level, fuel temperature. Furthermore, the threshold(s) may be adjusted as a function of the target vacuum. If, at 1065, it is indicated that pressure bleed-up is not greater than the pressure bleed-up threshold, and/or not greater than the pressure bleed-up rate threshold, method 1000 may proceed to 1070. At 1070, method 1000 may include indicating the absence of fuel system non-gross undesired evaporative emissions. Such a result may be stored at the controller, for example. Proceeding to 1075, method 1000 may include unsealing the fuel system and evaporative emissions system. Specifically, the CVV may be commanded open and the FTIV may be commanded open simultaneously, or in some examples the FTIV may be commanded open just prior to the CVV being commanded open. In this way, fresh air may be drawn across the fuel vapor canister, thus desorbing fuel vapors in the canister back to the fuel tank, as mentioned above.

Responsive to pressure in the fuel system and evaporative emissions system returning to atmospheric pressure, method 1000 may proceed to 1080, and may include commanding closed the FTIV. With the FTIV closed, method 1000 may proceed to 1085, and may include updating vehicle operating parameters. In the case where the absence of undesired evaporative emissions is indicated, updating vehicle operating parameters may include maintaining canister purging schedules, evaporative emissions testing schedules, engine operating conditions, etc., in their current status. Method 1000 may then end.

Alternatively, returning to 1065, responsive to an indication of pressure bleed-up being greater than the pressure bleed-up threshold and/or responsive to the rate of pressure bleed-up being greater than the pressure bleed-up rate threshold, method 1000 may proceed to 1090. At 1090, method 1000 may include indicating the presence of undesired evaporative emissions stemming from the fuel system and/or evaporative emissions system. Such an indication may include setting a flag at the controller. Furthermore, a MIL may be illuminated at the vehicle dash, alerting the vehicle operator of a request to service the vehicle.

Proceeding to 1075, method 1000 may include unsealing the fuel system and evaporative emissions system. For example, as discussed, the CVV and the FTIV may be commanded open simultaneously. Alternatively, in some examples the FTIV may be commanded open just prior to opening the CVV. Responsive to pressure in the fuel system and evaporative emissions system reaching atmospheric pressure, method 1000 may proceed to 1080, and may include commanding closed the FTIV. Proceeding to 1085, method 1000 may include updating vehicle operating parameters. For example, as discussed, in some examples updating vehicle operating parameters responsive to the indication of the presence of undesired evaporative emissions may include operating the vehicle in an electric-only mode of operation as frequently as possible, updating canister purging schedules to more frequently purge the canister, etc. Method 1000 may then end.

Accordingly, the methods of FIGS. 8-11 may enable a method comprising responsive to a request to conduct a test for undesired evaporative emissions stemming from a fuel system of a vehicle, in a first operating mode, conducting the test via evacuating the fuel system through an entirety of a fuel vapor canister configured to capture and store fuel vapors from the fuel system, and in a second operating mode, conducting the test via evacuating the fuel system through a portion of the fuel vapor canister. In such an example, the method may include evacuating the fuel system in both the first operating mode and in the second operating mode in response to a learned key-off event duration below a threshold key-off duration. In one example, both the first operating mode and the second operating mode include evacuating the fuel system to a variable vacuum level, where evacuating the fuel system to the variable vacuum is determined at least in part based on vehicle-to-vehicle communication where it is indicated that the variable vacuum level is desired for the test to be robust. In such a method, the variable vacuum level in the first operating mode is a function of a loading state of the fuel vapor canister and fuel volatility, and the variable vacuum level in the second operating mode is a function of fuel volatility but independent of the loading state of the fuel vapor canister. In such an example, evacuating the fuel system in the first operating mode is via a vacuum pump positioned between the fuel vapor canister and atmosphere, and evacuating the fuel system in the second operating mode is via an engine. In some examples, the method may include activating the engine to combust air and fuel in order to evacuate the fuel system in the second operating mode, under conditions where the vehicle is being operated in an electric-only mode of operation.

Another example of a method includes, in a third operating condition, operating a vehicle in a third mode to evacuate a fuel system of the vehicle to a first variable vacuum level in order to conduct a test for undesired evaporative emissions stemming from the fuel system, where evacuating the fuel system in the third mode further loads a fuel vapor storage canister with fuel vapors from the fuel system; and in a fourth operating condition, operating the vehicle in a fourth mode to evacuate the fuel system of the vehicle to a second variable vacuum level to conduct the test for undesired evaporative emissions, where evacuating the fuel system in the fourth mode avoids further loading of the fuel vapor storage canister with fuel vapors from the fuel system. In such an example, the first variable vacuum level is a function of a loading state of the fuel vapor storage canister and fuel volatility, and the second variable vacuum level is a function of fuel volatility but independent of the loading state of the fuel vapor storage canister. In such an example, the third operating condition includes the loading state of the fuel vapor storage canister in combination with fuel volatility being below a combination threshold, and the fourth operating condition includes the loading state of the fuel vapor storage canister in combination with fuel volatility being greater than the combination threshold. Furthermore, in such a method, evacuating the fuel system in both the third mode and the fourth mode is in response to a request to conduct the test and further responsive to an indication that a learned key-off event is of a duration less than a threshold key-off duration. In such a method, evacuating the fuel system in the third mode is via the vacuum pump positioned between the fuel vapor canister and atmosphere, and wherein evacuating the fuel system in the fourth mode is via the engine. In some examples, evacuating the fuel system may be conducted under conditions where the engine is one of combusting air and fuel, or being rotated unfueled via an electric motor.

Turning now to FIG. 12, an example timeline 1200 for conducting a variable vacuum-based test for undesired evaporative emissions, is shown. Timeline 1200 includes plot 1205, indicating whether a vacuum pump (e.g. 289) is on, or off, over time. Timeline 1200 further includes plot 1210, indicating a status of a CVV (e.g. 297), plot 1215, indicating a status of a CPV (e.g. 261), and plot 1220, indicating a status of an FTIV (e.g. 252), over time. In each case for plots 1210, 1215, and 1220, the status may comprise either open, or closed. Timeline 1200 further includes plot 1225, indicating pressure in a vehicle evaporative emissions system (e.g. 251), as monitored via a pressure sensor (e.g. 282). Pressure may be at atmospheric pressure (atm), or negative (−) with respect to atmospheric pressure. Line 1226 represents a threshold vacuum, which, if reached during evacuating the evaporative emissions system, may indicate an absence of gross undesired evaporative emissions. Line 1227 represents a threshold pressure which, if reached subsequent to the threshold vacuum being reached, may indicate the presence of non-gross undesired evaporative emissions stemming from the evaporative emissions system. Furthermore, evacuating the fuel system to the second variable vacuum may further comprise an indication that a temperature of an exhaust catalyst is greater than a threshold temperature, and if not, such a method may further include activating a heating element of the exhaust catalyst to raise the temperature of the exhaust catalyst to greater than the threshold temperature under conditions where the temperature of the exhaust catalyst is below the threshold temperature.

Timeline 1200 further includes plot 1230, indicating pressure in a fuel system (e.g. 218), over time. Pressure may be monitored via a fuel tank pressure transducer (FTPT) (e.g. 291). Pressure in the fuel system may be at atmospheric pressure (atm), or may be negative (−) with respect to atmospheric pressure. Timeline 1200 further includes plot 1235, representing a fuel vapor canister loading state, over time. Loading state may increase (+) or decrease (−), over time. Timeline 1200 further includes plot 1240, indicating an ambient temperature, over time. Ambient temperature may increase (+), or decrease (−), over time. Timeline 1200 further includes plot 1245, indicating whether conditions are met (yes) or not (no) for conducting the variable vacuum (VV) diagnostic for indicating the presence or absence of undesired evaporative emissions, over time. Timeline 1200 further includes plot 1250 for indicating the presence or absence of undesired evaporative emissions stemming from the evaporative emissions system, over time. Undesired evaporative emissions may be absent (no), may comprise gross undesired evaporative emissions (G), or may comprise non-gross undesired evaporative emissions (NG). Similarly, timeline 1200 further includes plot 1255 for indicating the presence or absence of undesired evaporative emissions stemming from the fuel system, over time. Timeline 1200 further includes plot 1260, indicating a status of a controller of the vehicle, over time. The controller may be awake (wake), or asleep (sleep), over time.

At time t0, while not explicitly shown, it may be understood that the vehicle is in a key-off condition. The vacuum pump is off (plot 1205), the CVV is open (ploy 1210), and the CPV and FTIV are both closed (plots 1215 and 1220, respectively). Pressure in the evaporative emissions system is near atmospheric pressure (plot 1225), as the CVV is open. Furthermore, pressure in the fuel system is near atmospheric pressure (plot 1230). Conditions are not yet indicated to be met for conducting the variable vacuum diagnostic (plot 1245). Undesired evaporative emissions are not indicated in the evaporative emissions system (plot 1250) or fuel system (plot 1255), and the controller is awake (plot 1260).

Between time t0 and t1, it may be understood that the controller retrieves information pertaining to ambient temperature and canister loading state. Accordingly, lookup table 600 depicted above at FIG. 6 may be utilized to indicate whether ambient temperature and canister load are such that conditions may be met for conducting the variable vacuum diagnostic. At time t1, it is indicated that conditions are met for conducting the variable vacuum diagnostic. In other words, it may be understood that ambient temperature and canister loading state are such that the variable vacuum diagnostic may be conducted without overloading the fuel vapor canister with fuel vapors. Said another way, ambient temperature and canister loading state are such that the variable vacuum diagnostic may be conducted without increasing a likelihood for bleed-through emissions. Further details of conditions being met for conducting the variable vacuum diagnostic are discussed above at step 430 of method 400, and for brevity, will not be reiterated here.

With conditions being met for conducting the variable vacuum diagnostic at time t1, it may be understood that the variable vacuum diagnostic is scheduled, which may include the controller setting a timer that may wake the controller at the scheduled time, after a predetermined duration has elapsed. With the variable vacuum diagnostic scheduled, the controller is put to sleep at time t2.

After the predetermined duration has elapsed, at time t3 the controller returns to the awake mode. Accordingly, the vacuum pump is commanded on, and the CVV is commanded closed. The CVV and FTIV are maintained closed. With the vacuum pump activated, and with the FTIV, CPV, and CVV closed, pressure in the evaporative emissions system becomes negative with respect to atmospheric pressure. At time t4, the threshold vacuum is reached, represented by line 1226, thus it is indicated that there is an absence of gross undesired evaporative emissions stemming from the evaporative emissions system (plot 1250). It may be understood that the threshold vacuum for the evaporative emissions system comprises −8InH2O in example timeline 1200. With an absence of gross undesired evaporative emissions indicated for the evaporative emissions system, the vacuum pump may be commanded off, which may result in the CV1 (e.g. 292) and CV2 (e.g. 293) closing. In this way, the evaporative emissions system is sealed from atmosphere. Between time t4 and t5, pressure bleed-up in the evaporative emissions system is monitored for a predetermined duration, and at time t5, it is that the predetermined duration has elapsed. Because pressure in the evaporative emissions system did not reach the threshold pressure represented by line 1227, an absence of non-gross undesired evaporative emissions in the evaporative emissions system is indicated (plot 1250).

At time t5, the FTIV is commanded open, thus fluidically coupling the fuel system to the evaporative emissions system. The vacuum pump is again activated. As pressure in the evaporative emissions system is already negative with respect to atmospheric pressure, the vacuum pump may use less battery power to evacuate the fuel system, as opposed to if the entire fuel system and evaporative emissions system were to be evacuated starting from near atmospheric pressure.

Based on the forecast ambient temperature and canister loading state, the level of negative pressure (threshold vacuum) to reduce the fuel system to may be retrieved from lookup table 600 depicted at FIG. 6. In this example timeline 1200, it may be understood that the threshold vacuum comprises −28InH20. Between time t5 and t6, pressure in the fuel system (and evaporative emissions system) is reduced due to the vacuum pump being activated. The drawing of negative pressure on the fuel system results in fuel vapors being routed from the fuel tank to the fuel vapor canister, which results in the fuel vapor canister load increasing between time t5 and t6. However, such an increased canister load is not likely to result in undesired bleed emissions, due to the level of vacuum specified and due to the level of canister load prior to the evacuating.

At time t6 pressure in the fuel system reaches the threshold variable vacuum, represented by line 1231. As the threshold variable vacuum is reached, gross undesired evaporative emissions are not indicated (plot 1255). With the threshold variable vacuum reached at time t6, the fuel system is sealed, via the controller commanding closed the FTIV (plot 1220). With the fuel system sealed, pressure bleed-up in the fuel system is monitored between time t6 and t7. Pressure bleed-up is substantial between time t6 and t7, yet remains below the pressure bleed-up threshold, represented by plot 1232. More specifically, due to high ambient temperature, fuel vaporization in the fuel system contributes to pressure bleed-up in the fuel system. However, the contribution of fuel vaporization to the pressure bleed-up does not result in pressure bleed-up reaching the pressure bleed-up threshold, as the fuel tank was evacuated to a level based on ambient temperature, to increase signal-to-noise of the pressure bleed-up portion of the test. Specifically, if the fuel system were only evacuated to −8InH2O, it may be likely that fuel vaporization may have contributed to increasing pressure in the fuel system to above the pressure bleed-up threshold. However, by evacuating the fuel system to −28InH2O, the signal-to-noise is increased, such that fuel vaporization does not result in pressure bleed-up increasing to the pressure bleed-up threshold.

Accordingly, at time t7, an absence of non-gross undesired evaporative emissions stemming from the fuel system, is indicated (plot 1255). With the test completed, conditions are no longer indicated to be met for conducting the variable vacuum diagnostic (plot 1245). To relieve pressure in the fuel system and evaporative emissions system, the FTIV and CVV are commanded open at time t7. Due to the negative pressure in the fuel system and evaporative emissions system, fresh air is drawn through the canister, thus desorbing a fraction or percentage of fuel vapors from the storage canister back to the fuel tank between time t7 and t8 (plot 1235). In this way pressure is relieved between time t7 and t8 (see plots 1225 and 1230). Responsive to pressure in the fuel system and evaporative emissions system reaching atmospheric pressure, the fuel system is sealed from the evaporative emissions system via the controller commanding closed the FTIV (plot 1220). At time t9 the controller is returned to sleep mode.

While timeline 1200 depicted an example where conditions were indicated to be met for conducting the variable vacuum diagnostic, in some examples conditions may not be indicated to be met for conducting the variable vacuum diagnostic. Specifically, there may be ambient temperature (and/or fuel temperature) and canister loading state conditions that may result in conditions not being met for conducting the variable vacuum diagnostic, due to the potential for increased undesired bleed emissions. In such an example, a crowd-based fuel system diagnostic may be conducted, as discussed above with regard to FIG. 4 and FIG. 7.

Accordingly, turning to FIG. 13, an example timeline 1300 for conducting a test for undesired evaporative emissions stemming from the fuel system based on crowd data, is shown. Timeline 1300 includes plot 1305, indicating a status of the vacuum pump (e.g. 289) (on or off), and plots 1310 and 1315, indicating status of the CVV and FTIV (open or closed), respectively, over time. Timeline 1300 further includes plot 1320, indicating pressure in the evaporative emissions system, indicated by a pressure sensor (e.g. 282), over time. Line 1321 represents a threshold vacuum, which, if reached, may indicate the absence of gross undesired evaporative emissions present in the evaporative emissions system. Line 1322 represents a threshold pressure which, if reached subsequent to the threshold vacuum being reached and the evaporative emissions system being sealed, may indicate the presence of non-gross undesired evaporative emissions stemming from the evaporative emissions system.

Timeline 1300 further includes plot 1325, indicating pressure in the fuel system, as monitored via a fuel tank pressure transducer (FTPT) (e.g. 291), over time. Pressure in the evaporative emissions system, and the fuel system, may be either at atmospheric pressure (atm), or may be negative with respect to atmospheric pressure. Timeline 1300 further includes plot 1330, indicating whether conditions are indicated to be met for conducting a variable vacuum diagnostic, as discussed above with regard to FIG. 4. Timeline 1300 further includes plot 1335, indicating whether crowd data has been retrieved (yes or no) via the controller of the vehicle (discussed herein as the vehicle being diagnosed, or VD), over time. Timeline 1300 further includes plot 1340, indicating a mean fuel system pressure retrieved from the crowd, over time. Prior to retrieving such pressure indications from the crowd, such measurements may be "non-applicable" (n/a). Otherwise, fuel system pressure from the crowd may be at atmospheric pressure, or positive or negative with respect to atmospheric pressure. Timeline 1300 further includes plot 1345, indicating whether fuel system pressure from the VD is correlated (yes) (e.g. within 5%) with the crowd fuel system pressure (crowd data), or not (no), over time. Timeline 1300 further includes plot 1350, indicating whether undesired evaporative emissions are present in the VD evaporative emissions system (yes) or not (no), over time. Timeline 1300 further includes plot 1355, indicating whether undesired evaporative emissions are present in the VD fuel system (yes) or not (no) over time. Timeline 1300 further includes plot 1360, indicating a status of the VD controller (awake or asleep), over time.

At time t0, it may be understood that the VD is in a key-off condition, and that conditions are not indicated to be met for conducting a variable vacuum-based diagnostic. In other words, it may be understood that conditions may be such that conducting the variable vacuum diagnostic may undesirable load the fuel vapor storage canister, to a point where undesirable bleed emissions may be increased. More specifically, it may be understood that the VD controller has queried lookup table 600, and indicated that conditions are not met for conducting the variable vacuum diagnostic. For example, ambient temperature may be high, and canister loading state may be high.

Accordingly, between time t0 and t1, it may be understood that the controller of the VD schedules a wakeup of the controller (by setting a timer for example), to conduct a crowd-based fuel system diagnostic after a predetermined duration of time. As such, at time t1, the controller is put to sleep (plot 1360) for the predetermined duration.

After the predetermined duration has elapsed, the controller is awoken at time t2 (plot 1360). Furthermore, the vacuum pump is activated (plot 1305) and the CVV is closed (1310). The FTIV is maintained closed (plot 1325). While not specifically shown, the CPV (e.g. 261) is also commanded or maintained closed. With the vacuum pump activated, a negative pressure with respect to atmospheric pressure is drawn on the evaporative emissions system (plot 1320). At time t3, pressure in the evaporative emissions system reaches the threshold vacuum, represented by line 1321. Accordingly, gross undesired evaporative emissions are not indicated (plot 1350).

Responsive to the indication of the absence of gross undesired evaporative emissions, the vacuum pump is deactivated, thus sealing the evaporative emissions system from atmosphere. Accordingly, between time t3 and t4, pressure bleed-up in the evaporative emissions system is monitored. Between time t3 and t4, pressure remains below the pressure bleed-up threshold, represented by line 1322, thus indicating the absence of non-gross undesired evaporative emissions stemming from the evaporative emissions system (plot 1350). Responsive to the indication of the absence of gross and non-gross undesired evaporative emissions stemming from the evaporative emissions system, the CVV is commanded open (plot 1310), thus relieving pressure in the evaporative emission system to atmosphere between time t4 and t5.

At time t5, pressure in the fuel system is near atmospheric pressure. In other words, absolute value of pressure is not greater than a predetermined pressure threshold(s), for example a positive pressure threshold or a negative pressure threshold. If the positive pressure threshold or negative pressure threshold were reached, then it may be indicative of the absence of undesired evaporative emissions stemming from the fuel system. However, because pressure is near atmospheric pressure, it is not clear whether pressure is near atmospheric pressure due to ambient conditions, or due to the presence of undesired evaporative emissions stemming from the fuel system.

Accordingly, a crowd-based fuel system diagnostic is conducted, starting at time t5. Specifically, the vehicle controller may retrieve crowd data related to fuel system pressure from a plurality of vehicles within a predetermined distance of the VD. Specific details for generating the crowd, and for retrieving and processing data related to fuel system pressure from the crowd, are depicted above at FIG. 7. For brevity, the details will not be reiterated here. Between time t5 and t6, the data from the crowd is processed, and mean crowd fuel system pressure is indicated (plot 1340). At time t6, the VD controller indicates that the fuel system pressure data retrieved from the crowd is not correlated (e.g. differing by greater than 5%) with the fuel system pressure data retrieved from the VD (plot 1345). In other words, the FTPT of the VD indicates that the fuel system pressure is near atmospheric pressure, whereas the data from the crowd indicates fuel system pressures positive with respect to atmospheric pressure. Accordingly, undesired evaporative emissions are indicated for the VD fuel system (plot 1355). More specifically, if the fuel system of the VD were free from undesired evaporative emissions, it may be expected that pressure in the fuel system would be similar in direction and magnitude, to the crowd fuel system pressure data. The fact that the VD fuel system pressure is near atmospheric pressure, while the crowd is indicating positive fuel system pressure, thus is indicative of a VD fuel system with a source of undesired evaporative emissions. It may not be possible to indicate whether such a source of undesired evaporative emissions comprises gross or non-gross emissions, however. Accordingly, undesired evaporative emissions are indicated (without specifying gross or non-gross), a flag may be set at the controller, and a MIL may be illuminated at the vehicle dash to alert the vehicle operator of a request to service the vehicle.

At time t7, the controller is returned to sleep, and the vehicle is maintained off between time t7 to t8.

Turning now to FIG. 14, an example timeline 1400 for conducting an active variable-vacuum draw evaporative emissions test, is shown. Timeline 1400 includes plot 1405, indicating whether a key-off event is indicated (yes) or not (no), over time. Timeline 1400 further includes plot 1410, indicating whether an engine of the vehicle is on, or off, over time. It may be understood that "on" in this example refers to the engine combusting air and fuel. Timeline 1400 further includes plot 1415, indicating whether conditions are indicated to be met (yes) or not (no) for conducting an active variable vacuum draw diagnostic for the presence or absence of undesired evaporative emissions stemming from the fuel system, over time. Timeline 1400 further includes plot 1420, indicating whether a vacuum pump (e.g. 289) is on, or off, over time. Timeline 1400 further includes plot 1425, indicating a CVV status, plot 1430, indicating a CPV status, and plot 1435, indicating an FTIV status, over time. In each case of plots 1425, 1430, and 1435, the status may be either open, or closed. Timeline 1400 further includes plot 1440, indicating a loading state of a fuel vapor canister, over time. Canister load may increase (+) or decrease (−), over time. Timeline 1400 further includes plot 1445, indicating ambient temperature, over time. Ambient temperature may increase (+) or decrease (−) over time. Timeline 1400 further includes plot 1450, indicating fuel system pressure, as monitored via a fuel tank pressure transducer (FTPT), over time. Fuel system pressure may be either at atmospheric pressure, or may be positive (+) or negative (−) with respect to atmospheric pressure, over time. Line 1451 represents a threshold vacuum where, if reached, may indicate the absence of non-gross undesired evaporative emissions. Furthermore, line 1451 may comprise a variable vacuum threshold, based on canister loading state and ambient temperature. Line 1452 represents a pressure threshold which, if reached subsequent to the variable vacuum threshold being reached, and further responsive to the fuel system being sealed, may be indicative of a presence of undesired evaporative emissions. Accordingly, plot 1455 indicates the presence (yes) or absence (no) of undesired evaporative emissions stemming from the fuel system, over time.

At time t0, the vehicle is in operation (plot 1405), with the engine combusting air and fuel (plot 1410). Conditions for conducting the active variable vacuum draw evaporative emissions test are not yet met (plot 1415). The vacuum pump (e.g. 289) is off (plot 1420), the CVV is open (plot 1425), the CPV is closed (plot 1430), and the FTIV is closed (plot 1435). The fuel vapor canister is less than half full (plot 1440), ambient temperature is high (plot 1445), and fuel system pressure is slightly positive with respect to atmospheric pressure (plot 1450). For example, although ambient temperature is high, there may be factors such as wind, which may be countering a pressure build in the fuel system due to high ambient temperature. At present, undesired evaporative emissions are not yet indicated in the fuel system (plot 1455).

At time t1, the engine is deactivated, or turned off (plot 1410). As a key-off event is not indicated, it may be understood that the vehicle is operating in an electric-only mode of operation, where the motor (e.g. 120) is operating to propel the vehicle. At time t2, it is indicated that conditions are indicated for conducting an active variable vacuum draw evaporative emissions test. Conditions being met for conducting such a test are described in detail above at FIG. 10, and as such, will not be reiterated here. Briefly, it may be understood that the vehicle is traveling on a learned route, and where a predicted or learned stop is less than a threshold duration (e.g. less than 45 minutes), such that a rapid test for undesired evaporative emissions is desired. With conditions being met for conducting the active variable vacuum draw at time t2, the vacuum pump is activated, or turned on (plot 1420), the CVV is commanded closed (plot 1425), and the FTIV is commanded open (plot 1435). It may be understood that conditions being met may be a function of canister loading state, and ambient temperature, and it may be further understood that the target vacuum level may be a function of ambient temperature (or in some examples fuel temperature) and canister loading state. For example, in this example timeline 1400, based on ambient temperature and canister loading state, the target vacuum may comprise −24InH2O. In other words, turning to FIG. 6, ambient conditions may comprise 85° F., and the canister may be anywhere from 31-60% full, thus the target vacuum may comprise −24InH2O.

Accordingly, between time t2 and t3, pressure in the fuel system and evaporative emissions system is reduced via the vacuum pump, and the target vacuum is reached and maintained. In other words, it may be understood that the vacuum pump may control the evacuating of the fuel system and evaporative emissions system such that the target vacuum or threshold vacuum is maintained until a key-off event. Between time t2 and t3, canister load increases, as fuel vapors are drawn from the fuel tank to the fuel vapor canister (plot 1440).

At time t3, a key-off event is indicated (plot 1405), and the vacuum pump is turned off, thus sealing the fuel system and evaporative emissions system from atmosphere. Furthermore, at time t3, the FTIV is commanded closed to seal the fuel system from the evaporative emissions system. Between time t3 and t4, pressure bleed-up in the fuel system is monitored, and at time t4 it is indicated that the fuel system is free from undesired evaporative emissions (plot 1455), as the pressure bleed-up remained below the pressure bleed-up threshold (line 1452). With the fuel system being indicated to be free from undesired evaporative emissions, the CVV and the FTIV are commanded open (plot 1425) at time t4, and conditions are no longer indicated to be met for conducting the active variable vacuum draw test (plot 1415). With the CVV and the FTIV open, pressure in the fuel system (and evaporative emissions system) returns to atmospheric pressure between time t4 and t5 (plot 1450). Furthermore, as pressure is relieved, due to the negative pressure in the fuel system and evaporative emissions system, fresh air may be drawn across the fuel vapor canister, thus desorbing at least a portion of vapors stored at the canister, to the fuel tank (plot 1440). At time t5, the FTIV is commanded closed via the controller, to seal the fuel system from the evaporative emissions system, and from atmosphere. Between time t5 and t6, the vehicle is maintained in a key-off state (plot 1405).

In this way, tests for the presence or absence of undesired evaporative emissions stemming from a vehicle fuel system and/or evaporative emissions system may be conducted such that potential false failures are reduced or eliminated.

The technical effect is to recognize that for vehicles equipped with a steel fuel tank, vacuum applied on the fuel system for conducting tests for the presence or absence of undesired evaporative emissions may be greater than if the fuel tank were plastic or made of some other material. By applying a variable vacuum (e.g. greater target vacuum) on the fuel system where the fuel system includes a steel fuel tank, there may be more signal-to-noise to work with when monitoring pressure bleed-up in the fuel system subsequent to evacuating the fuel system to the target vacuum (threshold vacuum) and sealing the fuel system (and evaporative emissions system, in some examples). More specifically, fuel volatility may contribute to bleed-up (bleed-up rate or absolute bleed-up), but such bleed-up may not be significant when a larger vacuum is applied to the fuel system, under conditions of high ambient temperature, for example. A further technical effect is to recognize that drawing a large vacuum on the steel fuel tank positioned in the fuel system may draw fuel vapors from the tank into the fuel vapor storage canister. Particularly for hybrid applications where engine run-time is limited, it may not be desirable to load the canister with fuel vapors under certain conditions (e.g. high ambient temperature) to a level where bleed-through emissions may result. Accordingly, any variable vacuum applied on the fuel system of such a vehicle may be a function of not only ambient temperature, but also current canister loading state, provided the vacuum pump (e.g. 289) is utilized to evacuate the fuel system (and evaporative emissions system). By factoring in canister loading state into the variable vacuum determination, a balance between desired signal-to-noise for conducting the test for undesired evaporative emissions, and desired canister loading state as a function of ambient conditions, may be employed. As such, undesired evaporative emissions may be reduced or eliminated, and completion rates may be increased for tests for the presence or absence of undesired evaporative emissions.

A still further technical effect is to recognize that, under conditions where utilizing a variable vacuum target may undesirably load the canister, a crowd-based diagnostic may be utilized to infer whether the fuel system of the vehicle being diagnosed has a source of undesired evaporative emissions, or not. For example, a technical effect is to recognize that fuel system pressure data from a crowd of vehicles within a predetermined distance of the vehicle being diagnosed may be compared to fuel system pressure from the vehicle being diagnosed, which may enable a determination of whether the fuel system of the vehicle being diagnosed has a source of undesired evaporative emissions stemming from the fuel system.

A still further technical effect is to recognize that there may be circumstances where the vehicle may stop for a duration that is not long enough to conduct the variable vacuum-based test as discussed with regard to FIG. 5 (which may commence a predetermined duration, which may include several hours, after key-off), the crowd-based diagnostic discussed at FIG. 7, or an EONV test. In such an example, an active variable-vacuum draw test may be conducted, such that the test may be expected to complete within a duration. The duration may comprise a learned duration for the particular stop, which may be learned via route-learning methodology, discussed above. By varying the target vacuum of such an active variable vacuum test as a function of ambient temperature and canister loading state, test results may be robust without undesirably loading the fuel vapor canister, as discussed. In such an example, V2X communications between vehicles may be utilized to obtain data related to recent similar diagnostics conducted on other similarly situated vehicles (e.g. vehicles of the same make/model, vehicles within a predetermined threshold distance of the vehicle, etc.), where conducting the active variable vacuum test is in response to an indication that a particular vacuum level is desirable to achieve robust results from the test diagnostic.

The systems described herein, and with reference to FIGS. 1-3, along with the methods described herein, and with reference to FIGS. 4-5 and FIGS. 7-10, may enable one or more systems and one or more methods. In one example, a method comprises conducting a test for undesired evaporative emissions stemming from a fuel system of a vehicle via in a first operating mode, evacuating the fuel system to a variable vacuum level through an entirety of a fuel vapor canister configured to capture and store fuel vapors; and in a second operating mode, evacuating the fuel system to the variable vacuum level through a portion of the fuel vapor canister. In a first example of the method, the method further comprises learning common routes traveled by the vehicle, where learned routes include one or more learned key-off events, and further includes an expected duration of the one or more learned key-off events; and wherein evacuating the fuel system in both the first operating mode and in the second operating mode is in response to a learned key-off event duration below a threshold key-off duration. A second example of the method optionally includes the first example, and further includes wherein evacuating the fuel system in both the first operating mode and in the second operating mode includes evacuating the fuel system prior to the key-off event, and then sealing the fuel system and monitoring a pressure bleed-up and/or a pressure bleed-up rate in the fuel system, to indicate whether undesired evaporative emissions are stemming from the fuel system. A third example of the method optionally includes any one or more or each of the first through second examples, and further includes wherein evacuating the fuel system to the variable vacuum level in both the first operating mode and the second operating mode is based at least in part based on vehicle-to-vehicle communication where it is indicated that the variable vacuum level is desired for the test to be robust. A fourth example of the method optionally includes any one or more or each of the first through third examples, and further includes wherein the variable vacuum level in the first operating mode is a function of a loading state of the fuel vapor canister and fuel volatility; and wherein the variable vacuum level in the second operating mode is a function of fuel volatility but independent of the loading state of the fuel vapor canister. A fifth example of the method optionally includes any one or more or each of the first through fourth examples, and further includes wherein evacuating the fuel system in the first operating mode is via a vacuum pump positioned between the fuel vapor canister and atmosphere; and wherein evacuating the fuel system in the second operating mode is via an engine. A sixth example of the method optionally includes any one or more or each of the first through fifth examples, and further includes wherein the vacuum pump is positioned in a vacuum pump conduit, the vacuum pump in parallel with a canister vent valve positioned in a vent line between the fuel vapor canister and atmosphere; and wherein the canister vent valve is commanded closed just prior to evacuating the fuel system in the first operating mode. A seventh example of the method optionally includes any one or more or each of the first through sixth examples, and further comprises activating the engine to combust air and fuel in order to evacuate the fuel system in the second operating mode, under conditions where the vehicle is being operated in an electric-only mode of operation.

Another example of a method comprises in a first operating condition, operating a vehicle in a first mode to evacuate a fuel system of the vehicle to a first variable vacuum level in order to conduct a test for undesired evaporative emissions stemming from the fuel system, where evacuating the fuel system in the first mode further loads a fuel vapor storage canister with fuel vapors from the fuel system; and in a second operating condition, operating the vehicle in a second mode to evacuate the fuel system of the vehicle to a second variable vacuum level to conduct the test for undesired evaporative emissions, where evacuating the fuel system in the second mode avoids further loading of the fuel vapor storage canister with fuel vapors from the fuel system. In a first example of the method, the method includes wherein the first variable vacuum level is a function of a loading state of the fuel vapor storage canister and fuel volatility; and wherein the second variable vacuum level is a function of fuel volatility but independent of the loading state of the fuel vapor storage canister. A second example of the method optionally includes the first example, and further includes wherein the first operating condition includes the loading state of the fuel vapor storage canister in combination with fuel volatility being below a combination threshold; and wherein the second operating condition includes the loading state of the fuel vapor storage canister in combination with fuel volatility being greater than the combination threshold. A third example of the method optionally includes any one or more or each of the first through second examples, and further includes wherein evacuating the fuel system in both the first mode and the second mode is in response to a request to conduct the test and further responsive to an indication that a learned key-off event is of a duration less than a threshold key-off duration. A fourth example of the method optionally includes any one or more or each of the first through third examples, and further includes wherein evacuating the fuel system in both the first operating condition and the second operating condition includes evacuating the fuel system to the first variable vacuum level or the second variable vacuum level, respectively, just prior to the learned key-off event; and responsive to the key-off event, sealing the fuel system and indicating a presence or absence of undesired evaporative emissions as a function of pressure bleed-up or a pressure bleed-up rate in the fuel system. A fifth example of the method optionally includes any one or more or each of the first through fourth examples, and further includes wherein evacuating the fuel system in the first operating condition is via a vacuum pump positioned between the fuel vapor canister and atmosphere; and wherein evacuating the fuel system in the second operating condition is via an engine. A sixth example of the method optionally includes any one or more or each of the first through fifth examples, and further includes wherein the engine is one of combusting air and fuel, or being rotated unfueled via an electric motor. A seventh example of the method optionally includes any one or more or each of the first through sixth examples, and further includes wherein the vacuum pump is positioned in a vacuum pump conduit, the vacuum pump in parallel with a canister vent valve positioned in a vent line between the fuel vapor canister and atmosphere; and wherein the canister vent valve is commanded closed just prior to evacuating the fuel system in the first mode. An eighth example of the method optionally includes any one or more or each of the first through seventh examples, and further includes wherein evacuating the fuel system to the second variable vacuum further comprises an indication that a temperature of an exhaust catalyst is greater than a threshold temperature. A ninth example of the method optionally includes any one or more or each of the first through eighth examples, and further comprises activating a heating element of the exhaust catalyst to raise the temperature of the exhaust catalyst to greater than the threshold temperature under conditions where the temperature of the exhaust catalyst is below the threshold temperature.

A system for a hybrid electric vehicle comprises a fuel system including a fuel tank for storing fuel; an evaporative emissions system including a fuel vapor canister, the evaporative emissions system selectively fluidically coupled to the fuel system via a fuel tank isolation valve; a vent line stemming from the fuel vapor canister, the vent line including a canister vent valve configured to selectively fluidically couple the fuel vapor canister to atmosphere; an engine, an intake of the engine selectively fluidically coupled to the evaporative emissions system via a canister purge valve; a fuel tank pressure transducer positioned in the fuel system; a vacuum pump positioned in a vacuum pump conduit in parallel with the vent line; a first check valve positioned in the vacuum pump conduit between the vacuum pump and the vent line downstream of the canister vent valve; a second check valve positioned in the vacuum pump conduit between the vacuum pump and the vent line upstream of the canister vent valve; and a controller storing instructions in non-transitory memory that, when executed, cause the controller to: conduct a test for undesired evaporative emissions stemming from the fuel system in an environmentally-friendly fashion via, in a first operating condition, evacuating the fuel system in a first mode through an entirety of the fuel vapor canister under conditions where doing so does not undesirably load the fuel vapor canister with fuel vapors, and in a second operating condition, evacuating the fuel system in a second mode through a portion of the fuel vapor canister so as to avoid undesirably loading the fuel vapor canister with fuel vapors; wherein evacuating the fuel system in the first mode includes evacuating the fuel system to a first variable vacuum target via commanding closed the canister vent valve, commanding open the fuel tank isolation valve, commanding closed the canister purge valve, and actuating the vacuum pump to draw a negative pressure with respect to atmospheric pressure on the fuel system, where the variable vacuum target is a function of fuel volatility and a loading state of the fuel vapor canister and where the first check valve and the second check valve open in response to actuating the vacuum pump and close in response to the vacuum pump being actuated off; and wherein evacuating the fuel system in the second mode includes evacuating the fuel system to a second variable vacuum target, where the second variable vacuum target is a function of fuel volatility but independent of the loading state of the fuel vapor canister, via commanding open the canister purge valve, commanding closed the canister vent valve, commanding open the fuel tank isolation valve, and evacuating the fuel system via vacuum derived from operation of the engine. In a first example of the system, the system further includes wherein the controller stores further instructions to evacuate the fuel system in both the first mode and in the second mode to the first variable vacuum level or the second variable vacuum level, respectively, just prior to a learned key-off event, where a learned duration of the learned key-off event is less than a threshold key-off duration; and in response to the learned key-off event in both the first mode and the second mode, seal the fuel system and indicating a presence or absence of undesired evaporative emissions as a function of pressure bleed-up or a pressure bleed-up rate in the fuel system.

In another representation, a method comprises: in a first more loaded state of the canister (first operating condition), evacuating the fuel system to a first variable vacuum level (optionally a function of ambient temperature and/or other parameters), and in a second less loaded state of the canister (second operating condition), evacuating the fuel system to a second variable vacuum level (that may be a function of ambient temperature and the loading state of the canister).

In a first example of one the above method, the method further comprises in both the first operating condition and the second operating condition, indicating an absence of gross undesired evaporative emissions stemming from the fuel system in response to the first variable vacuum level being reached or exceeded, or the second variable vacuum being reached or exceeded. A second example of the method optionally includes the first example, and further includes wherein in both the first operating condition and the second operating condition, responsive to either the first variable vacuum level being reached or exceeded or the second variable vacuum level being reached or exceeded, maintaining either the first variable vacuum level or the second variable vacuum level until a key-off event is indicated, and then sealing the fuel system, and indicating a presence or absence of non-gross undesired evaporative emissions stemming from the fuel system as a function of a pressure bleed-up or a pressure bleed-up rate in the fuel system. A third example of the method optionally includes any one or more or each of the first and second examples, and further includes wherein the first operating condition includes evacuating the fuel system via an engine intake manifold vacuum, and wherein the second operating condition includes evacuating the fuel system via a vacuum pump positioned in the evaporative emissions system in a vent line between the fuel vapor canister and atmosphere. A fourth example of the method optionally includes any one or more or each of the first through third examples, and further includes learning or predicting routes commonly traveled via the vehicle, and wherein the first operating condition and/or the second operating condition includes an indication that a learned key-off duration along a learned route that the vehicle is currently traveling, is less than a threshold duration. A fifth example of the method optionally includes any one or more or each of the first through fourth examples, and further includes wherein operating the vehicle in the first operating condition draws fuel vapors from the fuel tank through a portion of the fuel vapor canister, and wherein operating the vehicle in the second operating condition draws fuel vapors from the fuel tank through an entirety of the fuel vapor canister. A sixth example of the method optionally includes any one or more or each of the first through fifth examples, and further includes wherein the first operating condition being above the threshold includes a condition where evacuating the fuel system through the entirety of the fuel vapor canister includes loading the canister to an undesirable level.

In yet another representation, a method comprises in response to a key-off event, indicating a loading state of a fuel vapor canister positioned in an evaporative emissions system of a vehicle and indicating an ambient temperature; and in a first operating condition, including an indication that a combination of the loading state of the fuel vapor canister and the ambient temperature are above a combination threshold, operating the vehicle in a first mode to conduct a test diagnostic for a presence or an absence of undesired evaporative emissions in a fuel system of the vehicle via a crowd-based test diagnostic, and in a second operating condition, including an indication that the combination of the loading state of the fuel vapor canister and the ambient temperature are below the threshold, operating the vehicle in a second mode to conduct the test diagnostic for the presence or the absence of undesired evaporative emissions in the fuel system via evacuating the fuel system to a variable vacuum level via a vacuum pump positioned in a vent line in the evaporative emissions system between the fuel vapor canister and atmosphere. In a first example of the method, the method further includes wherein operating the vehicle in the first mode to conduct the crowd-based test diagnostic does not result in further loading of the fuel vapor canister, and wherein operating the vehicle in the second mode to conduct the test diagnostic further loads the fuel vapor canister. A second example of the method optionally includes the first example, and further includes wherein operating the vehicle in the second mode further comprises fluidically coupling the fuel system to the evaporative emissions system to evacuate the fuel system to the variable vacuum level, and wherein responsive to the variable vacuum level being reached or exceeded, sealing the fuel system from the evaporative emissions system, and indicating a presence or an absence of undesired evaporative emissions stemming from the fuel system as a function of pressure bleed-up in the fuel system over a predetermined duration. A third example of the method optionally includes any one or more or each of the first and second examples, and further includes wherein operating the vehicle in the first mode includes a controller of the vehicle sending a wireless request for one or more data sets related to fuel system pressure from a plurality of vehicles positioned within a threshold distance of the vehicle, receiving the one or more data sets, and indicating the presence of undesired evaporative emissions stemming from the fuel system of the vehicle in response to the one or more data sets related to fuel system pressure not correlating with fuel system pressure in the vehicle, over a predetermined duration. A fourth example of the method optionally includes any one or more or each of the first through third examples, and further includes wherein operating the vehicle in the first mode includes an indication that an absolute value of pressure in the fuel system of the vehicle is not greater than a positive pressure threshold, or a negative pressure threshold, just prior to conducting the crowd-based test diagnostic. A fifth example of the method optionally includes any one or more or each of the first through fourth examples, and further includes wherein operating the vehicle in either the first mode or the second mode comprises waking the controller after a predetermined sleep duration. A sixth example of the method optionally includes any one or more or each of the first through fifth examples, and further includes wherein operating the vehicle in either the first mode or the second mode further comprises an indication of an absence of gross and/or non-gross undesired evaporative emissions stemming from the evaporative emissions system of the vehicle.

In still another representation, a method comprises, during a condition where an engine of a vehicle is not in operation, conducting a test for a presence or absence of undesired evaporative emissions in a fuel system of the vehicle by evacuating the fuel system to a variable vacuum level that is a function of ambient temperature and a loading state of a fuel vapor canister positioned in an evaporative emissions system of the vehicle. In a first example of the method, the method further includes wherein evacuating the fuel system to the variable vacuum level includes an indication that the evaporative emissions system is free from the presence of undesired evaporative emissions. A second example of the method optionally includes the first example, and further includes wherein in a first operating condition, including a condition where the engine is not in operation but where the vehicle is being propelled via electric power, operating the vehicle in a first mode to evacuate the fuel system to the variable vacuum level just prior to a predicted or learned key-off event, and in a second operating condition, including a key-off condition, operating the vehicle in a second mode to evacuate the fuel system to the variable vacuum level subsequent to a controller of the vehicle being awoken from a sleep mode after a predetermined sleep duration. A third example of the method optionally includes any one or more or each of the first through second examples, and further includes wherein the predicted or learned key-off event is predicted to be of a duration less than a predetermined duration. A fourth example of the method optionally includes any one or more or each of the first through third examples, and further includes wherein operating the vehicle in both the first mode and the second mode includes actuating on a vacuum pump positioned in a vent line of the evaporative emissions system between the fuel vapor canister and atmosphere, and further comprises fluidically coupling the fuel system to the evaporative emissions system. A fifth example of the method optionally includes any one or more or each of the first through fourth examples, and further includes wherein operating the vehicle in both the first mode and the second mode includes sealing the fuel system from the evaporative emissions system subsequent to the variable vacuum level being reached, and indicating a presence or absence of undesired evaporative emissions as a function of pressure bleed-up in the fuel system over a predetermined duration. A sixth example of the method optionally includes any one or more or each of the first through fifth examples, and further includes wherein the variable vacuum level increases as ambient temperature increases, and as the loading state of the fuel vapor canister decreases.

In still another representation, a method comprises conducting a test for a presence or absence of undesired evaporative emissions stemming from a fuel system of a vehicle, as a function of a loading state of a fuel vapor canister positioned in an evaporative emissions system of the vehicle, and ambient temperature. In a first example of the method, the method further includes conducting the test in response to an indication that the evaporative emissions system of the vehicle is free from undesired evaporative emissions. A second example of the method optionally includes the first example, and further includes wherein conducting the test includes a condition where pressure in the fuel system is not greater than either a positive pressure threshold or a negative pressure threshold under conditions where the fuel system is sealed from the evaporative emissions system of the vehicle and where the vehicle is in a key-off condition. A third example of the method optionally includes any one or more or each of the first and second examples, and further includes wherein conducting the test includes evacuating the fuel system via a vacuum pump positioned in the evaporative emissions system in a vent line between the fuel vapor canister and atmosphere, and wherein evacuating the fuel system includes fluidically coupling the fuel system to the evaporative emissions system. A fourth example of the method optionally includes any one or more or each of the first through third examples, and further includes not conducting the test in response to an indication that a combination of ambient temperature and the loading state of the fuel vapor canister are above a threshold. A fifth example of the method optionally includes any one or more or each of the first through fourth examples, and further includes evacuating the fuel system via the vacuum pump to a variable vacuum level that is a function of the loading state of the fuel vapor canister and ambient temperature. A sixth example of the method optionally includes any one or more or each of the first through fifth examples, and further includes wherein conducting the test includes sealing the fuel system from the evaporative emissions system responsive to the variable vacuum level being reached, and indicating a presence or absence of undesired evaporative emissions stemming from the fuel system as a function of a pressure bleed-up in the fuel system over a predetermined duration. A seventh example of the method optionally includes any one or more or each of the first through sixth examples, and further includes wherein conducting the test includes evacuating the fuel system to the variable vacuum level just prior to a key-off event, where the key-off event comprises a predicted or learned key-off event of a duration less than a threshold duration, and wherein the fuel system is sealed responsive to an indication of the key-off event, to monitor pressure bleed-up in the fuel system to indicate the presence or absence of undesired evaporative emissions.

In still another representation, a method comprises during an engine-off condition, conducting a variable vacuum diagnostic for a presence or an absence of undesired evaporative emissions stemming from a fuel system of a vehicle, the variable vacuum diagnostic including evacuating the fuel system to a variable vacuum level that is a function of ambient temperature and a loading state of a fuel vapor canister positioned in an evaporative emissions system of the vehicle; and adjusting a purge schedule of the fuel vapor canister as a function of the variable vacuum level reached during the evacuating. In a first example of the method, the method further includes wherein adjusting the purge schedule includes scheduling a purging event to occur within a faster timeframe after completion of the variable vacuum diagnostic in response to evacuating the fuel system to a greater variable vacuum level, as compared to conditions where the fuel system is evacuated to a lesser variable vacuum level. A second example of the method optionally includes the first example, and further includes wherein evacuating the fuel system includes fluidically coupling the fuel system to the evaporative emissions system, and wherein evacuating the fuel system further loads the canister with fuel vapors. A third example of the method optionally includes any one or more or each of the first and second examples, and further includes wherein evacuating the fuel system to the variable vacuum level is conducted via a vacuum pump positioned in the evaporative emissions system, in a vent line positioned between the fuel vapor canister and atmosphere. A fourth example of the method optionally includes any one or more or each of the first through third examples, and further includes wherein the engine-off condition includes a key-off condition, or a condition where the vehicle is being propelled via electric power. A fifth example of the method optionally includes any one or more or each of the first through fourth examples, and further includes wherein responsive to the variable vacuum level being reached while the vehicle is being propelled via electric power, maintaining the variable vacuum level until a key-off event is indicated, and then stopping the evacuating, sealing the fuel system from the evaporative emissions system, and indicating a presence or absence of undesired evaporative emissions as a function of pressure bleed-up in the fuel system over a predetermined duration. A sixth example of the method optionally includes any one or more or each of the first through fifth examples, and further includes wherein conducting the variable vacuum diagnostic during the key-off condition includes waking a controller of the vehicle at a determined duration subsequent to the key-off condition, evacuating the fuel system to the variable vacuum level, and then sealing the fuel system to indicate the presence or absence of undesired evaporative emissions as the function of pressure bleed-up in the fuel system over the predetermined duration.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
conducting a test for undesired evaporative emissions stemming from a fuel system of a vehicle via in a first operating mode, evacuating the fuel system to a variable vacuum level through an entirety of a fuel vapor canister configured to capture and store fuel vapors; and
in a second operating mode, evacuating the fuel system to the variable vacuum level through a portion of the fuel vapor canister.

2. The method of claim 1, further comprising:
learning common routes traveled by the vehicle, where learned routes include one or more learned key-off events, and further includes an expected duration of the one or more learned key-off events; and
wherein evacuating the fuel system in both the first operating mode and in the second operating mode is in response to a learned key-off event duration below a threshold key-off duration.

3. The method of claim 1, wherein evacuating the fuel system in both the first operating mode and in the second operating mode includes evacuating the fuel system prior to the key-off event, and then sealing the fuel system and monitoring a pressure bleed-up and/or a pressure bleed-up rate in the fuel system, to indicate whether undesired evaporative emissions are stemming from the fuel system.

4. The method of claim 1, wherein evacuating the fuel system to the variable vacuum level in both the first operating mode and the second operating mode is based at least in part based on vehicle-to-vehicle communication where it is indicated that the variable vacuum level is desired for the test to be robust.

5. The method of claim 4, wherein the variable vacuum level in the first operating mode is a function of a loading state of the fuel vapor canister and fuel volatility; and
wherein the variable vacuum level in the second operating mode is a function of fuel volatility but independent of the loading state of the fuel vapor canister.

6. The method of claim 1, wherein evacuating the fuel system in the first operating mode is via a vacuum pump positioned between the fuel vapor canister and atmosphere; and
wherein evacuating the fuel system in the second operating mode is via an engine.

7. The method of claim 6, wherein the vacuum pump is positioned in a vacuum pump conduit, the vacuum pump in parallel with a canister vent valve positioned in a vent line between the fuel vapor canister and atmosphere; and
wherein the canister vent valve is commanded closed just prior to evacuating the fuel system in the first operating mode.

8. The method of claim 6, further comprising activating the engine to combust air and fuel in order to evacuate the fuel system in the second operating mode, under conditions where the vehicle is being operated in an electric-only mode of operation.

9. A method comprising:
in a first operating condition, operating a vehicle in a first mode to evacuate a fuel system of the vehicle to a first variable vacuum level in order to conduct a test for undesired evaporative emissions stemming from the fuel system, where evacuating the fuel system in the first mode further loads a fuel vapor storage canister with fuel vapors from the fuel system; and
in a second operating condition, operating the vehicle in a second mode to evacuate the fuel system of the vehicle to a second variable vacuum level to conduct the test for undesired evaporative emissions, where evacuating the fuel system in the second mode avoids further loading of the fuel vapor storage canister with fuel vapors from the fuel system.

10. The method of claim 9, wherein the first variable vacuum level is a function of a loading state of the fuel vapor storage canister and fuel volatility; and
wherein the second variable vacuum level is a function of fuel volatility but independent of the loading state of the fuel vapor storage canister.

11. The method of claim 10, wherein the first operating condition includes the loading state of the fuel vapor storage canister in combination with fuel volatility being below a combination threshold; and
wherein the second operating condition includes the loading state of the fuel vapor storage canister in combination with fuel volatility being greater than the combination threshold.

12. The method of claim 9, wherein evacuating the fuel system in both the first mode and the second mode is in response to a request to conduct the test and further responsive to an indication that a learned key-off event is of a duration less than a threshold key-off duration.

13. The method of claim 12, wherein evacuating the fuel system in both the first operating condition and the second operating condition includes evacuating the fuel system to the first variable vacuum level or the second variable vacuum level, respectively, just prior to the learned key-off event; and
responsive to the key-off event, sealing the fuel system and indicating a presence or absence of undesired evaporative emissions as a function of pressure bleed-up or a pressure bleed-up rate in the fuel system.

14. The method of claim 9, wherein evacuating the fuel system in the first operating condition is via a vacuum pump positioned between the fuel vapor canister and atmosphere; and
wherein evacuating the fuel system in the second operating condition is via an engine.

15. The method of claim 14, wherein the engine is one of combusting air and fuel, or being rotated unfueled via an electric motor.

16. The method of claim 14, wherein the vacuum pump is positioned in a vacuum pump conduit, the vacuum pump in parallel with a canister vent valve positioned in a vent line between the fuel vapor canister and atmosphere; and
wherein the canister vent valve is commanded closed just prior to evacuating the fuel system in the first mode.

17. The method of claim 9, wherein evacuating the fuel system to the second variable vacuum further comprises an indication that a temperature of an exhaust catalyst is greater than a threshold temperature.

18. The method of claim 17, further comprising activating a heating element of the exhaust catalyst to raise the temperature of the exhaust catalyst to greater than the threshold temperature under conditions where the temperature of the exhaust catalyst is below the threshold temperature.

19. A system for a hybrid electric vehicle, comprising:
a fuel system including a fuel tank for storing fuel;
an evaporative emissions system including a fuel vapor canister, the evaporative emissions system selectively fluidically coupled to the fuel system via a fuel tank isolation valve;
a vent line stemming from the fuel vapor canister, the vent line including a canister vent valve configured to selectively fluidically couple the fuel vapor canister to atmosphere;
an engine, an intake of the engine selectively fluidically coupled to the evaporative emissions system via a canister purge valve;
a fuel tank pressure transducer positioned in the fuel system;
a vacuum pump positioned in a vacuum pump conduit in parallel with the vent line;
a first check valve positioned in the vacuum pump conduit between the vacuum pump and the vent line downstream of the canister vent valve;
a second check valve positioned in the vacuum pump conduit between the vacuum pump and the vent line upstream of the canister vent valve; and
a controller storing instructions in non-transitory memory that, when executed, cause the controller to:
conduct a test for undesired evaporative emissions stemming from the fuel system in an environmentally-friendly fashion via, in a first operating condition, evacuating the fuel system in a first mode through an entirety of the fuel vapor canister under conditions where doing so does not undesirably load the fuel vapor canister with fuel vapors, and in a second operating condition, evacuating the fuel system in a second mode through a portion of the fuel vapor canister so as to avoid undesirably loading the fuel vapor canister with fuel vapors;
wherein evacuating the fuel system in the first mode includes evacuating the fuel system to a first variable vacuum target via commanding closed the canister vent valve, commanding open the fuel tank isolation valve, commanding closed the canister purge valve, and actuating the vacuum pump to draw a negative pressure with respect to atmospheric pressure on the fuel system, where the variable vacuum target is a function of fuel volatility and a loading state of the fuel vapor canister and where the first check valve and the second check valve open in response to actuating the vacuum pump and close in response to the vacuum pump being actuated off; and
wherein evacuating the fuel system in the second mode includes evacuating the fuel system to a second variable vacuum target, where the second variable vacuum target is a function of fuel volatility but independent of the loading state of the fuel vapor canister, via commanding open the canister purge valve, commanding closed the canister vent valve, commanding open the fuel tank isolation valve, and evacuating the fuel system via vacuum derived from operation of the engine.

20. The system of claim 19, wherein the controller stores further instructions to evacuate the fuel system in both the first mode and in the second mode to the first variable vacuum level or the second variable vacuum level, respectively, just prior to a learned key-off event, where a learned duration of the learned key-off event is less than a threshold key-off duration; and
in response to the learned key-off event in both the first mode and the second mode, seal the fuel system and indicating a presence or absence of undesired evaporative emissions as a function of pressure bleed-up or a pressure bleed-up rate in the fuel system.

* * * * *